United States Patent
Haghdoost et al.

(10) Patent No.: US 12,173,166 B2
(45) Date of Patent: Dec. 24, 2024

(54) ARTICLES INCLUDING SURFACE COATINGS AND METHODS TO PRODUCE THEM

(71) Applicant: MAXTERIAL, INC., Richmond, CA (US)

(72) Inventors: Atieh Haghdoost, San Pablo, CA (US); Ersan Ilgar, Hercules, CA (US); Hamoun Khalili, Richmond, CA (US); Mehdi Kargar, San Pablo, CA (US)

(73) Assignee: Maxterial, Inc., Pleasanton, CA (US)

( * ) Notice: Subject to any disclaimer, the term of this patent is extended or adjusted under 35 U.S.C. 154(b) by 651 days.

(21) Appl. No.: 16/146,730

(22) Filed: Sep. 28, 2018

(65) Prior Publication Data

US 2019/0186035 A1    Jun. 20, 2019

Related U.S. Application Data

(60) Provisional application No. 62/564,958, filed on Sep. 28, 2017.

(51) Int. Cl.
  *B32B 15/01*    (2006.01)
  *C09D 1/00*    (2006.01)
  (Continued)

(52) U.S. Cl.
  CPC .............. *C09D 1/00* (2013.01); *B32B 15/013* (2013.01); *C09D 5/08* (2013.01); *C09D 5/084* (2013.01);
  (Continued)

(58) Field of Classification Search
  None
  See application file for complete search history.

(56) References Cited

U.S. PATENT DOCUMENTS

| 3,007,231 A | 11/1961 | Garver |
| 3,580,733 A | 5/1971 | Ott |

(Continued)

FOREIGN PATENT DOCUMENTS

| CA | 1079221 | 6/1980 |
| CN | 200943579 | 9/2007 |

(Continued)

OTHER PUBLICATIONS

Kock-Yee Law, "Definitions for Hydrophilicity, Hydrophobicity, and Superhydrophobicity: Getting the Basics Right", Feb. 20, 2014, Journal of Physical Chemistry Letters, American Chemical Society, vol. 5, p. 686-688. (Year: 2014).*

(Continued)

*Primary Examiner* — Kim S. Horger
(74) *Attorney, Agent, or Firm* — Rhodes IP PLC; Christopher Rhodes

(57) ABSTRACT

Certain configurations of coated articles that are corrosion resistant are described. In some embodiments, the article comprises a substrate and a corrosion resistant coating disposed on an entire surface or a portion of the surface of the substrate. The corrosion resistant coating can resist degradation after exposure to strong acids with a negative pH with a corrosion rate of less than 20 mils/year. The coating can also, if desired, exhibit a hardness of more than 600 Vickers hardness (HV), as measured based on the ASTM E92-17 standard.

13 Claims, 36 Drawing Sheets

(51) Int. Cl.

| | | |
|---|---|---|
| *C09D 5/08* | (2006.01) | |
| *C09D 7/61* | (2018.01) | |
| *C09K 15/02* | (2006.01) | |
| *C23C 28/00* | (2006.01) | |
| *C25D 3/12* | (2006.01) | |
| *C25D 3/22* | (2006.01) | |
| *C25D 3/38* | (2006.01) | |
| *C25D 3/56* | (2006.01) | |
| *C25D 5/00* | (2006.01) | |
| *C25D 5/12* | (2006.01) | |
| *C25D 5/14* | (2006.01) | |
| *C25D 9/02* | (2006.01) | |
| *C23F 11/12* | (2006.01) | |

(52) U.S. Cl.
CPC .............. *C09D 7/61* (2018.01); *C09K 15/02* (2013.01); *C23C 28/00* (2013.01); *C25D 3/12* (2013.01); *C25D 3/22* (2013.01); *C25D 3/38* (2013.01); *C25D 3/562* (2013.01); *C25D 3/565* (2013.01); *C25D 5/12* (2013.01); *C25D 5/14* (2013.01); *C25D 5/605* (2020.08); *C25D 5/611* (2020.08); *C25D 5/623* (2020.08); *C25D 5/627* (2020.08); *C25D 9/02* (2013.01); *C23C 2222/20* (2013.01); *C23F 11/12* (2013.01); *Y10T 428/12771* (2015.01)

(56) References Cited

U.S. PATENT DOCUMENTS

| | | |
|---|---|---|
| 3,756,925 A | 9/1973 | Takeuchi |
| 4,043,878 A | 8/1977 | Ehrsam |
| 4,222,828 A | 9/1980 | Zueerdeg |
| 4,366,210 A | 12/1982 | Golemo |
| 4,371,430 A | 2/1983 | Ballarani |
| 4,469,564 A | 9/1984 | Okinaka |
| 4,484,959 A | 11/1984 | Boucher |
| 4,597,836 A | 7/1986 | Schaer |
| 4,863,810 A | 9/1989 | Bhattacharya |
| 5,094,886 A | 3/1992 | Bogardy |
| 5,190,796 A | 3/1993 | Iacovangelo |
| 5,412,870 A | 5/1995 | Lehtonen |
| 5,476,688 A | 12/1995 | Ostolski |
| 5,512,219 A | 4/1996 | Rowland |
| 5,564,196 A | 10/1996 | Nomura |
| 5,879,816 A | 3/1999 | Mori |
| 5,935,351 A | 8/1999 | Sherman |
| 6,491,806 B1 | 12/2002 | Dubin |
| 6,699,379 B1 | 3/2004 | Ke |
| 6,773,247 B1 | 8/2004 | Osada |
| 7,521,128 B2 | 4/2009 | Schuh |
| 7,951,600 B2 | 5/2011 | Lund |
| 8,071,387 B1 | 12/2011 | Lund |
| 8,455,116 B2 | 5/2013 | Dadvand |
| 8,500,986 B1 | 8/2013 | Schuh |
| 8,652,649 B2 | 2/2014 | Cahalen |
| 8,936,857 B2 | 1/2015 | Dadvand |
| 9,074,294 B2 | 7/2015 | Cahalen |
| 9,631,293 B2 | 4/2017 | Lund |
| 9,694,562 B2 | 7/2017 | Dadvand |
| 9,752,242 B2 | 9/2017 | Abbott |
| 9,758,888 B2 | 9/2017 | Freydina |
| 9,765,438 B2 | 9/2017 | Cahalen |
| 10,180,636 B2 | 1/2019 | Nakane |
| 10,190,227 B2 | 1/2019 | Ruan |
| 10,590,514 B2 | 3/2020 | Freydina |
| 10,590,558 B2 | 3/2020 | Freydina |
| 11,021,803 B2 | 6/2021 | Freydina |
| 11,247,434 B2 | 2/2022 | Hilty |
| 11,542,621 B1 | 1/2023 | Haghdoost |
| 11,634,831 B2 | 4/2023 | Cahalen |
| 2003/0031877 A1 | 2/2003 | Veersamy |
| 2003/0059634 A1 | 3/2003 | Naoi |
| 2003/0095826 A1 | 5/2003 | Policicchio |
| 2003/0129420 A1 | 7/2003 | Shultz |
| 2003/0129537 A1 | 7/2003 | Garabedian |
| 2004/0027715 A1 | 2/2004 | Hixson-Goldsmith |
| 2004/0033341 A1 | 2/2004 | Liam |
| 2004/0052964 A1 | 3/2004 | Kaufmann |
| 2004/0073053 A1 | 4/2004 | Nguyen |
| 2004/0092185 A1 | 5/2004 | Grafe |
| 2004/0105985 A1 | 6/2004 | Henze |
| 2005/0129898 A1 | 6/2005 | Sosalla |
| 2005/0268470 A1 | 12/2005 | Skrobis |
| 2006/0135281 A1 | 6/2006 | Palumbo |
| 2006/0264650 A1 | 11/2006 | Arora |
| 2006/0292390 A1 | 12/2006 | Kassner |
| 2007/0028588 A1 | 2/2007 | Varanasi |
| 2007/0077516 A1 | 4/2007 | Chang |
| 2007/0107590 A1 | 5/2007 | Silvers |
| 2007/0196632 A1 | 8/2007 | Meyer |
| 2008/0015298 A1 | 1/2008 | Xiong |
| 2008/0163792 A1 | 7/2008 | Seitz |
| 2008/0296053 A1 | 12/2008 | Willauer |
| 2009/0064894 A1 | 3/2009 | Baumgart |
| 2009/0185327 A1 | 7/2009 | Seymour |
| 2009/0237099 A1 | 9/2009 | Garabedian |
| 2009/0272269 A1 | 11/2009 | Leonard |
| 2009/0298369 A1 | 12/2009 | Koene |
| 2010/0034335 A1 | 2/2010 | Varanasi |
| 2010/0116528 A1 | 5/2010 | Shim |
| 2010/0127125 A1 | 5/2010 | Li |
| 2010/0170625 A1 | 7/2010 | Liao |
| 2010/0304179 A1 | 12/2010 | Facchini |
| 2011/0008646 A1* | 1/2011 | Cahalen ................. B32B 15/043 205/176 |
| 2011/0114075 A1 | 5/2011 | Mills |
| 2011/0127074 A1 | 6/2011 | Takahashi |
| 2011/0192830 A1 | 8/2011 | Wilson |
| 2011/0203791 A1 | 8/2011 | Jin |
| 2011/0220348 A1 | 9/2011 | Jin |
| 2011/0223442 A1* | 9/2011 | Dadvand ................. H01R 13/03 428/673 |
| 2011/0244092 A1 | 10/2011 | Jeong |
| 2012/0122017 A1 | 5/2012 | Mills |
| 2012/0135270 A1 | 5/2012 | Wilbeur |
| 2012/0167401 A1 | 7/2012 | Quigley |
| 2012/0196225 A1 | 8/2012 | Li |
| 2013/0065291 A1 | 3/2013 | Jia |
| 2013/0319868 A1 | 12/2013 | Yoshida |
| 2013/0327435 A1 | 12/2013 | Kaneta |
| 2013/0337288 A1 | 12/2013 | Facchini et al. |
| 2014/0004352 A1 | 1/2014 | McCrea |
| 2014/0072836 A1 | 3/2014 | Mills |
| 2014/0147627 A1 | 5/2014 | Aizenberg |
| 2014/0173889 A1 | 6/2014 | Johnson |
| 2014/0178641 A1 | 6/2014 | Leblanc |
| 2014/0187666 A1 | 7/2014 | Aizenberg |
| 2014/0197038 A1 | 7/2014 | Buckalew |
| 2014/0360021 A1 | 12/2014 | Sonnenberg |
| 2015/0004434 A1* | 1/2015 | Goodrich ................. C25D 5/10 428/670 |
| 2015/0030779 A1 | 1/2015 | Bleecher |
| 2015/0056282 A1 | 2/2015 | Furman |
| 2015/0132539 A1 | 5/2015 | Bailey |
| 2015/0206770 A1 | 7/2015 | Dinneen |
| 2015/0299472 A1* | 10/2015 | Ko ........................... C08K 3/11 428/626 |
| 2015/0314554 A1 | 11/2015 | Fujiwara |
| 2015/0368821 A1* | 12/2015 | Haghdoost ............ C25D 5/627 205/112 |
| 2015/0368824 A1 | 12/2015 | Haghdoost |
| 2016/0102414 A1 | 4/2016 | Tani et al. |
| 2016/0102415 A1* | 4/2016 | Sebe ........................ B05D 1/36 428/412 |
| 2016/0130519 A1 | 5/2016 | Zhao |
| 2017/0058130 A1 | 3/2017 | Addleman |
| 2017/0190139 A1 | 7/2017 | Haghdoost |
| 2017/0334170 A1 | 11/2017 | Haghdoost |
| 2018/0094204 A1 | 4/2018 | Larime |
| 2018/0171261 A1 | 6/2018 | Verleene et al. |
| 2018/0172197 A1 | 6/2018 | Verleene |

(56) References Cited

U.S. PATENT DOCUMENTS

| | | |
|---|---|---|
| 2018/0372151 A1 | 12/2018 | Sridhar et al. |
| 2019/0186033 A1 | 6/2019 | Ruan et al. |
| 2019/0186035 A1 | 6/2019 | Haghdoost |
| 2019/0230939 A1 | 8/2019 | Haas |
| 2019/0292674 A1 | 9/2019 | Ilgar |
| 2020/0232111 A1 | 7/2020 | Cahalen et al. |
| 2020/0277706 A1 | 9/2020 | Modumetal |
| 2020/0299130 A1 | 9/2020 | Mills |
| 2020/0372637 A1 | 11/2020 | Ha |
| 2020/0385645 A1 | 12/2020 | Nakano |
| 2023/0138199 A1 | 5/2023 | Haghdoost |
| 2023/0142535 A1 | 5/2023 | Haghdoost |
| 2023/0145335 A1 | 5/2023 | Haghdoost |
| 2023/0147807 A1 | 5/2023 | Haghdoost |
| 2023/0151505 A1 | 5/2023 | Haghdoost |
| 2023/0151831 A1 | 5/2023 | Haghdoost |
| 2023/0151871 A1 | 5/2023 | Haghdoost |

FOREIGN PATENT DOCUMENTS

| | | |
|---|---|---|
| CN | 102585695 | 9/2014 |
| EP | 1118694 | 7/2001 |
| EP | 1118694 A1 | 7/2001 |
| FR | 3035474 | 4/2015 |
| GB | 226334 | 6/1990 |
| GB | 2262334 | 6/1990 |
| JP | S50-45839 | 4/1975 |
| JP | 58-212840 | 10/1983 |
| JP | H08184375 | 12/1994 |
| JP | H07166123 | 6/1995 |
| JP | 2004346417 | 12/2004 |
| JP | 2013241656 | 12/2013 |
| JP | 2022-129526 | 9/2022 |
| KR | 20170061796 A | 6/2017 |
| KR | 20170081796 | 6/2017 |
| WO | 2008035045 | 3/2008 |
| WO | 2013126134 | 8/2013 |
| WO | 2013126134 A1 | 8/2013 |
| WO | 2014179283 | 4/2014 |
| WO | 2014127160 | 8/2014 |
| WO | 2014190017 | 11/2014 |
| WO | 2015143352 | 9/2015 |
| WO | 2017029040 | 2/2017 |
| WO | 2017029040 A1 | 2/2017 |
| WO | 2017117198 | 7/2017 |
| WO | 2017165634 | 9/2017 |
| WO | 2019006279 | 1/2019 |
| WO | 2019067950 | 4/2019 |
| WO | 2019195293 | 10/2019 |
| WO | 2019195294 | 10/2019 |
| WO | 2022266528 | 12/2022 |
| WO | 2022266529 | 12/2022 |
| WO | 2022266532 | 12/2022 |
| WO | 2022266533 | 12/2022 |

OTHER PUBLICATIONS

Eliaz et al., "Synthesis and characterization of nickel tungsten alloys by electrodeposition", 2005, Electrochimica Acta, vol. 50, p. 2893-2904. (Year: 2005).*
Can-Do National Tape, "What is Surface Energy, and Why is it Important in Bonding?", Posted Mar. 17, 2016 by candotape, accessed online Sep. 13, 2022 at www.can-dotape.com/blog/what-is-surface-energy-and-why-is-it-important-in-bonding (Year: 2016).*
ISR/WO for PCT/US18/5305 mailed on Feb. 11, 2019.
Examination Report for EP18861140.4 received on Jan. 9, 2024.
Wei wt al. RSC Advances, vol. 5, No. 5, Nov. 19, 2015, p. 10300-103012.
Yu et al. Colloids and Surfaces A: Physicochem Eng. Aspects 427 (2013), pp. 1-6.
Haghdoost et al. Fabricating Superhydrophobic Surfaces via a Two-Step Electrodeposition Technnique. Langmuir. 2013.
Zhang. Preparation of Super-Hydrophobic Cu/Ni Coating with Micro-Nano Heirarchical Structure. Material Letters 67 (2012), 327-330.
Huang. Stable Superhydrophobic Surface via Carbon Nanotubes Coated with a ZnlOthin film. J. Phys. Chem. B 2005, 109, 7746-7748 ..
Aerosil R812 Product Information document.
NASA Tech Briefs Webinar, Tuesday, Sep. 22, 2015.
Ahmad. Electrodeposition of Nanostructured Nickel-Ceramic Composite Coatings. A review. Int. J. Electrochem. Sci. 9 (2014), 1942-1963.
Khorsand et al. Corrosion resistance and long-term durability of super-hydrophobic nickel film prepared by electrodeposition process. Appl. Surface Science 305 (2014), 498-505.
Zhao et al. RSC Adv, 2016, 6, 59104-59112.
Brooks et al. Scripta mater., 44, (2001), 853-858.
Feng et al. Surface & Coatings Technology, 270, (2015), 47-56.
Grunlan et al. Chem. Mater., 2004, 16, 12, 2433-2441.
Penulis et al. Advanced Materials, 896, 586-590, 2014.
Wang et al., Electrochemistry Communications, 10 (2008), 655-658.
Eni et al. "Nano-Micro Characterization . . . " date unknown.
Examination report for EP18861140.4 mailed on 2023-10-09.
Eliaz et al. Electrochemica Act 50 (2005), 2893-2904.
https://www.condotape.com/blog/category/better-bonding/dated Mar. 17, 2016.
J. Phys. Chem. Letters. (2014), 5, 686-688.
Wolf. "New Atmospheric Plasma and Photografting Approach . . . " www.aimcal.org, pp. 1-4.
Lu et al. Tribology International 103 (2016), 343-351.
Khameneh-Asl et al. RSC Adv. (2016), 6, 78744.
Popczyk et al. "Structure and Corrosion Resistance of Nickel-Molybdenum Alloy Coatings." ACTA Physica Polonica A. Vol. 130, No. 4 (2020).
SR/WO for PCT/US2023/084475 mailed on Mar. 29, 2024.
ISR/WO for PCT/US2023/084476 mailed on Apr. 10, 2024.
ISR/WO for PCT/US2023/084477 mailed on Apr. 10, 2024.
ISR/WO for PCT/US2023/084478 mailed on Apr. 8, 2024.
ISR/WO for PCT/US23/84474 mailed on May 13, 2024.

* cited by examiner

1920 →

1925 →

1930 →

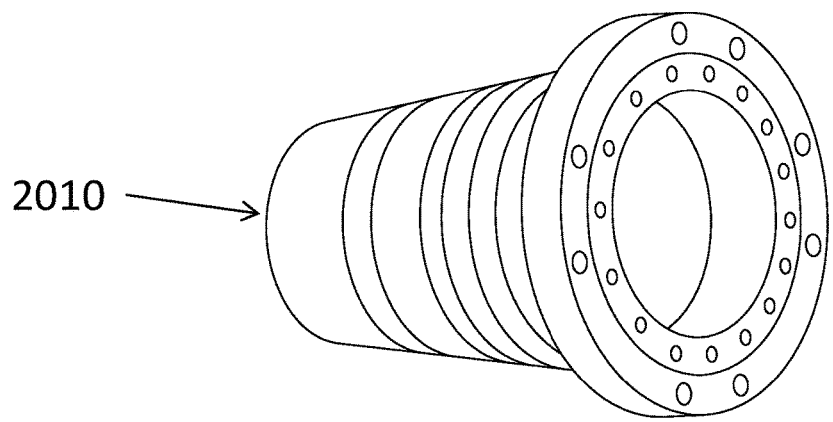
2010 → FIG. 20A
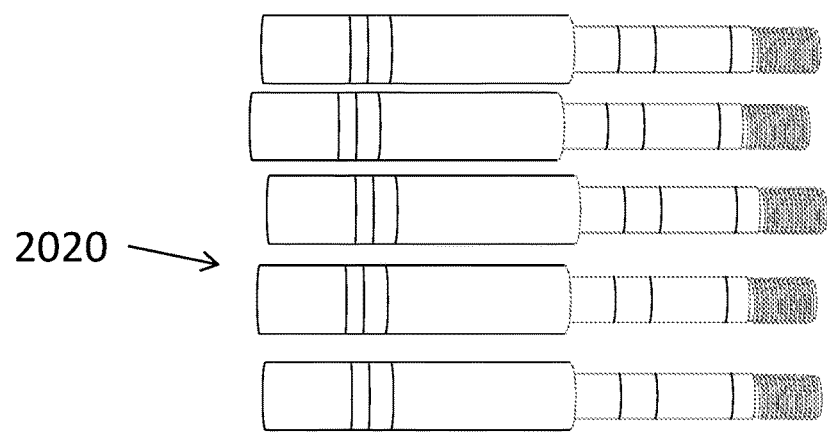
2020 → FIG. 20B
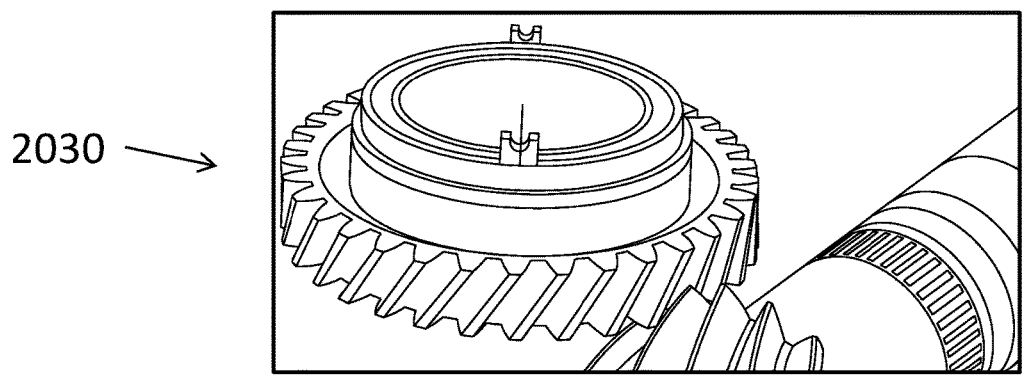
2030 → FIG. 20C Bare (uncoated) ASTM F519 Type 1a.1 notched bar (AISI 4340 Steel) HRC=52, TS=264 ksi MaxShield™ coated H-Embrittlement Bar 1-Hard Cr (2mil)
Rating = 4G 2-E-LessNi (1mil)
Rating = 0 G

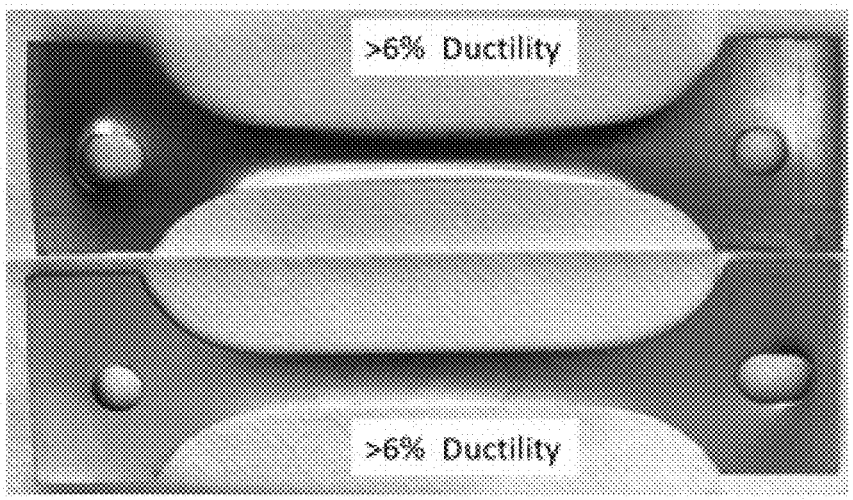
FIG. 33A
FIG. 33B
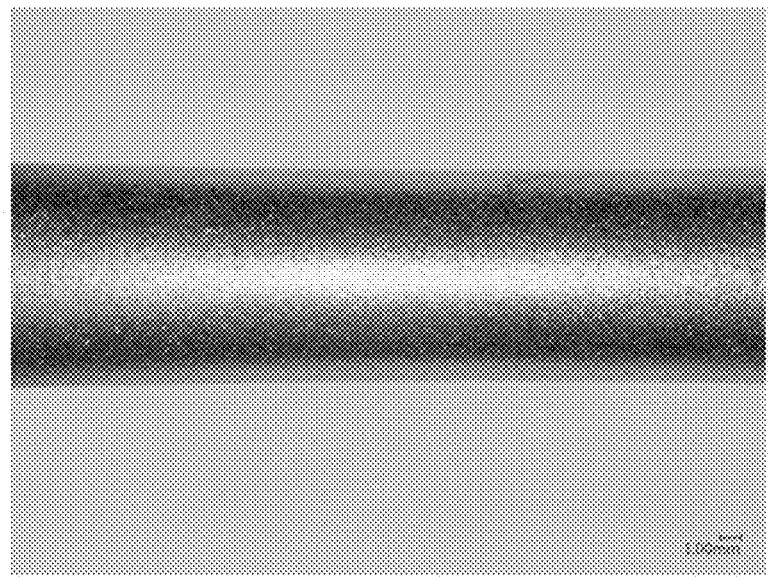
FIG. 34

ARTICLES INCLUDING SURFACE COATINGS AND METHODS TO PRODUCE THEM

PRIORITY APPLICATION

This application claims priority to, and the benefit of, U.S. Provisional Application No. 62/564,958 filed on Sep. 28, 2017, the entire disclosure of which is hereby incorporated herein by reference for all purposes.

TECHNOLOGICAL FIELD

Certain aspects and embodiments described herein relate to articles including surface coatings and methods used to produce them. In some examples, anti-corrosion articles may comprise a surface coating produced using a silane based system that is formed onto an underlying transition metal alloy layer.

BACKGROUND

Corrosion is often encountered on articles present in exterior environments and those exposed to industrial solvents, acids or bases.

SUMMARY

In an aspect, an article comprising a substrate and a corrosion resistant coating deposited on an entire surface or a portion of the surface of the substrate is described. In some examples, the corrosion resistant coating resists degradation after exposure to an acid with a negative pH with a corrosion rate of less than 20 mils/year and exhibits hardness of more than 600 Vickers hardness (HV), as measured based on the ASTM E92-17 standard. In some instances, the coating comprises (i) at least one refractory metal, at least one refractory metal oxide or at least one other compound comprising a refractory metal and (ii) at least one transition metal, at least one transition metal oxide or at least one other compound comprising a transition metal.

In certain configurations, the corrosion resistant coating can resist acid in an aqueous solution of more than 30 percent hydrochloric acid. In other examples, the coating resists the acid at least two times more than a nickel coating, e.g., a pure nickel coating, with similar thickness as the coating and with the corrosion rate of the coating being at most half of a corrosion rate of a nickel coating, e.g., a pure nickel coating, with similar thickness when both coatings are placed in contact with strong acids.

In other embodiments, the refractory metal is selected from the group consisting of niobium, molybdenum, tantalum, tungsten, rhenium, zirconium, titanium, vanadium, chromium, ruthenium, rhodium, hafnium, osmium, iridium, and combinations thereof. In some instances, the transition metal is selected from the group consisting of scandium, manganese, iron, cobalt, nickel, copper, zinc, yttrium, technetium, palladium, silver, cadmium, lanthanum, platinum, gold, mercury, actinium, rutherfordium, dubnium, seaborgium, bohrium, and combinations thereof.

In some examples, the coating comprises a Nickel alloy, and wherein the nickel ally comprises Nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium.

In other examples, the coating comprises a Zinc alloy, and wherein the zinc alloy comprises Zinc in combination with one or more of Scandium, Titanium, Vanadium, Chromium, Manganese, Iron, Cobalt, Copper, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium.

In additional examples, the coating comprises a Copper alloy, and wherein the copper alloy comprises Copper in combination with one or more of Scandium, Titanium, Vanadium, Chromium, Manganese, Iron, Cobalt, Zinc Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium.

In some embodiments, the coating comprises a cobalt alloy, and wherein the cobalt alloy comprises cobalt in combination with one or more transition metals.

In other configurations, the coating comprises a first layer and a second layer, wherein the first layer is between the substrate and the second layer, and wherein the refractory metal or compound of the refractory metal is only present in the second layer. In some examples, the first layer comprises the transition metals and their compounds.

In some examples, at least one part of the surface of the coating is covered with a layer comprising organic or inorganic-organic materials. In some instances, the organic or inorganic-organic material is selected from a group comprising parylene, organofunctional silanes, fluorinated organofunctional silane, fluorinated organofunctional siloxane, organo-functional oligomeric siloxane; any resin including but not limited to organofunctional resins, hybrid inorganic organofunctional resins, hybrid inorganic organofunctional POSS resins; organofunctional polyhedral oligomeric silsesquioxane (POSS), fluorinated oligomeric polysiloxane, organofunctional oligomeric poly siloxane, hybrid inorganic organofunctional oligomeric poly siloxane; any polymer or copolymer including but not limited to fluorinated organofunctional silicone copolymers, organofunctional silicone polymers, hybrid inorganic organofunctional silicone polymers, organofunctional silicone copolymers, hybrid inorganic organofunctional silicone copolymers, silicone polymers, organofunctional silicone polymers, fluorinated polymers; any polymer blends, fluorinated polyhedral oligomeric silsesquioxane (FPOSS), non-volatile linear and branched alkanes, alkenes and alkynes; esters of linear and branched alkanes, alkenes and alkynes, perfluorinated organic material, silane coupling agents, fluorinated alkylsiloxane, surface-modified inorganic particles, fluorinated alkylsilane, fluorinated based organo-functional silane, fluorinated based siloxane, organo-functional organo-functional polydimethylsiloxane, fluorinated oligomeric siloxane, water-born organo-functional organofunctional silane system, organofunctional polysiloxane, silane based sol-gel system, fluoroalkysilane, hydrolyzable inorganic ethoxysilyl groups, sol-gel systems, silane system, functionalized silanol groups, other similar groups, aqueous, alcohol-free products of epoxysilanes, polytetrafluoroethylene, silane systems, or any combination thereof.

In other examples, the second layer comprises nickel and molybdenum and the first layer comprises nickel. In some embodiments, the content of the molybdenum in the second layer is between 5 percent to 40 weight percent based on the weight of the second layer.

In other examples, a thickness of the second layer varies between 1 um to 300 um. In some embodiments, the thickness of the first layer varies between 1 um to 500 um.

In other examples, the coating further comprises particles selected from the group consisting of PTFE, silica ($SiO_2$), alumina ($Al_2O_3$), silicon carbide (SiC), diamond, diatomaceous earth (DE), boron nitride (BN), titanium oxide ($TiO_2$), single wall carbon nanotubes (SWCNTs), multi-wall carbon nanotubes (MWCNTs), kaoline ($Al_2O_3.2SiO_2.2H_2O$), carbon, graphite, molybdenum disulfide, nickel fluoride, chromium carbide ($Cr_2C_3$), titanium carbide (TiC), tatinum nitride (TiN), other nanoparticles, and combinations thereof.

In some instances, at least one portion or area of the coating exhibits a water contact angle of more than 90° as tested by the ASTM D7490-13 standard.

In other examples, the coating comprises a metal alloy comprising a first transition metal and a second transition metal different than the first transition metal, and wherein the coating further comprises a surface layer produced using a silane system comprising an aqueous, alcohol-free product of an epoxysilane.

In some examples, at least one portion or area of the coating exhibits a water contact angle of more than 90° after 24 hours exposure to an acid with negative pH.

In other examples, the acid is an aqueous solution of more than 30 percent hydrochloric acid.

In some examples, at least one portion or area of the coating exhibits a water contact angle of more than 90° after heating at 300° C. for 24 hours.

In other examples, a portion, area or all of the coating exhibits a self-healing property and protects the substrate against corrosion even if there is a scratch or indent on the coating.

In some embodiments, the coating does not exhibit hydrogen embrittlement as tested based on ASTM F519 standard.

In other examples, the coating exhibits Vickers Hardness between 600 to 850 as measured based on the ASTM E92-17 standard.

In some examples, the coating exhibits Taber wear index (TWI) between 2-20 as measured based on ASTM D4060.

In other embodiments, the coating does not exhibit hydrogen sulfide cracking based on NACE TM-0284 standard.

In further examples, the coating exhibits corrosion rating of 8 to 10 after 1000 hours exposure to a salt spray according to ASTM B 117 standard.

In some examples, the coating exhibits ductility value between 4% to 10% elongation as measured based on ASTM E8 standard.

In other embodiments, the coating exhibits chemical resistance in alkaline environment for at least 24 hours with the weight loss lower than 1 $mg/cm^2$.

In additional examples, the coating exhibits chemical resistance in organic solvent for at least 25 hours with weight loss lower than 1 $mg/cm^2$.

In some embodiments, the coating exhibits a pencil hardness of more than 9H according to ASTM D3363.

In further examples, the coating exhibits a wear factor between 0.1 to 6.0 ($10^{-5}$ $mm^3/Nm$) according to ASTM G99.

In some embodiments, the coating exhibits a coefficient of friction between 0.4-0.7 according to ASTM G99.

In another aspect, the coating can be present on a firearm component.

In an additional aspect, the coating can be present on an oven wall or oven surfaces.

In another aspect, the coating can be present on a cooktop.

In an additional aspect, the coating can be present on a cooking device.

In another aspect, the coating can be present on a pipe.

In an additional aspect, the coating can be present on a cooking vehicle component.

In another aspect, the coating can be present on a vehicle chassis.

In an additional aspect, the coating can be present on a ship hull.

In another aspect, the coating can be present on an exhaust system.

In an additional aspect, the coating can be present on a heat exchanger.

In another aspect, the coating can be present on an outdoor equipment article.

In an additional aspect, the coating can be present on an outdoor furniture article.

In another aspect, the coating can be present on an outdoor power equipment article.

In an additional aspect, the coating can be present on a semiconductor processing chamber.

In another aspect, the coating can be present on a wood article.

In an additional aspect, the coating can be present on a plastic article.

In another aspect, the coating can be present on a building frame.

In an additional aspect, the coating can be present on a bathroom apparatus.

In another aspect, the coating can be present on a bathroom apparatus configured to receive human waste, wherein at least one surface configured to receive the human waste comprises the coating.

In an additional aspect, the coating can be present on a sink fixture.

In another aspect, the coating can be present on a door handle.

In an additional aspect, the coating can be present on an indoor furniture article.

In another aspect, the coating can be present on an electronic device.

In an additional aspect, the coating can be present on an electronic device case.

In another aspect, the coating can be present on a razor or razor blade.

In an additional aspect, the coating can be present on a razor handle.

In another aspect, the coating can be present on a medical implant.

In an additional aspect, the coating can be present on an industrial mold.

In another aspect, the coating can be present on a gate valve.

In an additional aspect, the coating can be present on or in a pollution control system.

In another aspect, the coating can be present on a compressor blade.

In an additional aspect, the coating can be present on a turbine blade.

In another aspect, the coating can be present on a medical implant.

In an additional aspect, the coating can be present on an engine component.

In another aspect, the coating can be present on an oil or gas industry component In an additional aspect, the coating can be present on an any mechanical component described herein.

In another aspect, an article comprising a coating disposed on a substrate, wherein the coating comprises an electrodeposited layer comprising a transition metal alloy comprising at least two transition metals, wherein the coating further comprises a surface layer disposed on the electrodeposited layer, and wherein the surface layer is produced using a silane system is described.

In an additional aspect, an oven comprising an oven cavity coupled to a door, the oven cavity comprising a back wall, a top wall, a bottom wall and sidewalls, wherein the top wall is coupled to the sidewalls and the sidewalls are coupled to the bottom wall to form the oven cavity, wherein at least one surface of one of the back wall, a top wall, a bottom wall and sidewalls comprises a coating comprising an electrodeposited layer comprising a transition metal alloy comprising at least two transition metals, wherein the coating further comprises a surface layer disposed on the electrodeposited layer, wherein the surface layer is produced using a silane system is provided.

In another aspect, a cooktop comprising at least one burner element, the cooktop comprising a coating comprising an electrodeposited layer comprising a transition metal alloy comprising at least two transition metals, wherein the coating further comprises a surface layer disposed on the electrodeposited layer, wherein the surface layer is produced using a silane system is described.

In an additional aspect, a pipe comprising an inlet, an outlet and a body between the inlet and the outlet, wherein at least one internal or external surface of the pipe comprises a coating comprising an electrodeposited layer comprising a transition metal alloy comprising at least two transition metals, wherein the coating further comprises a surface layer disposed on the electrodeposited layer, wherein the surface layer is produced using a silane system is disclosed.

In another aspect, tubing coil comprising a plurality of coils coupled to each other, wherein the coil comprises an internal fluid path to permit passage of a fluid from an inlet of the coil to an outlet of the coil, wherein at least one internal or external surface of the tubing coil comprises a coating comprising an electrodeposited layer comprising a transition metal alloy comprising at least two transition metals, wherein the coating further comprises a surface layer disposed on the electrodeposited layer, wherein the surface layer is produced using a silane system is provided.

In another aspect, a vehicle chassis comprising structural members coupled to each other, wherein at least one internal or external surface of the vehicle chassis comprises a coating comprising an electrodeposited layer disposed on the at least one internal or external surface, wherein the electrodeposited layer comprises a transition metal alloy comprising at least two transition metals, wherein the coating further comprises a surface layer disposed on the electrodeposited layer, wherein the surface layer is produced using a silane system is described.

In an additional aspect, a ship hull comprising an exterior surface, the exterior surface of the ship hull comprising a coating comprising an electrodeposited layer disposed on the exterior surface, the electrodeposited layer comprising a transition metal alloy comprising at least two transition metals, wherein the coating further comprises a surface layer disposed on the electrodeposited layer, wherein the surface layer is produced using a silane system is provided.

In another aspect, an exhaust system comprising an inlet and an outlet and exhaust tubing between the inlet and the outlet, wherein at least one internal or external surface of the exhaust system comprises a coating comprising an electrodeposited layer disposed on the at least one internal or external surface, wherein the electrodeposited layer comprises a transition metal alloy comprising at least two transition metals, wherein the coating further comprises a surface layer disposed on the electrodeposited layer, wherein the surface layer is produced using a silane system is disclosed.

In an additional aspect, a heat exchanger comprising an internal fluid circuit thermally coupled to a plurality of cooling fins, wherein at least one internal or external surface of the internal fluid circuit or the cooling fins comprises a coating comprising an electrodeposited layer disposed on the at least one internal or external surface, wherein the electrodeposited layer comprises a transition metal alloy comprising at least two transition metals, wherein the coating further comprises a surface layer disposed on the electrodeposited layer, wherein the surface layer is produced using a silane system is provided.

In an additional aspect, an outdoor equipment article comprising a metal frame, wherein the metal frame comprises a coating comprising an electrodeposited layer disposed on a surface of the metal frame, wherein the electrodeposited layer comprises a transition metal alloy comprising at least two transition metals, wherein the coating further comprises a surface layer disposed on the electrodeposited layer, wherein the surface layer is produced using a silane system is described.

In another aspect, an outdoor furniture article comprising a metal frame, wherein the metal frame comprises a coating comprising an electrodeposited layer disposed on a surface of the metal frame, wherein the electrodeposited layer comprises a transition metal alloy comprising at least two transition metals, wherein the coating further comprises a surface layer disposed on the electrodeposited layer, wherein the surface layer is produced using a silane system is disclosed.

In an additional aspect, an outdoor power equipment article comprising a metal frame coupled to an engine or a motor, wherein the metal frame comprises a coating comprising an electrodeposited layer disposed on a surface of the metal frame, wherein the electrodeposited layer comprises a transition metal alloy comprising at least two transition metals, wherein the coating further comprises a surface layer disposed on the electrodeposited layer, wherein the surface layer is produced using a silane system is disclosed.

In another aspect, a semiconductor processing chamber comprising a back wall, a top wall, a bottom wall and sidewalls, wherein the top wall is coupled to the sidewalls and the sidewalls are coupled to the bottom wall to form the processing chamber, wherein at least one surface of the processing chamber comprises a coating comprising an electrodeposited layer comprising a transition metal alloy comprising at least two transition metals, wherein the coating further comprises a surface layer disposed on the electrodeposited layer, wherein the surface layer is produced using a silane system is provided.

In an additional aspect, a wood article comprising a substrate comprising cellulose fibers, wherein at least one surface of the substrate comprises a coating comprising an electrodeposited layer comprising a transition metal alloy comprising at least two transition metals, wherein the coating further comprises a surface layer disposed on the electrodeposited layer, wherein the surface layer is produced using a silane system is disclosed.

In an additional aspect, a plastic article comprising a substrate comprising at least one polymer, wherein at least one surface of the substrate comprises a coating comprising an electrodeposited layer comprising a transition metal alloy comprising at least two transition metals, wherein the coating further comprises a surface layer disposed on the electrodeposited layer, wherein the surface layer is produced using a silane system is provided.

In another aspect, a building frame comprising a plurality of structural members coupled to each other, wherein at least one surface of one of the plurality of structural members comprises a coating comprising an electrodeposited layer comprising a transition metal alloy comprising at least two transition metals, wherein the coating further comprises a surface layer disposed on the electrodeposited layer, wherein the surface layer is produced using a silane system is described.

In an additional aspect, a bathroom apparatus comprising a water inlet and a water outlet and a receptacle between the water inlet and the water outlet, wherein at least one surface of the bathroom apparatus comprises a coating comprising an electrodeposited layer comprising a transition metal alloy comprising at least two transition metals, wherein the coating further comprises a surface layer disposed on the electrodeposited layer, wherein the surface layer is produced using a silane system is provided.

In another aspect, a bathroom apparatus configured to receive human waste, wherein at least one surface configured to receive the human waste comprises a coating comprising an electrodeposited layer comprising a transition metal alloy comprising at least two transition metals, wherein the coating further comprises a surface layer disposed on the electrodeposited layer, wherein the surface layer is produced using a silane system is provided.

In an additional aspect, a sink fixture comprising a coating comprising an electrodeposited layer comprising a transition metal alloy comprising at least two transition metals, wherein the coating further comprises a surface layer disposed on the electrodeposited layer, wherein the surface layer is produced using a silane system is disclosed.

In another aspect, a door handle comprising a coating comprising an electrodeposited layer comprising a transition metal alloy comprising at least two transition metals, wherein the coating further comprises a surface layer disposed on the electrodeposited layer, wherein the surface layer is produced using a silane system is provided.

In an additional aspect, an indoor furniture article comprising at least one surface, wherein the at least one surface comprises a coating comprising an electrodeposited layer comprising a transition metal alloy comprising at least two transition metals, wherein the coating further comprises a surface layer disposed on the electrodeposited layer, wherein the surface layer is produced using a silane system is disclosed.

In another aspect, an electronic device comprising a housing and a processor in the housing, wherein at least one surface of the electronic device comprises a coating comprising an electrodeposited layer comprising a transition metal alloy comprising at least two transition metals, wherein the coating further comprises a surface layer disposed on the electrodeposited layer, wherein the surface layer is produced using a silane system is described.

In an additional aspect, an electronic device case configured to receive an electronic device, wherein at least one surface of the electronic device case comprises a coating comprising an electrodeposited layer comprising a transition metal alloy comprising at least two transition metals, wherein the coating further comprises a surface layer disposed on the electrodeposited layer, wherein the surface layer is produced using a silane system is provided.

In an additional aspect, a razor comprising at least one razor blade comprising a coating comprising an electrodeposited layer comprising a transition metal alloy comprising at least two transition metals, wherein the coating further comprises a surface layer disposed on the electrodeposited layer, wherein the surface layer is produced using a silane system is provided.

In another aspect, a razor comprising a handle comprising a coating comprising an electrodeposited layer comprising a transition metal alloy comprising at least two transition metals, wherein the coating further comprises a surface layer disposed on the electrodeposited layer, wherein the surface layer is produced using a silane system is described.

In an additional aspect, a medical implant configured to be inserted into a body of a mammal, the medical implant comprising a coating comprising an electrodeposited layer comprising a transition metal alloy comprising at least two transition metals, wherein the coating further comprises a surface layer disposed on the electrodeposited layer, wherein the surface layer is produced using a silane system is provided.

In an additional aspect, an industrial mold comprising a cavity configured to receive material and provide a molded article, wherein at least one surface of the industrial mold comprises a coating comprising an electrodeposited layer comprising a transition metal alloy comprising at least two transition metals, wherein the coating further comprises a surface layer disposed on the electrodeposited layer, wherein the surface layer is produced using a silane system is provided.

In another aspect, a gate valve comprising an inlet, an outlet and a gate configured to control fluid flow from the inlet to the outlet, wherein at least one surface of the gate valve comprises a coating comprising an electrodeposited layer comprising a transition metal alloy comprising at least two transition metals, wherein the coating further comprises a surface layer disposed on the electrodeposited layer, wherein the surface layer is produced using a silane system is described.

In an additional aspect, a pollution control system comprising pollution control means configured to adsorb a pollutant, wherein at least one surface of the pollution control system comprises a coating comprising an electrodeposited layer comprising a transition metal alloy comprising at least two transition metals, wherein the coating further comprises a surface layer disposed on the electrodeposited layer, wherein the surface layer is produced using a silane system is provided.

In another aspect, a compressor or turbine device comprising blade comprising a coating comprising an electrodeposited layer comprising a transition metal alloy comprising at least two transition metals, wherein the coating further comprises a surface layer disposed on the electrodeposited layer, wherein the surface layer is produced using a silane system is provided.

In an additional aspect, a method of producing a first coating on a substrate is described. The method can comprise depositing the first coating on a portion or an entire surface using an electrochemical process that results in the deposition of metals or metallic compounds, wherein the deposited first coating comprises at least one refractory metal, at least one refractory metal oxide or other compounds of a refractory metal and at least one transition metal, at least one transition metal oxide or other compounds of a transition metal, and wherein with deposited first coating comprises a hardness of more than 600 Vickers Hardness (HV), as measured based on the ASTM E92-17 standard, and with resistance in a strong acid with negative pH with corrosion rate of less than 20 mils/year.

In certain examples, the electrochemical process is selected from the group consisting of electrodeposition process, electroplating, electroless deposition process, autocatalytic plating, plating, and combinations thereof. In other examples, the electrochemical process is followed by at least one other process selected from the group consisting of annealing, thermal processing, hydrogen bake relief, vacuum conditioning, aging, plasma etching, grit blasting, wet etching, ion milling, exposure to electromagnetic radiation, and combinations thereof. In some examples, the annealing is performed at 300 deg. C. to 600 deg. C. for 1 hour to 6 hours. In some examples, the hydrogen bake relief is performed at 190 deg. C. to 220 deg. C. for 8 to 24 hours.

In certain embodiments, the method comprises depositing the first coating on top of a second coating comprising one or more transition metals.

In other embodiments, the method comprises depositing the second coating on the substrate prior to depositing the first coating on the second coating, wherein both the first and second coatings are electrodeposited using one bath.

In other examples, the first and second coatings are electrodeposited using two separate baths.

In some examples, an existing industrial electroplating process is used for making the second layer. For example, existing electro-plating processes include, but are not limited to, Watts nickel plating, nickel sulfamate plating, electroless nickel plating, zinc plating, chromating, phosphating, black oxide plating, copper plating, acid copper plating, cyanide copper plating, fluoborite plating, pyrophosphate plating, alkaline noncyanide copper plating, decorative nickel plating, semi-bright nickel plating, bright nickel plating, high sulfur nickel plating, satin nickel plating, sulfamate strike, decorative chromium plating, functional chromium plating, tin free steel plating, cadmium plating, silver plating, palladium plating, palladium-nickel plating, ruthenium plating, electroless copper plating, anodization, nickel sulfate plating, and combination thereof.

In some embodiments, the electrochemical process is performed in an aqueous solution comprising at least one negatively-charged ion selected from the group consisting of bromide (Br), carbonate ($CO_3^-$), hydrogen carbonate ($HCO_3^-$), chlorate ($ClO_3^-$), chromate ($CrO_4^-$), cyanide ($CN^-$), dichromate ($Cr_2O_7^{2-}$), dihydrogenphosphate ($H_2PO_4^-$), fluoride ($F^-$), hydride ($H^-$), hydrogen phosphate ($HPO_4^{2-}$), hydrogen sulfate or bisulfate ($HSO_4^-$), hydroxide ($OH^-$), iodide ($I^-$), nitride ($N^{3-}$), nitrate ($NO_3^-$), nitrite ($NO_2^-$), oxide ($O_2^-$), permanganate ($MnO_4^-$), peroxide ($O2^{2-}$), phosphate ($PO_4^{3-}$), sulfide ($S^{2-}$), thiocyanate ($SCN^-$), sulfite ($SO_3^{2-}$), sulfate ($SO_4^{2-}$), chloride ($Cl^-$), boride ($B^{3-}$), borate ($BO_3^{3-}$), disulfide ($S_2^{2-}$), phosphanide ($PH_2^-$), phosphanediide ($PH^{2-}$), superoxide ($O_2^-$), ozonide ($O_3^-$), triiodide ($I_3^-$), dichloride ($Cl_2^-$), dicarbide ($C_2^{2-}$), azide ($N_3^-$), pentastannide ($Sn_5^{2-}$), nonaplumbide ($Pb_9^{4-}$), azanide or dihydridonitrate ($NH_2^-$), germanide ($GeH_3^-$), sulfanide ($HS^-$), sulfanuide ($H_2S^-$), hypochlorite ($ClO^-$), hexafluoridophosphate ($[PF_6]^-$), tetrachloridocuprate(II) ($[CuCl_4]^{2-}$), tetracarbonylferrate ($[Fe(CO)_4]^{2-}$), tetrafluoroborate ($[BF_4]^-$), Bis(trifluoromethylsulfonyl)imide ($[NTf_2]^-$), trifluoromethanesulfonate ($[TfO]^-$), Dicyanamide $[N(CN)_2]^-$, methylsulfate $[MeSO_4]^-$, dimethylphosphate $[Me_2PO_4]^-$, acetate $[MeCO_2]^-$, complexing or chelating agents such as citrate ($C_6H_5O_7^{3-}$), gloconate ($C_6H_{11}O_7^-$), acetate ($CH_3COO^-$); molybdate ($MoO_4^{2-}$), sulfamate ($H_2NSO_3^{2-}$), zirconates ($ZrO4^{2-}$), and combinations thereof.

In other embodiments, the electrochemical process is performed in an aqueous solution comprising at least one positively-charged ion selected from the group consisting of ammonium ($NH_4^+$), sodium ($Na^+$), ions of transition metals or refractory metals, Hydrogen ($H^+$), phosphonium ($PH_4^+$), and combinations thereof.

In further embodiments, the electrochemical process is performed in an aqueous solution comprising at least one additive selected from the group consisting of thiourea, acetone, ethanol, cadmium ion, chloride ion, stearic acid, ethylenediamine dihydrochloride (EDA), saccharin, cetyltrimethylammonium bromide (CTAB), sodium dodecyl sulfate, sodium lauryl sulfate (SLS), saccharine, naphthalene sulfonic acid, benzene sulfonic acid, coumarin, ethyl vanillin, ammonia, ethylene diamine, polyethylene glycol (PEG), bis(3-sulfopropyl)disulfide (SPS), Janus green B (JGB), azobenzene-based surfactant (AZTAB), the polyoxyethylene family of surface active agents, sodium citrate, perfluorinated alkylsulfate, additive K, calcium chloride, ammonium chloride, potassium chloride, boric acid, myristic acid, choline chloride, citric acid, any redox active surfactant, any conductive ionic liquids, any wetting agents, surfactants, any leveling agent, any defoaming agent, any emulsifying agent, brighteners, different amines, or any combination thereof.

In some examples, the wetting agent comprises one or more of polyglycol ethers, polyglycol alcohols, sulfonated oleic acid derivatives, sulfate form of primary alcohols, alkylsulfonates, alkylsulfates, aralkylsulfonates, sulfates, Perfluoro-alkylsulfonates, acid alkyl and aralkyl-phosphoric acid esters, alkylpolyglycol ether, alkylpolyglycol phosphoric acid esters or their salts, or any combination thereof.

In other examples, the leveling agent comprises one or more of N-containing and optionally substituted and/or quaternized polymers, such as polyethylene imine and its derivatives, polyglycine, poly(allylamine), polyaniline (sulfonated), polyvinylpyrrolidone, polyvinylpyridine, polyvinylimidazole, polyurea, polyacrylamide, poly(melamine-co-formaldehyde), polyalkanolamines, polyaminoamide and derivatives thereof, polyalkanolamine and derivatives thereof, polyethylene imine and derivatives thereof, quaternized polyethylene imine, poly(allylamine), polyaniline, polyurea, polyacrylamide, poly(melamine-co-formaldehyde), reaction products of amines with epichlorohydrin, reaction products of an amine, epichlorohydrin, and polyalkylene oxide, reaction products of an amine with a polyepoxide, polyvinylpyridine, polyvinylimidazole, polyvinylpyrrolidone, or copolymers thereof, nigrosines, pentamethyl-para-rosaniline, or any combination thereof in the amount of 1 g/L to 40 g/L.

In further examples, the defoaming agent comprises one or more of fats, oils, long chained alcohols, or glycols, polyethylene glycols, polyethylene oxides such as Tritons, alkylphosphates, metal soaps, special silicone defoamers, commercial perfluoroalkyl-modified hydrocarbon defoamers and perfluoroalkyl-substituted silicones, fully fluorinated alkylphosphonates, perfluoroalkyl-substituted phosphoric acid esters, or any combination thereof.

In some embodiments, the emulsifying agent comprises one or more of cationic-based agents, amphoteric-based agents, and nonionic-based agent; chelating agents such as citrates, acetates, gluconates, and ethylenediaminetetraacetic acid (EDTA); or any combination thereof.

In other examples, the electrochemical process is performed in an aqueous solution comprising at least one nickel salt, and the total concentration of nickel ion in the aqueous solution is between 5 g/L to 100 g/L.

In some embodiments the electrochemical process is performed in an aqueous solution comprising at least one molybdenum salt, and the total concentration of molybdenum ion in the aqueous solution is between 0.5 g/L to 100 g/L.

In other examples, the electrochemical process is performed in an aqueous solution with pH of 6 to 11.

In some embodiments, the electrochemical process is performed in an aqueous solution with temperature of 20 deg. C. to 90 deg. C.

In another aspect, an anti-corrosion article comprises a substrate and a surface coating. In some examples, the substrate comprises an electrodeposited coating, in which the electrodeposited coating comprises a transition metal alloy comprising at least two transition metals. In other examples, the surface coating is disposed on the electrodeposited coating and comprises a reaction product of a silane system and the electrodeposited coating.

In some embodiments, the silane system comprises a functionalized silanol group containing material. In other embodiments, the silane system comprises an aqueous, alcohol-free product of an epoxysilane.

In further embodiments, the electrodeposited coating comprises a Nickel alloy comprising Nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium.

In other embodiments, the electrodeposited coating comprises a Nickel alloy comprising Nickel in combination with only one other transition metal, wherein the only one other transition metal is one of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium.

In additional embodiments, the electrodeposited coating comprises a Zinc alloy comprising Zinc in combination with one or more of Scandium, Titanium, Vanadium, Chromium, Manganese, Iron, Cobalt, Copper, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium.

In some examples, the electrodeposited coating comprises a Zinc alloy comprising Zinc in combination with only one other transition metal, wherein the only one other transition metal is one of Scandium, Titanium, Vanadium, Chromium, Manganese, Iron, Cobalt, Copper, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium.

In other examples, the electrodeposited coating comprises a Copper alloy comprising Copper in combination with one or more of Scandium, Titanium, Vanadium, Chromium, Manganese, Iron, Cobalt, Zinc Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium.

In additional examples, the electrodeposited coating comprises a Copper alloy comprising Copper in combination with only one other transition metal, wherein the only one other transition metal is one of Scandium, Titanium, Vanadium, Chromium, Manganese, Iron, Cobalt, Zinc, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium.

In further instances, the electrodeposited coating comprises a textured layer.

Additional aspects, features, examples and embodiments are described in more detail below.

BRIEF DESCRIPTION OF THE SEVERAL VIEWS OF THE DRAWINGS

Certain compositions and articles are described below with reference to the accompanying figures in which:

FIGS. 20A, 20B and 20C are illustration of oil or gas industry components, in accordance with some examples;

FIGS. 33A and 33B are photographs image of two of coatings before (FIG. 33A) and after (FIG. 33B) ductility testing;

FIG. 34 is a microscopic image showing elongation of a coating;

DETAILED DESCRIPTION

Certain embodiments described herein may comprise a surface coating disposed on at least some portion of an underlying coating or underlying electrodeposited coating. The presence of the two or more coatings can provide desirable attributes including enhanced retention of the surface coating, anti-corrosion properties, hydrophobicity and other properties and combinations of these properties. The exact materials present in the various coating layers and substrate layers may vary and illustrative materials are described in more detail below. For example, the coating may comprise (i) at least one refractory metal, at least one refractory metal oxide or at least one other compound comprising a refractory metal and (ii) at least one transition metal, at least one transition metal oxide or at least one other compound comprising a transition metal.

In some instances, one or more additional coatings can be present between a coating, e.g., an electrodeposited coating, and a surface coating or between the coating and the substrate or between any two of the coatings or layers described herein. If desired, two different types of surface coating materials can be deposited or co-deposited onto the coatings, e.g., can be deposited into electrodeposited coatings. Illustrative types of surface coatings, electrodeposited coatings, substrates and articles are described in more detail below, and additional surface coatings, electrodeposited coatings, substrates and articles will be selected by the person of ordinary skill in the art, given the benefit of this specification. While various surface coatings are described as comprising certain materials, the surface coatings are generally the reaction products which result after addition of the surface coating material to an underlying substrate or coating.

In some instances, the term "layer" is used in place of, or in addition to, the term coating. Where the coating comprises multiple different materials, the various materials may be referred to as being present as layers in the coating to increase the overall clarity and facilitate an easier description of the various materials present in the coatings. The layer need not cover an entire surface of the substrate and may instead only be present on certain areas of portions of the substrate. An interface typically is present between layers as a distinguishing feature that separates two or more layers.

Surface Coatings

Figure 1A:
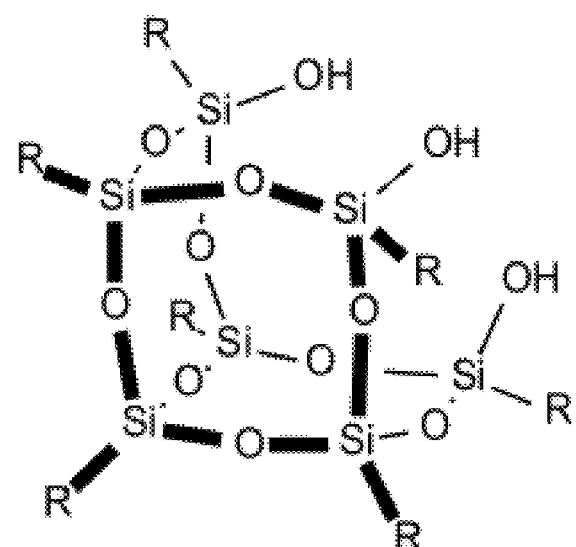
FIG. 1A is an illustration of a silanol group, in accordance with certain examples.

In certain examples, the surface coatings used on the articles described herein typically comprise one or more silane, silanol or silicon based groups that are functionalized to permit reaction with the underlying electrodepositing coating. These materials are collectively referred to herein as a "silane system." As noted herein, the surface coating can be produced by exposing a surface of a substrate or another coating to one or more silane, silanol or silicon based groups that are functionalized to permit reaction of the one or more silane, silanol or silicon based groups that are functionalized with the underlying substrate and/or any underlying coating. For example, the functionalized groups may comprise one or more side chain functionalities which can form a covalent bond with one or more of the transition metal species present in the substrate and/or electrodeposited coating. A generalized structure of one suitable material is shown in FIG. 1A. The silanol group shown in FIG. 1A comprises one or more reactive oxygen groups and/or silicon groups that can covalently bond to a metal of an underlying coating material. In other instances, the side chain R groups of the silanol containing material may covalently bond to a metal of an underlying coating material. In other instances, a metal complex can be formed with the metal center coordinating one or more of unpaired electron groups of the silanol containing material. The exact nature of the R groups in the formula shown in FIG. 1A can vary and different R groups may be the same or different. For example, in some instances, the R groups may comprise an alkyl group comprising one to twelve carbon atoms, an alkenyl group comprising two to twelve carbon atoms or an alkynyl group comprising two to twelve carbon atoms. In other instances, the R groups may comprise a fluoroalkyl comprising one to twelve carbon atoms, a fluoroalkenyl group comprising two to twelve carbon atoms or a fluoroalkynyl group comprising two to twelve carbon atoms. In further instances, the R group may comprise a fluoro-group other than fluoroalkyl, fluoroalkenyl or fluoroalkynyl, e.g., the R group may be fluorine itself or comprise fluoroaromatic groups. Without wishing to be bound by any particular theory, the presence of one or more silanol groups in the materials used to provide the surface coating can chemically bond the surface coating to the underlying substrate or underlying electrodeposited coating. For example, the formation of 2- and 3-dimensional siloxane networks with materials of the substrate or underlying coating can result in a high degree of surface occupancy by the surface coating materials. As noted below, where the surface coating material further comprises particles, the particles may pack into void space or pores formed by covalent reaction of the silanes and/or siloxanes with the underlying material to further enhance the surface coating. These particles can also bind to the siloxane network to enhance retention of the particles within the coating.

Figure 1B:
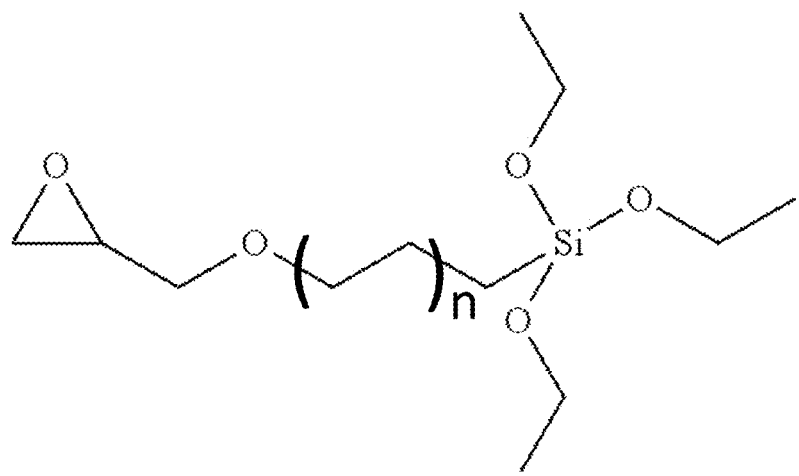
FIG. 1B is an illustration of an epoxysilane group, in accordance with some examples.

In some instances, the silane system used to provide the surface coating may comprise one or more epoxysilane groups such as the generalized epoxysilane shown in FIG. 1B where n may be, for example, one to six. Amino- and fluoro-derivatives of epoxysilane compounds may be particularly desirable for use to produce the surface coatings. In some embodiments, reaction products of one siloxane with an epoxysilane can be used to provide the surface coatings. For example, as noted below, reaction products that comprise an aqueous, alcohol-free reaction product of an epoxysilane can be used to provide the surface coatings. Various specific types of epoxysilane compounds and their reaction products are described, for example, in U.S. Pat. No. 8,889,812.

In certain examples, the surface coatings described herein may comprise, or be produced using, one or more water-soluble aminopolysiloxanes. Such aminopolysiloxanes can be produced, for example, by hydrolytic polymerization of a functionalized aminosilane salt followed by further functionalization with a functional alkyl salt. For examples, an aminosilane can be combined with a solution comprising an alkyl salt in an organic solvent to provide the functionalized aminopolysiloxane. In some examples, a mixture of 3-aminopropyltrialkoxysilane and bis(trialkoxysilylpropyl)amine in alcoholic solvents can be used to provide the aminopolysiloxane. In other examples, an aqueous solution of a water-soluble aminosilane and an alkyltrialkoxysilane can be combined to provide an aminopolysiloxane. In some instances, mixing of water-soluble aminoalkylalkoxysilanes with alkyltrialkoxysilanes and/or dialkyldialkoxysilanes can provide organopolysiloxane-containing compositions. In certain instances, aminoalkyltrialkoxysilanes and bissilylaminosilanes can be combined to provide an aminopolysiloxane. In some examples, bissilylaminosilanes and/or bissilylpolysulphanes can be combined in aqueous alcoholic solutions to provide an aminopolysiloxane. In certain embodiments, reaction products of aminosilanes which also contain small amounts of tris(trialkoxysilylpropyl)amines can be produced in alcohol solutions. While not required in every application, aminopolysiloxanes desirable for use in the surface coatings described herein may be stable up to about 600 degrees F. or more.

In other instances, the surface coating may be or may comprise, or be produced using, a silylakylamine such as those described in U.S. Pat. No. 8,889,812. For example, silane systems based on tris(alkoxysilylalkyl)amines can be used to provide a surface coating. In some examples, the silane systems may be substantially free or organic solvents and generally be water soluble to permit deposition without the use of toxic or harmful solvents. While not required in every application, silylalkylamines and alkoxysilylalkylamines desirable for use in the surface coatings described herein may be stable up to about 600 degrees F. or more to permit their use in high temperature applications where corrosive materials or gases might be encountered.

In certain examples, the surface coatings can be produced using a silane system comprising tris-silylated amino-functional silicon compounds and water, especially as a sol-gel system or an aqueous based solution. While not absolutely true in every case, tris-silylated amino-functional silicon compounds generally comprise amino compounds wherein at least one amino group having three silyl groups bonded to the nitrogen is present in one molecule. The silyl group in question is generally bonded to the nitrogen center by a bivalent alkyl unit, for example —$CH_2$—, —$(CH_2)_2$—, —$(CH_2)_3$—, —$CH_2[CH(CH_3)]CH$—, etc. In addition, the silyl groups may independently be the same or be different and, as well as "Si—OH" and/or "Si—O—Si" units, optionally have further functionalities, especially organo-functionalities or fluoro-functionalities.

In some examples, the surface coatings can be produced using silane compounds comprising alkoxysilanes or organoalkoxysilanes such as, for example, tris(triethoxysilylpropyl)amine (tris-AMEO). In certain examples, the surface coating may be produced using one or more silane systems comprising trisamino-functional alkoxysilanes, such as tris(triethoxysilane)-amine or tris(trimethoxysilane) amine, alkoxysilanes or organoalkoxysilane systems from the group of n-propyltriethoxysilane, n-propyltrimethoxysilane (PTMO), 3-glycidyloxypropyltriethoxysilane (GLYEO), 3-glycidyloxypropyltrimethoxysilane (GLYMO), 3-aminopropyltriethoxysilane (AMEO), 3-aminopropyltrimethoxysilane (AMMO), methacryloxypropyltriethoxysilane (MEEO), methacryloxypropyltrimethoxysilane (MEMO), N-(n-butyl)-3-aminopropyltriethoxysilane, vinyltrimethoxysilane (VTMO), N-(n-butyl)-3-aminopropyltrimethoxysilane (Dynasylan® 1189), 3-mercaptopropyltrimethoxysilane (MTMO), 3-mercaptopropyltriethoxysilane (MTEO), N-2-aminoethyl-3-aminopropyltrimethoxysilanes (DAMO), polyethylene glycol-functionalized alkoxysilanes, tetraethoxysilane (Dynasylan A), tetramethoxysilane (Dynasylan M), methyltriethoxysilane (MTES), methyltrimethoxysilane (MTMS), bis(triethoxysilylpropyl)tetrasulphane (Si 69), bis(triethoxysilylpropyl)-disulphane (Si 266), bis(trimethoxysilylpropyl)disulphane, bis(trimethoxysilylpropyl)tetrasulphane, vinyltriethoxysilane (VTEO), 1-aminomethyltriethoxysilyne, 1-aminomethyltrimethoxysilyne, 1-methacryloxymethyltrimethoxysilane, 1-methacryloxymethyltriethoxysilane, 1-mercaptomethyltriethoxysilane, 1-mercaptomethyltrimethoxysilane, isobutyltrimethoxysilane, isobutyltriethoxysilane, octyltriethoxysilane (Dynasylan® OTEO), octyltrimethoxysilane, hexadecyltriethoxysilane, hexadecyltrimethoxysilane, phenyltrimethoxysilane, phenyltriethoxysilane, 2-aminoethyl-3-aminopropylmethyldimethoxysilanes, 2-aminoethyl-3-aminopropylmethyldiethoxysilanes, ureidopropyltrimethoxysilane, ureidopropyltriethoxysilane, tridecafluorooctyltriethoxysilane, tridecafluorooctyltrimethoxysilane, organoalkoxysilylalkylsuccinic anhydride such as triethoxysilylpropylsuccinic anhydride, trimethoxysilylpropylsuccinic anhydride, methyldiethoxysilylpropylsuccinic anhydride, methyldimethoxysilylpropylsuccinic anhydride, dimethylethoxysilylpropylsuccinic anhydride, dimethylmethoxysilylpropylsuccinic anhydride—to name just a few examples, Dynasylan® 1151 (alcohol-free aminosilane hydrolysis product), Dynasylan® HS 2627 (alcohol-free cocondensate of aminosilane and alkylsilane), Dynasylan® HS 2776 (aqueous, alcohol-free cocondensate of diaminosilane and alkylsilane), Dynasylan® HS 2909 (aqueous, alcohol-free cocondensate of aminosilane and alkylsilane), Dynasylan® HS 2926 (aqueous, alcohol-free product based on epoxysilane), Dynasylan® SIVO 110 (aqueous, alcohol-free product of epoxysilane), bis(triethoxysilane)amine and/or bis(trimethoxysilane)amine.

In other instances, the surface coating may be produced using one or more silane systems based on co-condensates of trisamino-functional alkoxysilanes (e.g., such as tris(triethoxysilane)-amine or tris(trimethoxysilane)amine) with one or more of alkoxysilanes or organoalkoxysilane systems from the group of n-propyltriethoxysilane, n-propyltrimethoxysilane (PTMO), 3-glycidyloxypropyltriethoxysilane (GLYEO), 3-glycidyloxypropyltrimethoxysilane (GLYMO), 3-aminopropyltriethoxysilane (AMEO), 3-aminopropyltrimethoxysilane (AMMO), methacryloxypropyltriethoxysilane (MEEO), methacryloxypropyltrimethoxysilane (MEMO), N-(n-butyl)-3-aminopropyltriethoxysilane, vinyltrimethoxysilane (VTMO), N-(n-butyl)-3-aminopropyltrimethoxysilane (Dynasylan® 1189), 3-mercaptopropyltrimethoxysilane (MTMO), 3-mercaptopropyltriethoxysilane (MTEO), N-2-aminoethyl-3-aminopropyltrimethoxysilanes (DAMO), polyethylene glycol-functionalized alkoxysilanes, tetraethoxysilane (Dynasylan A), tetramethoxysilane (Dynasylan M), methyltriethoxysilane (MTES), methyltrimethoxysilane (MTMS), bis(triethoxysilylpropyl)tetrasulphane (Si 69), bis(triethoxysilylpropyl)-disulphane (Si 266), bis(trimethoxysilylpropyl)disulphane, bis(trimethoxysilylpropyl)tetrasulphane, vinyltriethoxysilane (VTEO), 1-aminomethyltriethoxysilyne, 1-aminomethyltrimethoxysilyne, 1-methacryloxymethyltrimethoxysilane, 1-methacryloxymethyltriethoxysilane, 1-mercaptomethyltriethoxysilane, 1-mercaptomethyltrimethoxysilane, isobutyltrimethoxysilane, isobutyltriethoxysilane, octyltriethoxysilane (Dynasylan® OTEO), octyltrimethoxysilane, hexadecyltriethoxysilane, hexadecyltrimethoxysilane, phenyltrimethoxysilane, phenyltriethoxysilane, 2-aminoethyl-3-aminopropylmethyldimethoxysilanes, 2-aminoethyl-3-aminopropylmethyldiethoxysilanes, ureidopropyltrimethoxysilane, ureidopropyltriethoxysilane, tridecafluorooctyltriethoxysilane, tridecafluorooctyltrimethoxysilane, organoalkoxysilylalkylsuccinic anhydride such as triethoxysilylpropylsuccinic anhydride, trimethoxysilylpropylsuccinic anhydride, methyldiethoxysilylpropylsuccinic anhydride, methyldimethoxysilylpropylsuccinic anhydride, dimethylethoxysilylpropylsuccinic anhydride, dimethylmethoxysilylpropylsuccinic anhydride—to name just a few examples, Dynasylan® 1151 (alcohol-free aminosilane hydrolysis product), Dynasylan® HS 2627 (alcohol-free cocondensate of aminosilane and alkylsilane), Dynasylan® HS 2776 (aqueous, alcohol-free cocondensate of diaminosilane and alkylsilane), Dynasylan® HS 2909 (aqueous, alcohol-free cocondensate of aminosilane and alkylsilane), Dynasylan® HS 2926 (aqueous, alcohol-free product based on epoxysilane), Dynasylan® SIVO 110 (aqueous, alcohol-free product of epoxysilane), bis(triethoxysilane)amine and/or bis(trimethoxysilane)amine. Additional co-condensates can be prepared, for example, from tris-AMEO/tris-AMMO and PTMO or with GLYMO or from tris-AMEO/tris-AMMO and AMEO, bis-AMEO, MEMO, VTMO, VTEO, Dynasylan® 1189, mercaptoalkylsilane, DAMO, TRIAMO, Dynasylan® 4144, Dynasylan A, alkyltrialkoxysilane, bis(trialkoxysilylalkyl)-polysulphane (for example Si69), bis(trialkoxysilylalkyl) disulphane (for example Si 266).

In certain instances, the surface coating can be produced using one or more of tris(trialkoxysilylalkyl)amine, tris-N,N'-(trialkoxysilylalkyl)alkylenediamine and/or tris-N,N'-(trialkoxysilylalkyl)dialkylenetriamine, especially tris(triethoxysilylpropyl)amine (N[(CH2)3Si(OC2H5)3]3, tris-AMEO), tris(trimethoxysilylpropyl)amine (N[(CH2)3Si(OCH3)3]3, tris-AMMO), tris-DAMO (N[(CH2)2NH(CH2)3Si(OCH3)3]3 and/or tris-TRIAMO (N[(CH2)2NH(CH2)2NH(CH2)3Si(OCH3)3]3) In other instances, the surface coating can be produced using one or more of .bis(trialkoxysilylalkyl)amine, bis-N,N'-(trialkoxysilylalkyl)alkylenediamine and/or bis-N,N'-(trialkoxysilylalkyl)dialkylenetriamine, especially bis(triethoxysilylpropyl)amine ((H5C2O)3Si(CH2)3NH(CH2)3Si(OC2H5)3, bis-AMEO), bis(trimethoxysilylpropyl)amine ((H3CO)3Si(CH2)3NH(CH2)3Si(OCH3)3, bis-AMMO), bis-DAMO ((H3CO)3Si(CH2)3NH(CH2)2NH(CH2)3Si(OCH3)3) and/or bis-TRIAMO ((H3CO)3Si(CH2)3NH(CH2)2NH(CH2)2NH(CH2)3Si(OCH3)3), bis(diethoxymethylsilylpropyl)amine, bis(dimethoxymethylsilylpropyl)amine, bis(triethoxysilylmethyl)amine, bis(trimethoxysilylmethyl)amine, bis(diethoxymethylsilylmethyl)amine, bis(dimethoxymethylsilylmethyl)amine, (H3CO)2(CH3)Si(CH2)3NH(CH2)2NH(CH2)3Si(OCH3)2(CH3) and/or (H3CO)3(CH3)Si(CH2)3NH(CH2)2NH(CH2)2NH(CH2)3Si(OCH3)2(CH3), particular preference being given to bis(triethoxysilylpropyl)amine ((H5C2O)3Si(CH2)3NH(CH2)3Si(OC2H5)3, bis-AMEO). In additional instances, the surface coating can be producing using one or more of aminopropyltrimethoxysilane (H2N(CH2)3Si(OCH3)3, AMMO), aminopropyltriethoxysilane (H2N(CH2)3Si(OC2H5)3, AMEO), diaminoethylene-3-propyltrimethoxysilane (H2N(CH2)2NH(CH2)3Si(OCH3)3, DAMO), triaminodiethylene-3-propyltrimethoxysilane (H2N(CH2)2NH(CH2)2NH(CH2)3Si(OCH3)3 (TRIAMO), aminopropylmethyldiethoxysilane, aminopropylmethyldimethoxysilane, 2-aminoethyltrimethoxysilane, 2-aminoethylmethyldimethoxysilane, 2-aminoethylphenyldimethoxysilane, 2-aminoethyltriethoxysilane, 2-aminoethylmethyldiethoxysilane, 2-aminoethyltriethoxysilane, (2-aminoethylamino)ethyltriethoxysilane, 6-amino-n-hexyltriethoxysilane, 6-amino-n-hexyltrimethoxysilane, 6-amino-n-hexylmethyldimethoxysilane, and especially 3-amino-n-propyltrimethoxysilane, 3-amino-n-propylmethyldimethoxysilane, 3-amino-n-propyltriethoxysilane, 3-amino-n-propylmethyldiethoxysilane, 1-aminomethyltriethoxysilane, 1-aminomethylmethyldiethoxysilane, 1-aminomethyltrimethoxysilane, 1-aminomethylmethyldiethoxysilane, N-butyl-3-aminopropyltriethoxysilane, N-butyl-3-aminopropylmethyldiethoxysilane, N-butyl-3-aminopropyltrimethoxysilane, N-butyl-3-aminopropylmethyldimethoxysilane, N-butyl-1-aminomethyltriethoxysilane, N-butyl-1-aminomethylmethyldimethoxysilane, N-butyl-1-aminomethyltrimethoxysilane, N-butyl-1-aminomethylmethyltriethoxysilane, N-cyclohexyl-1-aminomethylmethyltriethoxysilane, N-cyclohexyl-1-aminomethylmethyltrimethoxysilane, N-phenyl-1-aminomethylmethyltriethoxysilane, N-phenyl-1-aminomethylmethyltrimethoxysilane, N-formyl-3-aminopropyltriethoxysilane, N-formyl-3-aminopropyltrimethoxysilane, N-formyl-1-aminomethylmethyldimethoxysilane and/or N-formyl-1-aminomethylmethyldiethoxysilane or mixtures thereof.

In further examples, the surface coating can be produced using one or more of propyltrimethoxysilane (PTMO), dimethyldimethoxysilane (DMDMO), dimethyldiethoxysilane, methyltriethoxysilane (MTES), propylmethyldimethoxysilane, propylmethyldiethoxysilane, n-octylmethyldimethoxysilane, n-hexylmethyldimethoxysilane, n-hexylmethyldiethoxysilane, propylmethyldiethoxysilane, propylmethyldiethoxysilane, propyltriethoxysilane, isobutyltrimethoxysilane, isobutyltriethoxysilane, octyltrimethoxysilane, octyltriethoxysilane, n-hexyltriethoxysilane, cyclohexyltriethoxysilane, n-propyl-tri-n-butoxysilane, n-propyltrimethoxysilane, n-propyltriethoxysilane, isobutyltriethoxysilane, hexadecyltriethoxysilane, hexadecyltrimethoxysilane, octadecyltriethoxysilane, octadecyltrimethoxysilane, octadecylmethyldiethoxysilane, octadecylmethyldimethoxysilane, hexadecylmethyldimethoxysilane and/or hexadecylmethyldiethoxysilane and mixtures of these silanes. In other instances, the surface coating can be produced using one or more of 3-glycidoxypropyltrialkoxysilane, as the triethoxy- or trimethoxysilane; epoxycyclohexyltrialkoxysilane, as the triethoxy- or trimethoxysilane.

In some examples, the surface coating can be produced using an organofunctionalized alkoxysilane compound such as, for example, bis(triethoxysilylpropyl)disulphane (Si 266), bis(trimethoxysilylpropyl)disulphane, bis(triethoxysilylpropyl)tetrasulphane (Si 69), bis(trimethoxysilylpropyl)tetrasulphane, bis(triethoxysilylmethyl)disulphane, bis(trimethoxysilylmethyl)disulphane, bis(triethoxysilylpropyl)disulphane, bis(diethoxymethylsilylpropyl)disulphane, bis(dimethoxymethylsilylpropyl)disulphane, bis(dimethoxymethylsilylmethyl)disulphane, bis(diethoxymethylsilylmethyl)disulphane, bis(diethoxymethylsilylpropyl)tetrasulphane, bis(dimethoxymethylsilylpropyl)tetrasulphane, bis(dimethoxymethylsilylmethyl)-tetrasulphane, bis(diethoxymethylsilylmethyl)tetrasulphane, 3-mercaptopropyltrimethoxysilane, 3-mercaptopropyltriethoxysilane, tetramethoxysilane or tetraethoxysilane.

In other examples, the surface coating can be produced using one or more fluorosilane systems including, but not limited to, tridecafluoro-1,1,2,2-tetrahydrooctyl-1-trimethoxysilane, tridecafluoro-1,1,2,2-tetrahydrooctyl-1-triethoxysilane or corresponding mixtures comprising silanes derived therefrom, or 3,3,3-trifluoropropyltrimethoxysilane, 3,3,3-trifluoropropylmethyldimethoxysilane, 3,3,3-trifluoropropylmethyldimethoxysilane, 3,3,3-trifluoropropylcyclohexyldimethoxysilane, 3,3,3-trifluoropropylphenyldiethoxysilane, 3,3,3-trifluoropropyltriethoxysilane, 3,3,3,2,2-pentafluoropropylmethyldimethoxysilane, 3,3,3-trifluoropropyloxyethyltrimethoxysilane, 3,3,3-trifluoropropylmercaptoethyltrimethoxysilane, 3,3,3-trifluoropropyloxyethylmethyldimethoxysilane, and especially tridecafluoro-1,1,2,2-tetrahydrooctyltrimethoxysilane and tridecafluoro-1,1,2,2-tetrahydrooctyltriethoxysilane, and also acryloyloxypropyltrialkoxysilane, methacryloyloxypropyltrialkoxysilane, where the alkoxy radical can be replaced by methoxy, ethoxy or else propoxy radicals. Suitable compounds are likewise methacryloyloxymethyltriethoxysilane, methacryloyloxymethyltrimethoxysilane, methacryloyloxypropylmethyldiethoxysilane, methacryloyloxypropylmethyldimethoxysilane, methacryloyloxypropylmethyldiethoxysilane, methacryloyloxymethylmethyldiethoxysilane and/or methacryloyloxymethylmethyldimethoxysilane and/or mixtures of any of these compounds.

In certain examples, the surface coating materials described herein can be produced, for example, by mixing a siloxane, organosiloxane, aminosiloxane, siloxane precursor, or aminosiloxane precursor (or combinations thereof) with water, and a catalyst to promote a sol-gel reaction to form a solution having particles. If desired, the sol-gel reaction can be performed without using any organic solvent. Chemical modification of the resulting particles can be performed, for example, by reacting a hydrophobic agent with the particles to provide surface-modified particles. If desired, a surfactant can be added to the surface-modified particles to provide a surface coating material that may be hydrophobic depending on the particular surface modifications performed. The siloxane precursor may comprise, for example, one or more —SiOR or —SiOH functional groups, wherein R is $C_nH_{2n+1}$, and n is a positive integer. In some instances, R may comprise at least one fluoro group or at least one amino group or both. Examples for the siloxane precursor may be tetramethoxysilane (TMOS), tetrathoxysilane (TEOS), titanium tetraisopropoxide, titanium tetramethoxide, titanium tetraethoxide, titanium tetrabutoxide, aluminum tri-sec-butoxide, or zirconium n-butoxide and fluorinated derivatives of these precursors and amino derivatives of these precursors. The catalyst may be, for example, organic acid/base or inorganic acid/base, such as hydrochloric acid, sulfuric acid, nitric acid, acetic acid, potassium hydroxide, sodium hydroxide, ammonium, or the like. Where surface modification occurs, the surface modifying agent may comprise a siloxane, a fluorosiloxane, an aminosiloxane, an aminofluorosiloxane, a silane, a fluorosilane, an aminosilane, an aminofluorosilane, silicone, or combinations thereof. Examples of the fluorine-base surface modifying agents include, but are not limited to, fluorosilane, fluoroalkysilane, polytetrafluoroethylene (PTFE), polytrifluoroethylene, polyvinylfluroride, functional fluoroalkyl compound, 1H,1H,2H,2H-perfluorodecyltriethoxysilane or combinations thereof. Where s surfactant is present, the surface may be an anion surfactant, a cation surfactant, a combination of an anion surfactant and a cation surfactant, a combination of an anion surfactant and a non-ionic surfactant, a combination of anion surfactant and an amphoteric surfactant, or combinations thereof.

In some examples, the surface coating materials may comprise, or be produced using, a combination of organofunctional silanes and functionalized particles such as functionalized silicon dioxide particles. In certain instances, the organofunctional silane may comprise amino-functionalities, fluoro-functionalities or both. Similarly, the functionalized silicon dioxide particles may comprise amino-functionalities, fluoro-functionalities or both. In some examples, one or both of the organofunctional silane and functionalized silicon dioxide particles may comprise a silanol group as noted generically in FIG. 1A. In addition to any reactive silanol groups that may be present on the organofunctional silane and/or functionalized silicon dioxide particles, one or more epoxy groups may also be present and bonded to the silicon centers present in the organofunctional silane and/or the functionalized silicon dioxide particles. In other instances, one or more reactive epoxysilane groups as shown generically in FIG. 1B may be present in the surface coating materials or used to produce the surface coatings.

In some instances, the surface coating may be a fluorine containing material as described for example in WO2017/112724, e.g., may be or may comprise hollow poly(vinylidene difluoride) microspheres. Additional fluorine containing materials such as polytetrafluoroethylene and other fluoropolymers may also be present as part of the materials used to provide the surface coating.

In some configurations, the surface coating is typically disposed on the textured coating using a non-electrodeposition process, such as, for example, spraying, brushing, dipping, spreading, jet coating, sol gel processing or other processes. In some examples, the average particle size of the surface coating, prior to disposition, may be about 50% less, 40% less, 30% less or 25% less than a first size, e.g., the average characteristic length, of the microstructures of the electrodeposited coating. For example, an electrodeposited coating (or other coating) may be electrodeposited onto the substrate, and SEM images or other suitable techniques can be used to determine an average characteristic length of the microstructures of the electrodeposited coating. The average particle size of the surface coating materials to be applied to the electrodeposited coating may then be selected to be less than the average characteristic length of the microstructures. Without wishing to be bound by any particular application method, a dispersion of particles comprising the surface coating material is typically produced. This dispersion may comprise an aqueous carrier, an organic carrier or mixtures thereof as desired to permit application of the surface coating material to the electrodeposited coating. Post-application of the surface coating material, the article can be subjected to other treatment steps including, but not limited to, drying, heating, cooling, blotting, annealing, tempering, consolidating, sanding, etching, polishing or other physical or chemical steps.

In some examples, an additional layer of material can be applied to the applied surface coating if desired. In other instances, the electrodeposited coating, the surface coating or both may each comprise one or more additional materials such as a polymeric material. The additional material (or additional layer) can include, but is not limited to, organic polymers, thermoplastic polymers, thermosetting polymers, copolymers, terpolymers, a block copolymer, an alternating block copolymer, a random polymer, homopolymer, a random copolymer, a random block copolymer, a graft copolymer, a star block copolymer, a dendrimer, a poly electrolyte (polymers that have some repeat groups that contains electrolytes), a poly ampholyte (poly ampholytes are polyelectrolytes with both cationic and anionic repeat groups. There are different types of poly ampholytes. In the first type, both anionic and cationic groups can be neutralized. In the second type, an anionic group can be neutralized, while a cationic group is a group insensitive to pH changes such as a quaternary alkyl ammonium group. In the third type, a cationic group can be neutralized, and an anionic group is selected from those species such as sulfonate groups that show no or little response to pH changes. In the fourth type, both anionic and cationic groups are insensitive to the useful range of pH changes in the solution. An ionomer, which is a polymer comprising repeat units of electrically neutral and ionized units, can also be used. Ionized units are covalently bonded to the polymer backbone as pendant group moieties and usually consist of no more than 15 mole percent. Examples of organic polymers include, but are not limited, to polyacetals, polyolefins, polyacrylics, polycarbonates, polystyrenes, polyesters, polyamides, polyamidimides, polyacrylates, polyarylsulfones, polyethersulfones, polyphenylene sulfides, polyvinylchlorides, polysulfones, polyimides, polyetherimides, polytetrafluoroethylenes, polyether ketone ketones, polybenzoxazoles, polyphthalides, polyacetals, polyanhydrides, polyvinyl ethers, polyvinyl thioethers, polyvinyl alcohols, polyvinyl ketones, poly vinyl halides, polyvinyl nitriles, polyvinyl esters, polysulfonates, poly sulfides, polythioesters, polysulfones, polysulfonamides, polyureas, polyphosphazenes, polysilazanes, styrene acrylonitrile, acrylonitrile-butadiene-styrene (ABS), polyethylene terephthalate, polybutylene terephthalate, polyurethane, ethylene ptopylene diene rubber (EPR), perfluoroelastomers, fluorinated ethylene propylene, perfluoroalkoxyethylene, poly-chlorotrifluoroethylene, polyvinylidene fluoride, polysiloxanes, or any combination thereof. Examples of polyelectrolytes include, but are not limited to, polystyrene sulfonic acid, polyacrylic acid, pectin, carrageenan, alginates, carboxymethylcellulose, polyvinylpyrrolidone, or any combination thereof. Examples of thermosetting polymers include, but are not limited to, epoxy polymers, unsaturated polyester polymers, polyimide polymers, bismaleimide polymers, bismaleimide triazine polymers, cyanate ester polymers, vinyl polymers, benzoxazine polymers, benzocyclobutene polymers, acrylics, alkyds, phenol-formaldehyde polymers, urea-formaldehyde polymers, novolacs, resoles, melamine-formaldehyde polymers, urea-formaldehyde polymers, hydroxymethylfuranes, isocyanates, diallyl phthalate, triallyl cyanurate, triallyl isocyanurate, unsaturated polysterimides, or any combination thereof. Examples of thermoplastic polymers include, but are not limited to, acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, poly sulfone/acrylonitrile-butadiene-styrene, polycarbonate/thermoplastic urethane, polycarbonate/polybutylene terephthalate, thermoplastic elastomer alloys, nylon/elastomers, polyester/elastomers, polyethylene terephthalate/polybutylene terephthalate, acetal/elastomer, styrene maleic anhydride/acrylonitrile-butadiene-styrene, polyether etherketone/polyethersulfone, polyether, etherketone/polyetherimide polyethylene/nylon, polyethylene/polyacetal, or any combination thereof.

Coatings Adjacent to the Substrate

In certain examples, the coatings adjacent to the substrate may be provided using numerous materials and techniques including dipping, soaking, spraying, electroless deposition, electrodeposition, plating, etching and other processes. For example, the coating adjacent to the substrate may comprise one or more transition metals including Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In some examples, the coating adjacent to the substrate may comprise two or more transition metals including, for example, Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to provide a transition metal alloy. In certain examples, the coating adjacent to the substrate may comprise at least one metallic compound or metal alloy. Examples of some of the metal alloys which can be used include, but are not limited, to Zinc/Nickel alloy (Zn/Ni), Zinc/Copper alloy (Zn/Cu), Nickel/Molybdenum (Ni/Mo) alloys and other transition metals and combinations thereof.

In some examples, the coating adjacent to the substrate may comprise a transition metal alloy comprising Nickel and at least one other transition metal, e.g., Nickel and at least one of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to provide a transition metal alloy. In some examples, the coating adjacent to the substrate may comprise Nickel and only one other transition metal, e.g., Nickel and only one of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to provide a transition metal alloy.

In certain examples, the coating adjacent to the substrate may comprise a transition metal alloy comprising Zinc and at least one other transition metal, e.g., Zinc and at least one of Scandium, Titanium, Vanadium, Chromium, Manganese, Iron, Cobalt, Nickel, Copper, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to provide a transition metal alloy. In some examples, the coating adjacent to the substrate may comprise Zinc and only one other transition metal, e.g., Zinc and only one of Scandium, Titanium, Vanadium, Chromium, Manganese, Iron, Cobalt, Copper, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to provide a transition metal alloy.

In additional examples, the coating adjacent to the substrate may comprise a transition metal alloy comprising Copper and at least one other transition metal, e.g., Copper and at least one of Scandium, Titanium, Vanadium, Chromium, Manganese, Iron, Cobalt, Nickel, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to provide a transition metal alloy. In some examples, the coating adjacent to the substrate may comprise Copper and only one other transition metal, e.g., Copper and only one of Scandium, Titanium, Vanadium, Chromium, Manganese, Iron, Cobalt, Nickel, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to provide a transition metal alloy.

In some instances, the coating adjacent to the substrate may be considered an electrodeposited coating which is produced using one or more electrodeposition techniques as noted in more detail below. For example, the electrodeposited coatings of the articles described herein may comprise one or more transition metals including, for example, Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In some examples, the electrodeposited coatings of the articles described herein may comprise two or more transition metals including, for example, Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to provide an electrodeposited transition metal alloy. In certain examples, the electrodeposited coating may comprise at least one metallic compound or metal alloy. Examples of some of the metal alloys which can be used include, but are not limited, to Zinc/Nickel alloy (Zn/Ni), Zinc/Copper alloy (Zn/Cu), Nickel/Molybdenum (Ni/Mo) alloys and other transition metals and combinations thereof.

In some examples, the electrodeposited coating comprises a transition metal alloy comprising Nickel and at least one other transition metal, e.g., Nickel and at least one of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to provide an electrodeposited transition metal alloy. In certain examples, the electrodeposited coating comprises a transition metal alloy comprising Nickel and only one other transition metal, e.g., Nickel and only one of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to provide an electrodeposited transition metal alloy.

In certain examples, the electrodeposited coating comprises a transition metal alloy comprising Zinc and at least one other transition metal, e.g., Zinc and at least one of Scandium, Titanium, Vanadium, Chromium, Manganese, Iron, Cobalt, Nickel, Copper, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to provide an electrodeposited transition metal alloy. In certain examples, the electrodeposited coating comprises a transition metal alloy comprising Zinc and at only one other transition metal, e.g., Zinc and only one of Scandium, Titanium, Vanadium, Chromium, Manganese, Iron, Cobalt, Nickel, Copper, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to provide an electrodeposited transition metal alloy.

In additional examples, the electrodeposited coating comprises a transition metal alloy comprising Copper and at least one other transition metal, e.g., Copper and at least one of Scandium, Titanium, Vanadium, Chromium, Manganese, Iron, Cobalt, Nickel, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to provide an electrodeposited transition metal alloy. In additional examples, the electrodeposited coating comprises a transition metal alloy comprising Copper and only one other transition metal, e.g., Copper and only one of Scandium, Titanium, Vanadium, Chromium, Manganese, Iron, Cobalt, Nickel, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to provide an electrodeposited transition metal alloy.

In certain embodiments described herein, the electrodeposited coating may comprise one or more textured layers. For example, the electrodeposited coating may comprise one or more layers which may comprise various features. In some instances, the coating may comprise at least one textured layer comprising a metal or metallic compound or a transition metal alloy comprising one, two, three or more different transition metals. In certain configurations, the textured layer can provide, at least in part, a hydrophobic surface comprising a plurality of surface features in the micro or nano size range. The size of the surface features can be defined based on their largest characteristic length. Some textured layers comprise surface features in the range of 5 to 15 micrometer. Others comprise surface features in the range of 0.5 to 1 micrometer. In some examples, the surface features are positioned within at least at two different surface planes with different heights in regard to an arbitrary zero reference point. In other instances, the features can be packed closely together with negligible, substantially no space or no space between adjacent features compared to the overall size of the features. In certain examples, the coating may comprise at least one textured layer with one or more of the following characteristics with respect to the arrangement of the surface features, composition, and hydrophobic characteristic of the textured layer.

In certain examples, the textured layers when present may comprise at least one metal or metallic compound or metal alloy. Examples of some of the metals which can be used include, but are not limited, to Nickel (Ni), Zinc (Zn), Chromium (Cr), Copper (Cu), Zinc/Nickel alloy (Zn/Ni), Zinc/Copper alloy (Zn/Cu), Nickel/Molybdenum (Ni/Mo) alloys and other transition metals and combinations thereof. In some examples, the textured layer comprises a transition metal alloy comprising nickel and at least one other transition metal, e.g., Nickel and at least one of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In certain examples, the textured layer comprises a transition metal alloy comprising zinc and at least one other transition metal, e.g., Zinc and at least one of Scandium, Titanium, Vanadium, Chromium, Manganese, Iron, Cobalt, Nickel, Copper, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In other examples, the textured layer comprises a transition metal alloy comprising Copper and at least one other transition metal, e.g., Copper and at least one of Scandium, Titanium, Vanadium, Chromium, Manganese, Iron, Cobalt, Nickel, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable.

In certain configurations, the textured layers of the electrodeposited coatings may provide hydrophobic characteristics without any additional chemical treatment. It is worth mentioning that certain physical treatments may be performed to make the textured layer hydrophobic. For example, a water contact angle of greater than 90° can be provided by the electrodeposited coatings either alone or after being used with the surface coatings. In addition, a superhydrophobic coating is defined as a coating which provides a water contact angle of more than 150°. Water contact angle can be measured using contact angle measurement equipment based on the ASTM D7490-13 standard. This angle is conventionally measured through the droplet, where the water-air interface meets the solid surface. A Kruss-582 system can be used to obtain the contact angle data.

In certain embodiments, the electrodeposited coatings, when used in combination with a surface coating, can provide an overall coating that can be considered mechanically durable. Mechanical durability can be defined based on two criteria of hardness and pull-off (tape) tests. The hardness criterion is defined based on the pencil hardness level of more than 3B corresponding to the ASTM D3363-05 (2011)e2 standard measurement. This test method determines the hardness of a coating by drawing pencil lead marks from known pencil hardness on the coating surface. The film hardness is determined based on the hardest pencil that will not rupture or scratch the film. A set of calibrated drawing leads or calibrated wood pencils meeting the following scales of hardness were used: 9H-8H-7H-6H-5H-4H-3H-2H-H-F-HB-B-2B-3B-4B-5B-6B-7B-8B-9B. 9B grade corresponds to the lowest level of hardness and represents very soft coatings. The hardness level increases gradually after that until it gets to the highest level of 9H. The difference between two adjacent scales can be considered as one unit of hardness.

In addition to the pencil hardness, durability of the coatings can be characterized using the standard ASTM procedure for the tape test (ASTM F2452-04-2012). This attribute of durability is defined based on exhibiting at least level three of durability among five levels defined by the standard test. In this test, a tape is adhered to the surface and pulled away sharply. The level of the coating durability obtained based on the amount of the coating removed from the surface and attached to the tape. The lowest to highest durability is rated from 1 to 5, respectively. A lower rating means that some part of the coating was removed by the tape, and therefore, a part of the coating functionality was lost. Rate 5 corresponds to the condition that zero amount of coating is removed. Therefore, the functionally of the coating at this rate remains the same after and before the tape test.

In addition to the pencil hardness and tape tests, a Tabor abrasion test is another test that can be performed on the coatings described herein. In this test, the coated samples can be subjected to several cycles of abrasive wheels with 500 g loading weight at 60 rpm speed. The mass loss percentage (%) of the coatings can then be calculated for each individual sample based on the ratio of mass loss to the initial mass of the coating.

In some embodiments, the coatings described herein may be considered easy-clean coatings. Easy-clean characteristic is defined, wherein in a cleanability test, at least 80 percent of the surface can be cleaned. In this test, the coating is painted with cooking oil and placed in an oven at 100° C. for 12 hours. It will then be wiped out with a wet tissue. Easy-clean characteristic is also related to the coating oleophobicity. The oleophobic characteristic can be measured by the contact angle of oil on a surface.

Certain configurations of the coatings described herein can also provide one or more of the following attributes: reduce transfer from/to the surface, provide protection, prevent or discourage adhesion of water and microscale/nanoscale objects, or a combination of said functionalities. Certain coatings can be used in many different applications including but not limited to, wetting, dirt accumulation, corrosion, microbial adhesion and disease transformation, ice formation, friction and drag and biofouling prevention and/or mitigation. For instance, the coating can protect, to at least some degree, an article, e.g. vehicle or other components, against detrimental effects of the environment, e.g. corrosion and fouling, which reduce the overall useful lifetime of the article or cause fading or deterioration. The coating can be used in equipment with high-temperature working conditions such as ovens, heat-exchangers, and condensers. It can be used to mitigate sticky problems at high temperature environments. As another instance, certain configurations of coatings can discourage transfer of liquids, dirt, microorganisms, viruses, or particles from/to an article to/from human and animals upon contact, which can reduce cross contamination.

Without wishing to be bound by any particular theory, certain configurations of the coatings disclosed herein can work by trapping some of the surface coating materials between the structures of the surface texture. Other surface material may remain on top of the surface texture. Some part of the macroscopic object can be in contact with the media and not the surface. As a result, compared to uncoated surfaces, transfer between the macroscopic object and the coated surface is discouraged. Macroscopic objects include, but are not limited to, liquid droplets, a part of a human or animal body, tools, food, oils and solid objects.

In certain instances, the coatings can enable protection against undesirable consequences of contact between the surface and the macroscopic, microscale and/or nanoscale objects such as equipment damage, corrosion, transfer of germs, dirt, and smudge, friction and drag. In other instances, fluids may not stick to the coating surface. Liquids for example can be water, sea water, oil, acids, bases, petroleum products, aqueous solvents, organic solvents or biological fluids such as blood and urine. In this example, liquid drops bead up on the coating surface, roll off the surface with a slight applied force, and bounce if dropped on the surface from a height. In fact, the overall coatings can provide articles that can be considered super-repellent (e.g. superhydrophobic and/or superoleophobic).

In certain examples, the electrodeposited coating can enhance adhesion of the surface coating. In other instances, a plurality of individual microstructures of a first size, e.g., the microstructures may comprise an average diameter of 15 microns or less, or 10 microns or less or 5 microns or less or 0.5 microns or less may be present in the electrodeposited coating. The surface coating can comprise particles or materials with an average size less than the first size of the microstructures of the electrodeposited coating. In some examples, the surface coating can comprise both particles or materials with an average size less than the first size of the microstructures of the textured coating and particles or materials with an average size greater than the first size of the microstructures of the electrodeposited coating. For example, the adhesion or pull-off strength of the surface coating may be 10%, 20%, 30%, 40%, 50%, 60%, 70%, 80% or even 90% higher when the electrodeposited coating is present compared to the pull-off strength of the surface coating being disposed on a substrate not having the same electrodeposited coating. As discussed herein, pull-off strength can be tested, for example, using ASTM D4541-09. In some configurations, the pull-off strength of the surface coating, when the electrodeposited coating is present, may be at least 200 psi, 225 psi or 250 psi as tested using ASTM D4541-09. In some examples, the electrodeposited and surface coatings can be present as distinct layers with a defined interface, whereas in other instances, the coating materials may infuse or penetrate into each other without a discernible interface between them.

In certain configurations described herein, the electrodeposited coating can be configured as a porous coating (to at least some degree) to permit the surface coating material to penetrate or infuse into the void space of the electrodeposited coating. For example, there may be space between microstructures of the electrodeposited coating and/or space within the microstructures themselves that permits the surface coating material to infuse, enter or penetrate into the electrodeposited coating. Infusion or entry of the surface coating material into the electrodeposited coating can reduce the overall surface roughness, e.g., the surface roughness once the electrodeposited coating has been disposed on the article is much higher than the surface roughness once the surface coating has been disposed on the electrodeposited coating. As noted herein, the electrodeposited coating and surface coatings can each be applied in numerous manners including, but not limited to, electrodeposition, brushing, spraying, dip-coating, jet coating or other methods.

In some examples, the microstructures of the electrodeposited coating may comprise a first size, which refers to the largest characteristic length of the surface features. Where the microstructures are generally spherically shaped, the largest diameters of these spheres can be defined as the first size of the surface features. The surface features of the electrodeposited coating can be desirably positioned at least at two different surface planes with different heights in regard to an arbitrary zero point. While not wishing to be bound by this example, there can be negligible space between adjacent surface features compared to the size of the features. After coating of the electrodeposited coating with the surface coating, substantially no open space may exist between the microstructures. This filling of gaps and voids by the surface coating can reduce overall surface roughness, e.g., by 50% or more, and may result in a decrease in the overall porosity of the electrodeposited coating to be close to zero, e.g., less than 5%, 4%, 3%, 2%, or 1%.

In certain configurations, in addition to the metal, metallic compound or transition metal alloys present in the electrodeposited coating, the electrodeposited coating can comprise other materials as well. For example, the electrodeposited coating may comprise one or more of Chromium Nitride (CrN), Diamond Like Carbon (DLC), Titanium Nitride (TiN), Titanium Carbo-nitride (TiCN), Aluminum Titanium Nitride (ALTiN), Aluminum Titanium Chromium Nitride (AlTiCrN), Zirconium Nitride (ZrN), Nickel, gold, Plasma-Plus®, Cerablack™, Chromium, Nickel Fluoride ($NiF_2$), any Nickel Composite, any organic or inorganic-organic material and combinations thereof. Examples of nickel composites include, but are not limited to, composites of nickel with different particles selected from a group consisting of PTFE, silica (SiO2), alumina ($Al_2O_3$), silicon carbide (SiC), diamond, diatomaceous earth (DE), boron nitride (BN), titanium oxide (TiO2), single wall carbon nanotubes (SWCNTs), multi-wall carbon nanotubes (MWCNTs), kaoline ($Al_2O_3.2SiO_2.2H_2O$), graphite, other nanoparticles, or any combination thereof. Examples of organic or inorganic-organic materials include, but are not limited to, parylene, organofunctional silanes, fluorinated alkylsilane, fluorinated alkylsiloxane, organofunctional resins, hybrid inorganic organofunctional resins, organofunctional polyhedral oligomeric silsesquioxane (POSS), hybrid inorganic organofunctional POSS resins, silicone polymers, fluorinated oligomeric polysiloxane, organofunctional oligomeric poly siloxane, fluorinated organofunctional silicone copolymers, organofunctional silicone polymers, hybrid inorganic organofunctional silicone polymers, organofunctional silicone copolymers, hybrid inorganic organofunctional silicone copolymers, fluorinated polyhedral oligomeric silsesquioxane (FPOSS), Dynasylan® SIVO, other similar groups, or any combination thereof. In some instances, the electrodeposited coating can be produced in the presence of the surface coating materials so that some of the surface coating material ends up in the electrodeposited coating.

In some examples, the electrodeposited coating may comprise organofunctional silanes that combine the functionality of a reactive organic group with inorganic functionality in a single molecule. This special property allows them to be used as molecular bridges between organic polymers and inorganic materials. The organic moiety of the silane system can be tailored with different functionalities consisting amino, benzylamino, benzyl, chloro, fluorinated alkyl/aryl, disulfido, epoxy, epoxy/melamine, mercapto, methacrylate, tetrasulfido, ureido, vinyl, vinyl-benzyl-amino, and any combination thereof. While any of these groups can be used application of the following groups is more common: amino, chloro, fluorinated alkyl/aryl, vinyl, and vinyl-benzyl-amino. Examples of aminosilane systems, in addition to those discussed above in connection with the surface coatings, include, but are not limited to, n-(3-acryloxy-2-hydroxypropyl)-3-aminopropyltriethoxysilane, n-(n-acetylleucyl)-3-aminopropyltriethoxysilane, 3-(n-allylamino)propyltrimethoxysilane, 4-aminobutyltriethoxysilane, 4-amino-3,3-dimethylbutylmethyldimethoxysilane, 4-amino-3,3-dimethylbutyltrimethoxysilane, aminoneohexyltrimethoxysilane, 1-amino-2-(dimethylethoxysilyl)propane, n-(2-aminoethyl)-3-aminoisobutyldimethylmethoxysilane, n-(2-aminoethyl)-3-aminoisobutylmethyldimethoxysilane, (aminoethylaminomethyl)phenethyltrimethoxysilane, n-(2-aminoethyl)-3-aminopropylmethyldiethoxysilane, n-(2-aminoethyl)-3-aminopropylmethyldimethoxysilane, n-(2-aminoethyl)-3-amino propyltrimethoxysilane, oligomeric co-hydrolysate, n-(2-aminoethyl)-2,2,4-trimethyl-1-aza-2-silacyclopentane, n-(6-aminohexyl)aminomethyltriethoxysilane, n-(2-aminoethyl)-11-aminoundecyltrimethoxysilane, 3-(m-aminophenoxy)propyltrimethoxysilane, m-aminophenyltrimethoxysilane, p-aminophenyltrimethoxysilane, aminophenyltrimethoxysilane, n-3-[(amino(polypropylenoxy)]aminopropyltrimethoxysilane, 3-aminopropyldiisopropylethoxysilane, 3-aminopropyldiisopropylethoxysilane, 3-aminopropyldimethylethoxysilane, 3-aminopropyldimethylfluorosila, n-(3-aminopropyldimethylsilyl)aza-2,2-dimethyl-2-silacyclopentane, 3-aminopropylmethyldiethoxysilane, 3-aminopropyltris(methoxyethoxyethoxy)silane, 11-aminoundecyltriethoxysilane, n-(2-n-benzylaminoethyl)-3-aminopropyltrimethoxysilane, n,n-bis(2-hydroxyethyl)-3-aminopropyltriethoxysilane, bis(trimethylsilyl)-3-aminopropyltrimethoxysilane, n-butylaminopropyltrimethoxysilane, t-butylaminopropyltrimethoxysilane, (n-cyclohexylaminomethyl) methyldiethoxysilane, (n-cyclohexylaminopropyl) trimethoxysilane, (n,n-diethylaminomethyl)triethoxysilane, (n,n-diethyl-3-aminopropyl)trimethoxysilane, 3-(n,n-dimethylaminopropyl)aminopropylmethyldimethoxysilane, (n,n-dimethylaminopropyl)-aza-2-methyl-2-methoxysilacyclopentane, n,n-dimethyl-3-aminopropylmethyldimethoxysilane, 3-(1,3-dimethylbutylidene)aminopropyltriethoxysilane, (3-(n-ethylamino)isobutyl)methyldiethoxysilane, (3-(n-ethylamino)isobutyl)trimethoxysilane, n-methyl-n-trimethylsilyl-3-aminopropyltrimethoxysilane, (phenylaminomethyl)methyldimethoxysilane, n-phenylaminomethyltriethoxysilane, n-phenylaminopropyltrimethoxysilane, 3-(n-styrylmethyl-2-aminoethylamino)propyltrimethoxysilane hydrochloride, (3-trimethoxysilylpropyl)diethylenetriamine, (cyclohexylaminomethyl)triethoxysilane, (n-methylaminopropyl)methyl(1,2-propanediolato) silane, n-(trimethoxysilylpropyl)ethylenediaminetriacetate, tripotassium salt, n-(trimethoxysilylpropyl)ethylenediaminetriacetate, trisodium salt, 1-[3-(2-aminoethyl)-3-aminoisobutyl]-1,1,3,3,3-pentaethoxy-1,3-disilapropane, bis(methyldiethoxysilylpropyl)amine, bis(methyldimethoxysilylpropyl)-n-methylamine, bis(3-triethoxysilylpropyl)amine, n,n'-bis[(3-trimethoxysilyl)propyl]ethylenediamine, tris(triethoxysilylpropyl)amine, tris(triethoxysilylmethyl)amine, bis[4-(triethoxysilyl)butyl] amine, tris[(3-diethoxymethylsilyl)propyl]amine, n-(hydroxyethyl)-n,n-bis(trimethoxysilylpropyl)amine, n-(hydroxyethyl)-n-methylaminopropyltrimethoxysilane, n-(3-methacryloxy-2-hydroxypropyl)-3-aminopropyltriethoxysilane, 3-(n-styrylmethyl-2-aminoethylamino)propyltrimethoxysilane, 3-(2,4-dinitrophenylamino)propyltriethoxysilane, 4-nitro-4(n-ethyl-n-trimethoxysilylcarbamato)aminoazobenzene, bis(diethylamino)dimethylsilane, bis(dimethylamino)diethylsilane, bis(dimethylamino)dimethylsilane, (diethylamino)trimethylsilane, (n,n-dimethylamino)trimethylsilane, tris(dimethylamino)methylsilane, n-butyldimethyl (dimethylamino)silane, n-decyltris(dimethylamino) silane, n-octadecyldiisobutyl(dimethylamino) silane, n-octadecyldimethyl(diethylamino) silane, n-octadecyldimethyl (dimethylamino) silane, n-octadecyltris(dimethylamino) silane, n-octyldiisopropyl(dimethylamino) silane, n-octyldimethyl(dimethylamino) silane, and any combination thereof. the examples of the benzylaminosilane system are n-(2-n-benzylaminoethyl)-3-aminopropyltrimethoxysilane, n-(2-n-benzylaminoethyl)-3-aminopropyltrimethoxysilane hydrochloride, n-benzylaminomethyltrimethylsilane, or any combination thereof. The example of benzylsilane system are benzyldimethylchlorosilane, benzyldimethylsilane, n-benzyl-n-methoxymethyl-n-(trimethylsilylmethyl) amine, benzyloxytrimethylsilane, benzyltrichlorosilane, benzyltriethoxysilane, benzyltrimethylsilane, bis(trimethylsilylmethyl)benzylamine, (4-bromobenzyl) trimethylsilane, dibenzyloxydiacetoxysilane, or any combination thereof. The examples of chloro and chlorosilane system are (−)-camphanyldimethylchlorosilane, 10-(carbomethoxy)decyldimethylchlorosilane, 10-(carbomethoxy)decyltrichlorosilane, 2-(carbomethoxy)ethylmethyldichlorosilane, 2-(carbomethoxy)ethyltrichlorosilane, 3-chloro-n,n-bis(trimethylsilyl)aniline, 4-chlorobutyldimethylchlorosilane, (chlorodimethylsilyl)-5-[2-(chlorodimethylsilyl)ethyl] bicycloheptane, 13-(chlorodimethylsilylmethyl) heptacosane, 11-(chlorodimethylsilyl)methyltricosane, 7-[3-(chlorodimethylsilyl)propoxy]-4-methylcoumarin, 2-chloroethylmethyldichlorosilane, 2-chloroethylmethyldimethoxysilane, 2-chloroethylsilane, 1-chloroethyltrichlorosilane, 2-chloroethyltrichlorosilane, 2-chloroethyltriethoxysilane, 1-chloroethyltrimethylsilane, 3-chloroisobutyldimethylchlorosilane, 3-chloroisobutyldimethylmethoxysilane, 3-chloroisobutylmethyldichlorosilane, 1-(3-chloroisobutyl)-1,1,3,3,3-pentachloro-1,3-disilapropane, 1-(3-chloroisobutyl)-1,1,3,3,3-pentaethoxy-1,3-disilapropane, 3-chloroisobutyltrimethoxysilane, 2-(chloromethyl)allyltrichlorosilane, 2-(chloromethyl)allyltrimethoxysilane, 3-[2-(4-chloromethylbenzyloxy) ethoxy]propyltrichlorosilane, chloromethyldimethylchlorosilane, chloromethyldimethylethoxysilane, chloromethyldimethylisopropoxysilane, chloromethyldimethylmethoxysilane, (chloromethyl)dimethylphenylsilane, chloromethyldimethylsilane, 3-(chloromethyl)heptamethyltrisiloxane, chloromethylmethyldichlorosilane, chloromethylmethyldiethoxysilane, chloromethylmethyldiisopropoxysilane, chloromethylmethyldimethoxysilane, chloromethylpentamethyldisiloxane, ((chloromethyl)phenylethyl)dimethylchlorosilane, ((chloromethyl)phenylethyl)methyldichlorosilane, ((chloromethyl)phenylethyl)methyldimethoxysilane, ((chloromethyl) phenylethyl)trichlorosilane, ((chloromethyl)phenylethyl) triethoxysilane, ((chloromethyl)phenylethyl) trimethoxysilane, chloromethylphenethyltris (trimethylsiloxy) silane, (p-chloromethyl) phenyltrichlorosilane, (p-chloromethyl) phenyltrimethoxysilane, chloromethylsilatrane, chloromethyltrichlorosilane, chloromethyltriethoxysilane, chloromethyltriisopropoxysilane, chloromethyltrimethoxysilane, chloromethyltrimethylsilane, 2-chloromethyl-3-trimethylsilyll-propene, chloromethyltris(trimethylsiloxy) silane, (5-chloro-1-pentynyl)trimethylsilane, chlorophenylmethyldichloro-silane, chlorophenyltrichlorosilane, chlorophenyltriethoxysilane, p-chlorophenyltriethoxysilane, p-chlorophenyltrimethylsilane, (3-chloropropoxy)isopropyldimethylsilane, (3-chloropropyl)(t-butoxy)dimethoxysilane, 3-chloropropyldimethylchlorosilane, 3-chloropropyldimethylethoxysilane, 3-chloropropyldimethylmethoxysilane, 3-chloropropyldimethylsilane, 3-chloropropyldiphenylmethylsilane, chloropropylmethyldichlorosilane, 3-chloropropylmethyldiethoxysilane, 3-chloropropylmethyldiisopropoxysilane, 3-chloropropylmethyldimethoxysilane, (3-chloropropyl) pentamethyldisiloxane, 3-chloropropyltrichlorosilane, 3-chloropropyltriethoxysilane, 3-chloropropyltrimethoxysilane, 3-chloropropyltrimethylsilane, 3-chloropropyltriphenoxysilane, 3-chloropropyltris(trimethylsiloxy) silane, 2-(4-chlorosulfonylphenyl)ethyltrichlorosilane, 2-(4-chlorosulfonylphenyl)ethyltrichlorosilane, 2-(4-chlorosulfonylphenyl)ethyltrimethoxysilane, 2-(4-chlorosulfonylphenyl)ethyltrimethoxysilane, 1-chloro-5-(trimethylsilyl)-4-pentyne, chlorotris(trimethylsilyl)silane, 11-chloroundecyltrichlorosilane, 11-chloroundecyltriethoxysilane, 11-chloroundecyltrimethoxysilane, 1-chlorovinyltrimethylsilane, (3-cyanobutyl)dimethylchlorosilane, (3-cyanobutyl)methyldichlorosilane, (3-cyanobutyl) trichlorosilane, 12-cyanododec-10-enyltrichlorosilane, 2-cyanoethylmethyldichlorosilane, 2-cyanoethyltrichlorosilane, 3-cyanopropyldiisopropylchlorosilane, 3-cyanopropyldimethylchlorosilane, 3-cyanopropylmethyldichlorosilane, 3-cyanopropylphenyldichlorosilane, 3-cyanopropyltrichlorosilane, 3-cyanopropyltriethoxysilane, 11-cyanoundecyltrichlorosilane, [2-(3-cyclohexenyl)ethyl]dimethylchlorosilane, [2-(3-cyclohexenyl)ethyl]methyldichlorosilane, [2-(3-cyclohexenyl)ethyl]trichlorosilane, 3-cyclohexenyltrichlorosilane, cyclohexyldimethylchlorosilane, cyclohexylmethyldichlorosilane, (cyclohexylmethyl)

trichlorosilane, cyclohexyltrichlorosilane, (4-cyclooctenyl) trichlorosilane, cyclooctyltrichlorosilane, cyclopentamethylenedichlorosilane, cyclopentyltrichlorosilane, cyclotetramethylenedichlorosilane, cyclotrimethylenedichlorosilane, cyclotrimethylenemethylchlorosilane, 1,3-dichlorotetramethyldisiloxane, 1,3-dichlorotetraphenyldisiloxane, dicyclohexyldichlorosilane, dicyclopentyldichlorosilane, di-n-dodecyldichlorosilane, dodecylmethylsilyl)methyldichlorosilane, diethoxydichlorosilane, or any combination thereof. the examples of the epoxysilane system are 2-(3,4-epoxycyclohexyl) ethylmethyldiethoxysilane, 2-(3,4-epoxycyclohexyl) ethyltriethoxysilane, 2-(3,4-epoxycyclohexyl) ethyltrimethoxysilane, 5,6-epoxyhexyltriethoxysilane, (epoxypropyl)heptaisobutyl-T8-silsesquioxane, or any combination thereof. The example of mercaptosilane system are (mercaptomethyl)methyldiethoxysilan, 3-mercaptopropylmethyldimethoxysilane, 3-mercaptopropyltriethoxysilane, 3-mercaptopropyltrimethoxysilane, 3-mercaptopropyltrimethoxysilane, 3-mercaptopropyltrimethylsilane, 3-mercaptopropyltriphenoxysilane, 11-mercaptoundecyloxytrimethylsilane, 11-mercaptoundecyltrimethoxysilane, or any combination thereof. The examples of ureidosilane are ureidopropyltriethoxysilane, ureidopropyltrimethoxysilane, or any combination thereof. The examples of vinyl, vinylbenzylsilane system are vinyl(bromomethyl)dimethylsilane, (m,p-vinylbenzyloxy)trimethylsilane, vinyl-t-butyldimethylsilane, vinyl(chloromethyl)dimethoxysilane, vinyl(chloromethyl)dimethylsilane, 1-vinyl-3-(chloromethyl)-1,1,3,3-tetramethyldisiloxane, vinyldiethylmethylsilane, vinyldimethylchlorosilane, vinyldimethylethoxysilane, vinyldimethylfluorosilane, vinyldimethylsilane, vinyldi-n-octylmethylsilane, vinyldiphenylchlorosilane, vinyldiphenylethoxysilane, vinyldiphenylmethylsilane, vinyl(diphenylphosphinoethyl)dimethylsilane, vinyl(p-methoxyphenyl)dimethylsilane, vinylmethylbis(methylethylketoximino) silane, vinylmethylbis(methylisobutylketoximino) silane, vinylmethylbis(trimethylsiloxy)silane, vinylmethyldiacetoxysilane, vinylmethyldichlorosilane, vinylmethyldichlorosilane, vinylmethyldiethoxysilane, vinylmethyldimethoxysilane, 1-vinyl-1-methylsilacyclopentane, vinyloctyldichlorosilane, o-(vinyloxybutyl)-n-triethoxysilylpropyl carbamate, vinyloxytrimethylsilane, vinylpentamethyldisiloxane, vinylphenyldichlorosilane, vinylphenyldiethoxysilane, vinylphenyldimethylsilane, vinylphenylmethylchlorosilane, vinylphenylmethylmethoxysilane, vinylphenylmethylsilane, vinylsilatrane, vinyl-1,1,3,3-tetramethyldisiloxane, vinyltriacetoxysilane, vinyltri-t-butoxysilane, vinyltriethoxysilane, vinyltriethoxysilane, oligomeric hydrolysate, vinyltriethoxysilane-propyltriethoxysilane, oligomeric co-hydrolysate, vinyltriethylsilane, vinyl(trifluoromethyl)dimethylsilane, vinyl(3,3,3-trifluoropropyl)dimethylsilane, vinyltriisopropenoxysilane, vinyltriisopropoxysilane, vinyltrimethoxysilane, vinyltrimethoxysilane, oligomeric hydrolysate, vinyltrimethylsilane, vinyltriphenoxysilane, vinyltriphenylsilane, vinyltris(dimethylsiloxy)silane, vinyltris(2-methoxyethoxy)silane, vinyltris(1-methoxy-2-propoxy)silane, vinyltris(methylethylketoximino)silane, vinyltris(trimethylsiloxy)silane, or any combination thereof. Illustrative examples of fluorinated alkyl/aryl silane systems include, but are not limited to, 4-fluorobenzyltrimethylsilane, (9-fluorenyl) methyldichlorosilane, (9-fluorenyl) trichlorosilane, 4-fluorophenyltrimethylsilane, 1,3-bis(tridecafluoro-1,1,2,2-tetrahydrooctyl) tetramethyldisiloxane, 1H,1H,2H,2H-perfluorodecyltrimethoxysilane, 1H,1H,2H,2H-perfluorodecyltrichlorosilane, 1H,1H,2H,2H-perfluorooctyltrichlorosilane, 1H,1H,2H,2H-perfluorooctadecyltrichlorosilane, 1H,1H,2H,2H-Perfluorooctyltriethoxysilane, 1H,1H,2H,2H-Perfluorododecyltrichlorosilane, Trimethoxy(3,3,3-trifluoropropyl)silane, tridecafluoro-1,1,2,2-tetrahydrooctyl-1-trimethoxysilane, tridecafluoro-1,1,2,2-tetrahydrooctyl-1-triethoxysilane, and any combination thereof.

In embodiments where an organofunctional resin is present in the electrodeposited coating, the organofunctional resin can be selected from the group consisting of epoxy, epoxy putty, ethylene-vinyl acetate, phenol formaldehyde resin, polyamide, polyester resins, polyethylene resin, polypropylene, polysulfides, polyurethane, polyvinyl acetate, polyvinyl alcohol, polyvinyl chloride (PVC), polyvinyl chloride emulsion (PVCE), polyvinylpyrrolidone, rubber cement, silicones, and any combination thereof. Organofunctional polyhedral oligomeric silsesquioxane (POSS) can be selected from the group consisting acrylates, alcohols, amines, carboxylic acids, epoxides, fluoroalkyls, halides, imides, methacrylates, molecular silicas, norbornenyls, olefins, polyethylenglycols (PEGs), silanes, silanols, thiols, and any combination thereof. Illustrative examples of acrylates POSS's include acryloisobutyl POSS, or any combination thereof. Illustrative examples of alcohols POSS are diol isobutyl POSS, Cyclohexanediol isobutyl POSS, Propanediol isobutyl POSS, Octa (3-hydroxy-3-methylbutyldimethylsiloxy) POSS, or any combination thereof. Illustrative examples of amines POSS are Aminopropylisobutyl POSS, Aminopropylisooctyl POSS, Aminoethylaminopropylisobutyl POSS, OctaAmmonium POSS, Aminophenylisobutyl POSS, Phenylaminopropyl POSS Cage Mixture, or any combination thereof. Illustrative examples of a Carboxylic Acids POSS are Maleamic Acid-Isobutyl POSS, OctaMaleamic Acid POSS, or any combination thereof. Illustrative examples of an epoxide are Epoxycyclohexylisobutyl POSS, Epoxycyclohexyl POSS Cage Mixture, Glycidyl POSS Cage Mixture, Glycidylisobutyl POSS, Triglycidylisobutyl POSS, Epoxycyclohexyl dimethylsilyl POSS, OctaGlycidyldimethylsilyl POSS, or any combination thereof. In the case of fluoroalkyl POSS examples are Trifluoropropyl POSS Cage Mixture, Trifluoropropylisobutyl POSS, or any combination thereof. In the case of halid POSS is Chloropropylisobutyl POSS, or any combination thereof. In the case of Imides POSS examples are POSS Maleimide Isobutyl, or any combination thereof. In the case of Methacrylates examples are Methacryloisobutyl POSS, Methacrylate Ethyl POSS, Methacrylate Isooctyl POSS, Methacryl POSS Cage Mixture, or any combination thereof. In the case of molecular silica POSS examples are DodecaPhenyl POSS, Isooctyl POSS Cage Mixture, Phenylisobutyl POSS, Phenylisooctyl POSS, Octaisobutyl POSS, OctaMethyl POSS, OctaPhenyl POSS, OctaTMA POSS, OctaTrimethylsiloxy POSS, or any combination thereof. In the case of Norbornenyls examples are NB1010-1,3 -Bis(Norbornenylethyl)-1,1,3,3-tetramethyldisiloxane, Norbornenylethyldimethylchlorosilane, NorbornenylethylDiSilanolisobutyl POSS, Trisnorbornenylisobutyl POSS, or any combination thereof. In the case of Olefins example are Allyisobutyl POSS, Vinylisobutyl POSS, Vinyl POSS Cage Mixture, or any combination thereof. In the case of PEGs, examples include PEG POSS Cage Mixture, MethoxyPEGisobutyl POSS, or any combination thereof. In the case of a silane examples are OctaSilane POSS, or any combination thereof. In the case of silanols examples are DiSilanolisobutyl POSS, TriSilanolEthyl POSS, TriSilanolisobutyl POSS, TriSilanolisooctyl POSS, TriSilanolPhenyl POSS Lithium Salt, TrisilanolPhenyl POSS, TetraSilanol- Phenyl POSS, or any combination thereof. In the case of thiols is Mercaptopropylisobutyl POSS, or any combination thereof.

In certain examples, processes other than electrodeposition processes can also be used in production of the coating which underlies the surface coating. The coating under the surface coating can be made, for example, through a process comprising a combination of the electrodeposition techniques and any other technique selected from the group consisting of annealing and thermal processing, vacuum conditioning, aging, plasma etching, grit blasting, wet etching, ion milling, exposure to electromagnetic radiation such as visible light, UV, and x-ray, other processes, and combinations thereof. In addition, the manufacturing process of the coating can be followed by at least one additional coating process selected from the group consisting of electrodeposition, electroless deposition, surface functionalization, electro-polymerization, spray coating, brush coating, dip coating, electrophoretic deposition, reaction with fluorine gas, plasma deposition, brush plating, chemical vapor deposition, sputtering, physical vapor deposition, passivation through the reaction of fluorine gas, any other coating technique, and any combination thereof.

In some examples, the coatings described herein may provide corrosion resistance to some degree. Damage to the substrate can be caused, for example, by wear, corrosion, high temperature or by a combination of these three factors. For example, the coatings may protect the underlying substrate from degrading or corroding upon exposure to harsh environments such as acids, bases or the like. In addition, the nature of the coatings can provide protection to the substrate even when the coating is scratched, etched or otherwise remove to some degree.

Substrates

In certain embodiments, the substrates that may be present in the articles described herein may be substrates that generally will corrode (to at least some degree), may be heat or chemically sensitive or may degrade to some degree in the absence of a coating or protective layer. The substrate may comprise many conductive or non-conductive materials including, but not limited to, metals, steel, stainless steel, plastics, wood, paper, ceramics or other materials. Where it is desirable to provide an electrodeposited coating on a non-conductive substrate, a conductive primer layer can be provided to the substrate prior to deposition of the electrodeposited coating.

In some examples, the substrate itself may comprise a transition metal alloy, which can permit the omission of the electrodeposited coating or coating adjacent to the substrate. In such configurations, the surface coating materials can be applied directly to the substrate without the need to first apply an electrodeposited coating.

Various specific substrate materials are described in more detail below in connection with the illustrative articles described herein.

Articles

In certain embodiments, the coatings and substrates described herein can be present on one or more surfaces of various different types of articles. The exact use environment of the articles may vary and the exact configuration of the articles may vary.

Figure 2A:
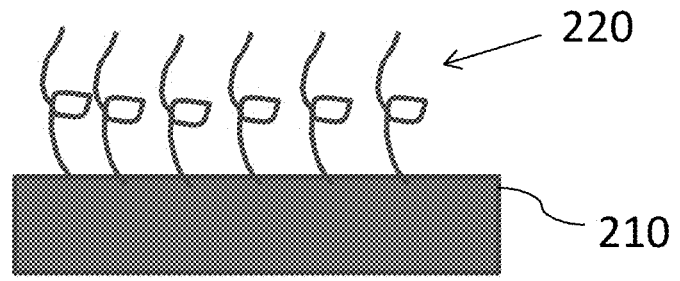
FIG. 2A is an illustration of a surface layer material disposed on an underlying layer, in accordance with certain embodiments.
Figure 2B:
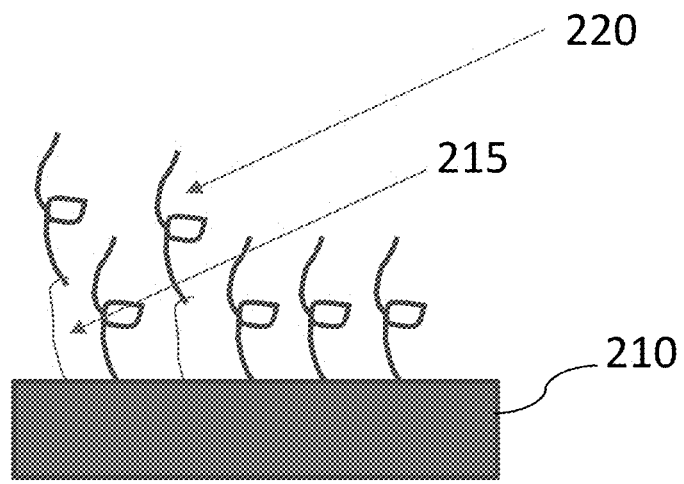
FIG. 2B is an illustration of a surface layer material coupled to an underlying layer through a linking group, in accordance with some embodiments.

For illustration purposes, the articles described herein generally may comprise a coating which comprises two or more layers such as layers 210, 220 shown in FIG. 2A. The layer 210 may be a layer adjacent to an underlying substrate (not shown), e.g., may comprise an electrodeposited layer as noted herein or the layer 210 may be itself be a substrate. The surface coating 220 may comprise chemical moieties which covalently bond to the materials of the layer 210 to retain the surface coating 220 to the layer 210, e.g., can be produced using the silanol or other systems noted herein. As also noted herein, the layer 210 may comprise texture or may be smooth, flat or rough as desired. In certain instances, the chemical moieties of the surface coating may be coupled to the chemical materials of the layer 210 through one or more linking groups 215 as shown in FIG. 2B. For example, the linking groups may be from a silane system (as noted herein) which is added to the layer 210 prior to addition of the chemical moieties of the surface coating 220.

Figure 3A:
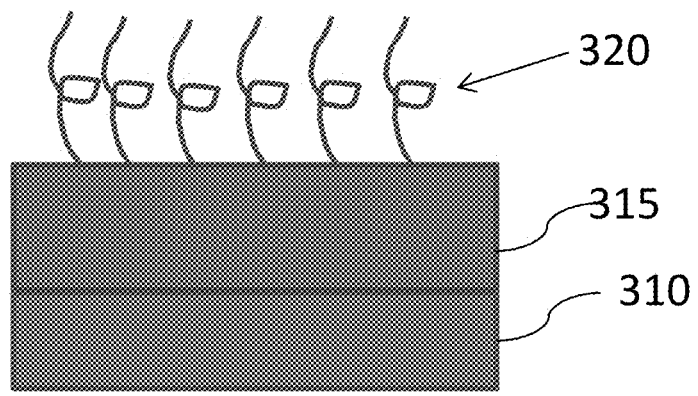
FIG. 3A is an illustration of an intermediate layer present between a surface layer and an underlying layer, in accordance with some examples.

In another illustration, an intermediate layer may be present between the surface coating and other coatings of the article. Referring to FIG. 3A, a surface coating 320 is shown is being covalently bound to material of an intermediate layer 315. The intermediate layer 315 is deposited on a layer 310 that can be adjacent to a substrate (not shown). The composition of the intermediate layer 315 may vary as noted herein and typically comprises one or more transition metals, transition metal alloys or other metal containing layers. The intermediate layer 315 may further comprise particles or other materials as well.

Figure 3B:
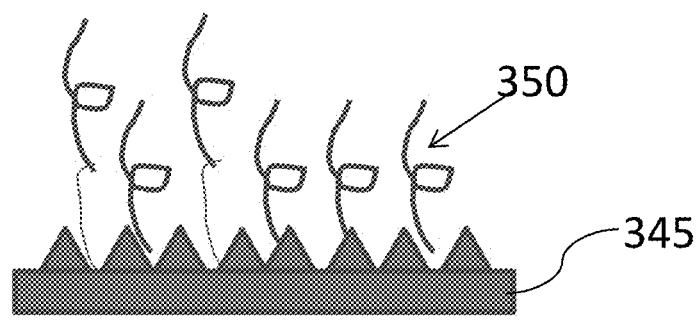
FIG. 3B is an illustration of a particular arrangement of surface materials within features of an underlying layer, in accordance with some examples.

As noted herein, the layer adjacent to the substrate may comprise surface features or texture. Referring to FIG. 3B, an article is shown that comprises a surface coating 350 bonded to an underlying layer 345. The surface moieties of the coating 350 are shown as being coupled between surface features of the coating 345 in some instances and on top of surface features in the coating 345 in other instances. If desired, the coating 350 may be present across the entire planar surface of the layer 345 such that fluids contacting the surface 350 generally do not contact the underlying layer 345.

Figure 3C:
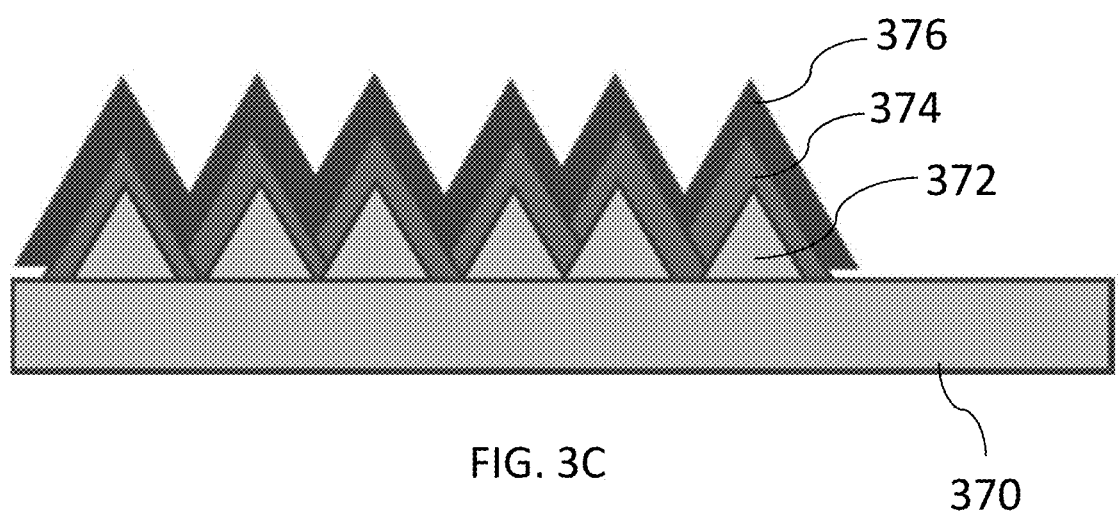
FIG. 3C is an illustration of a layered arrangement, in accordance with some examples.

In some examples, a substrate 370 is shown in FIG. 3C that comprises surface features 372. The surface features 372 may be produced by etching of the substrate 370 or by deposition of a coating. An electrodeposited coating 374 can be present across the surface of the substrate, and a surface coating 376 can be present across the surface of the electrodeposited coating 374. Additional layers may also be present.

Certain illustrative articles and certain illustrative components present on the articles are now described for illustration purposes.

Figure 4A:
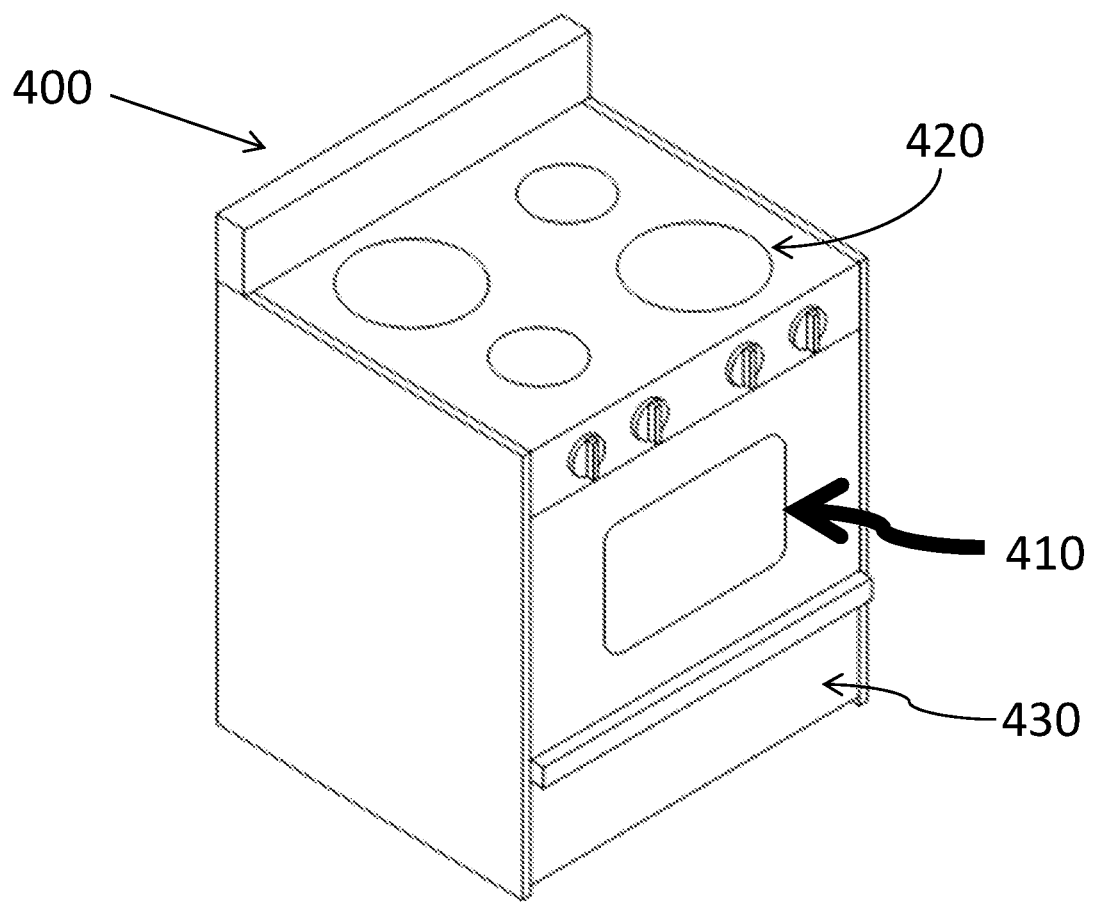
FIG. 4A is an illustration of an oven comprising a cooktop, in accordance with some examples.
Figure 4B:
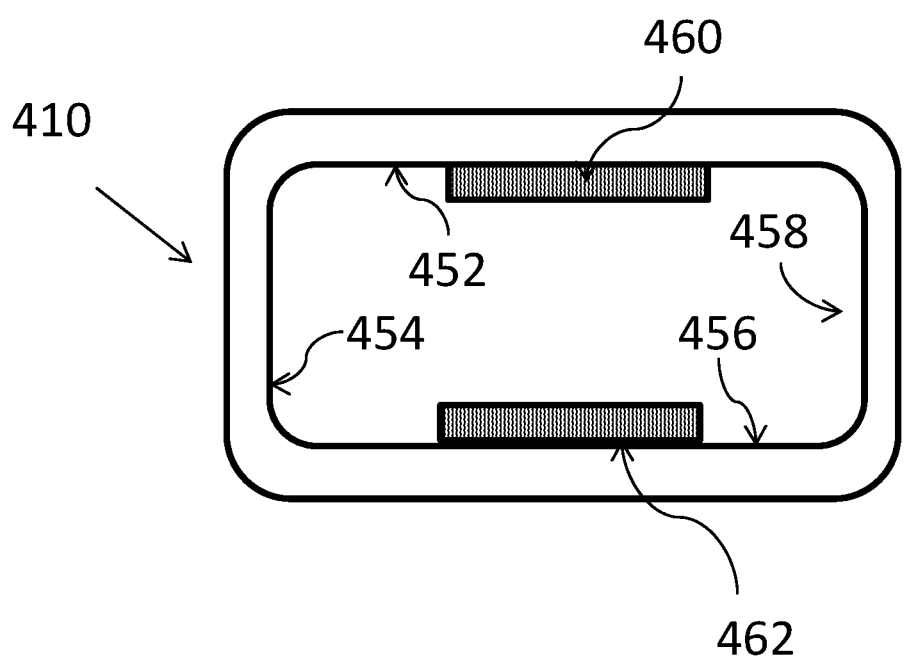
FIG. 4B is an illustration of an oven cavity, in accordance with some configurations.

In certain embodiments, a cooking oven may comprise at least one surface or area comprising the surface coatings (and/or the other coatings and layers) described herein. Referring to FIG. 4A, a cooking oven 400 is shown that comprises an oven chamber 410 and one or more heating elements (not shown). The heating elements can be electric heating elements or a fuel source such as natural gas or propane may instead be used in combination with the heating elements. One or more surfaces of the oven chamber 410 may comprise a surface coating as described herein. For example, one, two, three or all surfaces 452, 454, 456 and 458 (see FIG. 4B) of the oven chamber 410 may comprises a surface coating as described herein disposed on the underlying substrate or disposed on an underlying electrodepositing coating. The oven 400 may optionally comprise a drawer 430 and a cooktop surface 420, which as noted below may also comprise a surface coating. Referring to the close up view in FIG. 4B, the oven cavity 410 is shown as comprising a top surface 452, sidewalls 454 and 458 and a bottom surface 456. Heating elements 460, 462 are shown as being present on the top surface 452 and bottom surface 456, respectively. While not shown, the heating elements 460, 462 are typically electrically coupled to a controller or control board to provide a current to the heating elements 460, 462 for heating of the oven 400.

In certain instances, one or more of the surfaces 452, 454, 456 and 458 may comprise a first coating adjacent to the substrate of the article, e.g., an electrodeposited coating, and a surface coating disposed on the first coating. If desired, the first coating can be omitted and the electrodeposited coating may be disposed directly on the substrate. In some instances, the first coating on one or more of the surfaces 452, 454, 456 and 458 may comprise one, two, three or more of Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In other examples, the first coating on one or more of the surfaces 452, 454, 456 and 458 may comprise nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In certain examples, the first coating on one or more of the surfaces 452, 454, 456 and 458 may be an electrodeposited coating comprising nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Nickel-Molybdenum or other Nickel-X alloys where X is a transition metal listed herein. In other examples, the first coating on one or more of the surfaces 452, 454, 456 and 458 may be an electrodeposited coating comprising Zinc in combination with one or more of Scandium, Titanium, Vanadium, Chromium, Manganese, Iron, Cobalt, Copper, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Zinc-Molybdenum or other Zinc-X alloys where X is a transition metal listed herein. In other examples, the first coating on one or more of the surfaces 452, 454, 456 and 458 may be an electrodeposited coating comprising Copper in combination with one or more of Scandium, Titanium, Vanadium, Chromium, Manganese, Iron, Cobalt, Zinc, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Copper-Molybdenum or other Copper-X alloys where X is a transition metal listed herein. As noted herein, the surface coating of one or more of the surfaces 452, 454, 456 and 458 typically is produced using one or more silane systems and silane systems comprising reactive silanol groups or other reactive groups may be particularly desirable, e.g., silane systems comprising aqueous, alcohol-free products of epoxysilanes may be particularly suitable. Similar coatings can be present on surfaces of a microwave oven, though in a microwave oven the underlying substrate present on the various internal surfaces of the microwave oven to form the microwave cavity is typically a plastic substrate rather than a metal substrate.

In some examples, surfaces of the cooktop 420 of the stove or oven 400 may also comprise one or more surface coatings as described herein. The cooktop may comprise a smooth glass surface comprising the surface coating, may comprise individual burner elements each comprising the surface coating or may comprise an inductive cooktop surface that comprises the surface coating. In some examples, the surface coating may be uniform across the surface of the cooktop, whereas in other examples, the surface coating is present only above the burner surface or on the burners of the cooktop.

In certain embodiments, one or more surfaces of the cooktop 420 may comprise a first coating adjacent to the substrate of the article, e.g., an electrodeposited coating, and a surface coating disposed on the first coating. If desired, the first coating can be omitted and the electrodeposited coating may be disposed directly on the substrate. In some instances, the first coating of the cooktop 420 may comprise one, two, three or more of Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In other examples, the first coating of the cooktop 420 may comprise nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In certain examples, the first coating of the cooktop 420 may be an electrodeposited coating comprising nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Nickel-Molybdenum or other Nickel-X alloys where X is a transition metal listed herein. In other examples, the first coating of the cooktop 420 may be an electrodeposited coating comprising Zinc in combination with one or more of Scandium, Titanium, Vanadium, Chromium, Manganese, Iron, Cobalt, Copper, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Zinc-Molybdenum or other Zinc-X alloys where X is a transition metal listed herein. In other examples, the first coating of the cooktop 420 may be an electrodeposited coating comprising Copper in combination with one or more of Scandium, Titanium, Vanadium, Chromium, Manganese, Iron, Cobalt, Zinc, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Copper-Molybdenum or other Copper-X alloys where X is a transition metal listed herein. As noted herein, the surface coating of the cooktop 420 typically is produced using one or more silane systems and silane systems comprising reactive silanol groups or other reactive groups may be particularly desirable, e.g., silane systems comprising aqueous, alcohol-free products of epoxysilanes may be particularly suitable.

In certain examples, the coatings present on the oven surfaces and/or cooktop may provide non-stick surfaces. For example, food residue easily sticks to porcelain enamel coatings, which are used to coat most existing oven cavities and cooktops. Foods are often times spilled upon the surface of oven cavities and cooktops and baked into a hard residue that clings strongly to the enamel coating. The most common technique for removing food residue from oven cavities in residential applications is applying a high temperature cleaning cycle called a "self-cleaning" function. This function applies a high enough temperature for a short time and results in the pyrolysis of the food residue on the surfaces of the oven cavity. A "Self-cleaning" function increases energy consumption of the oven. Moreover, its installation adds to the material and manufacturing costs of the oven appliance. Cleaning of cooktops is even more problematic than oven cavities. Consumers usually need to apply a harsh chemical, a sharp cleaning pad, and a large amount of force to remove food residue from the cooktops. This will often scratch and/or damage the cooktop coating. Due to these problems for cleaning food residue from ovens, there is a great interest in replacing porcelain enamel with suitable coatings in various appliances used for heating. The coatings described herein can provide non-stick functionality to ease cleaning of spills and other residue.

Figure 5:
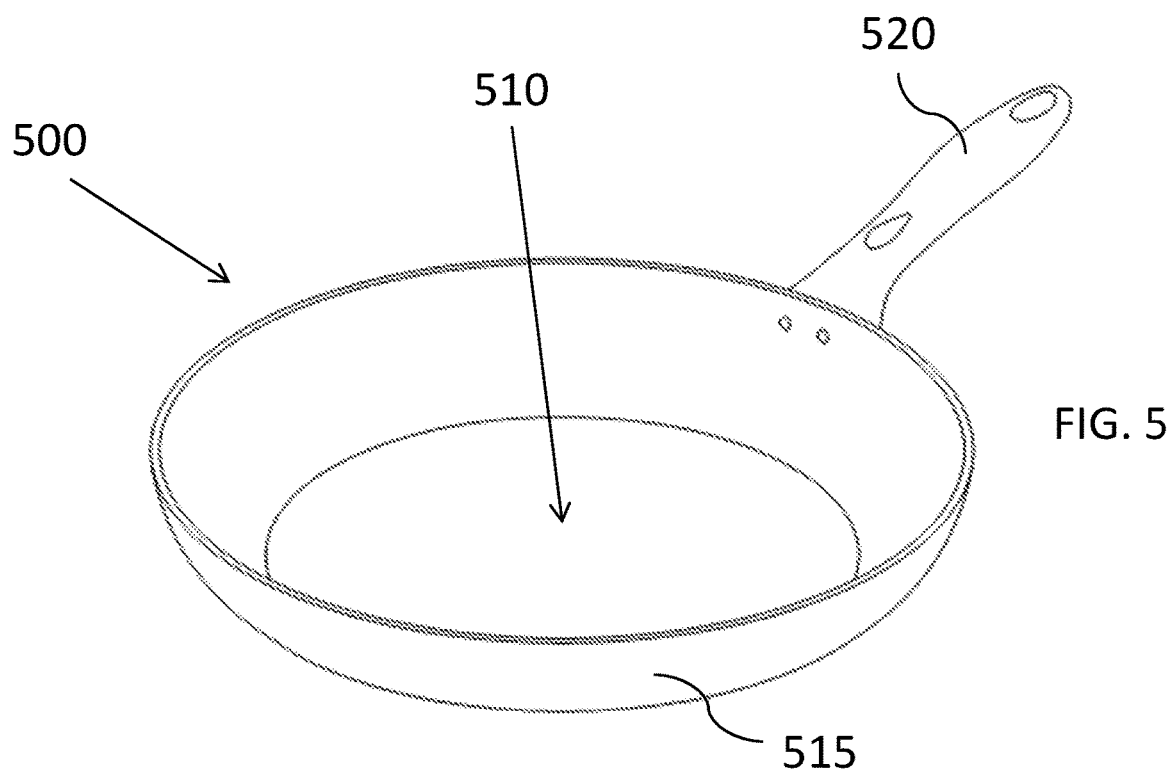
FIG. 5 is an illustration of a cooking device, in accordance with certain examples.

In some examples, the coatings described herein may be present on a cooking device such as a pot, pan, lid, etc. A simplistic illustration of a cooking pan 500 is shown in FIG. 5. The pan 500 comprises a cooking surface 510 that receives food, a bottom surface 515 that contacts a burner of a cooktop, and a handle 520 for placing and removing the pan 500 from the cooktop (not shown). In some examples, only the cooking surface 510 comprises one or more of the coatings described herein. In other instances, both the cooking surface 510 and the bottom surface 515 comprise a coating as described herein, but the coatings need not be the same.

In certain embodiments, one or more surfaces of the cooking device may comprise a first coating adjacent to the substrate of the article, e.g., an electrodeposited coating, and a surface coating disposed on the first coating. If desired, the first coating can be omitted and the electrodeposited coating may be disposed directly on the substrate. In some instances, the first coating of the cooking device may comprise one, two, three or more of Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In other examples, the first coating of the cooking device may comprise nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In certain examples, the first coating of the cooking device may be an electrodeposited coating comprising nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Nickel-Molybdenum or other Nickel-X alloys where X is a transition metal listed herein. In other examples, the first coating of the cooking device may be an electrodeposited coating comprising Zinc in combination with one or more of Scandium, Titanium, Vanadium, Chromium, Manganese, Iron, Cobalt, Copper, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Zinc-Molybdenum or other Zinc-X alloys where X is a transition metal listed herein. In other examples, the first coating of the cooking device may be an electrodeposited coating comprising Copper in combination with one or more of Scandium, Titanium, Vanadium, Chromium, Manganese, Iron, Cobalt, Zinc, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Copper-Molybdenum or other Copper-X alloys where X is a transition metal listed herein. As noted herein, the surface coating of the cooking device typically is produced using one or more silane systems and silane systems comprising reactive silanol groups or other reactive groups may be particularly desirable, e.g., silane systems comprising aqueous, alcohol-free products of epoxysilanes may be particularly suitable.

Figure 6A:
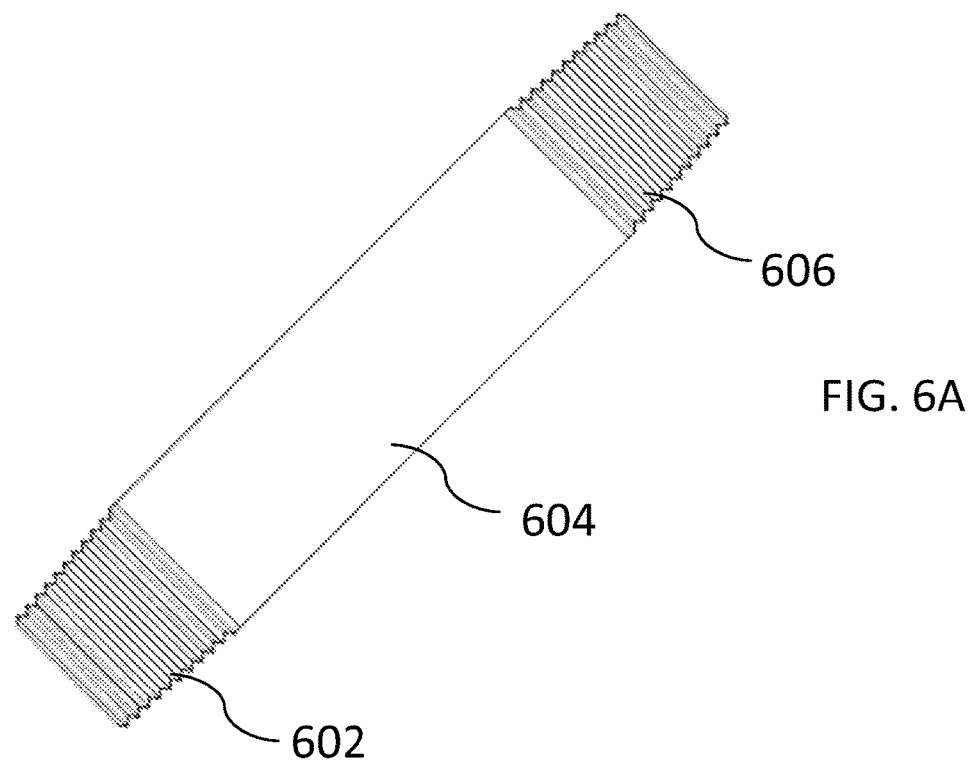
FIG. 6A is an illustration of a pipe and FIG. 6B is a cross-section of the pipe, in accordance with some examples.

In other examples, the coatings described herein can be used on or in (or both) a pipe or fluid conduit. One illustration is shown in FIG. 6A. The pipe 600 comprises a first end 602 and a second end 606 and a body 604 between the first end 602 and the second end 606. The body 604 is typically hollow to permit fluids, e.g., liquids, gases, etc., to pass from the end 602 to the end 606 (or vice versa). While threads are shown at the ends 602, 606, these threads are optional. In some examples, one or more of the coatings described herein can be present on an external surface of the pipe 600. For example, one or more external surfaces of the pipe may comprise a first coating adjacent to the substrate of the article, e.g., an electrodeposited coating, and a surface coating disposed on the first coating. If desired, the first coating can be omitted and the electrodeposited coating may be disposed directly on the substrate. In some instances, the first coating of the cooking device may comprise one, two, three or more of Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In other examples, the first coating on one or more external surfaces of the pipe may comprise nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In certain examples, the first coating on one or more external surfaces of the pipe may be an electrodeposited coating comprising nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Nickel-Molybdenum or other Nickel-X alloys where X is a transition metal listed herein. In other examples, the first coating on one or more external surfaces of the pipe may be an electrodeposited coating comprising Zinc in combination with one or more of Scandium, Titanium, Vanadium, Chromium, Manganese, Iron, Cobalt, Copper, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Zinc-Molybdenum or other Zinc-X alloys where X is a transition metal listed herein. In other examples, the first coating on one or more external surfaces of the pipe may be an electrodeposited coating comprising Copper in combination with one or more of Scandium, Titanium, Vanadium, Chromium, Manganese, Iron, Cobalt, Zinc, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Copper-Molybdenum or other Copper-X alloys where X is a transition metal listed herein. As noted herein, the surface coating on one or more external surfaces of the pipe typically is produced using one or more silane systems and silane systems comprising reactive silanol groups or other reactive groups may be particularly desirable, e.g., silane systems comprising aqueous, alcohol-free products of epoxysilanes may be particularly suitable.

Figure 6B:
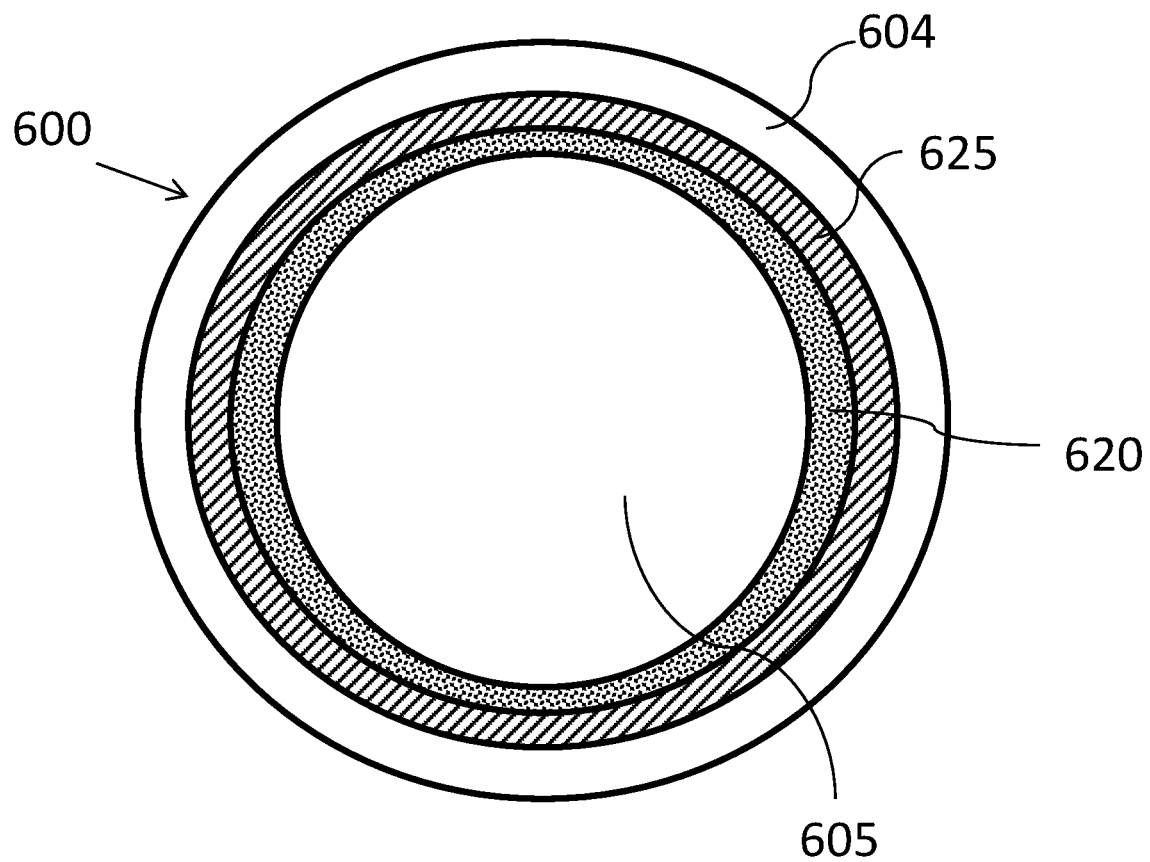

In other instances, one or more of the coatings described herein can be present on an internal surface of the pipe 600, e.g., a surface that is exposed to liquids, gases, etc. when the pipe is a component of a fluid circuit designed to provide fluids from one site to another such as industrial applications that carry chemical solvents, petroleum products, etc. Referring to FIG. 6B, a cross-sectional view is shown where the pipe 600 comprises a surface coating 620, disposed on an electrodeposited coating 625. The electrodeposited coating 625 is disposed on the body 604. The coatings 620, 625 may be present along the entire longitudinal direction of the pipe 600 such that no exposed internal surfaces of the pipe 600 are without the coatings. As fluid travels through the interior space 605 of the pipe 600 it will contact the coatings present on the inner surfaces of the pipe 600. While not shown, where the body 604 does not comprise a suitable material to receive the electrodeposited coating, a transition metal alloy material similar to the substrate materials described herein may be deposited between the body 604 and the electrodeposited coating 625. In some examples, one or more internal surfaces of the pipe may comprise a first coating adjacent to the substrate of the article, e.g., an electrodeposited coating, and a surface coating disposed on the first coating. If desired, the first coating can be omitted and the electrodeposited coating may be disposed directly on the substrate. In some instances, the first coating of the pipe may comprise one, two, three or more of Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In other examples, the first coating on one or more internal surfaces of the pipe may comprise nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In certain examples, the first coating on one or more internal surfaces of the pipe may be an electrodeposited coating comprising nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Nickel-Molybdenum or other Nickel-X alloys where X is a transition metal listed herein. In other examples, the first coating on one or more internal surfaces of the pipe may be an electrodeposited coating comprising Zinc in combination with one or more of Scandium, Titanium, Vanadium, Chromium, Manganese, Iron, Cobalt, Copper, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Zinc-Molybdenum or other Zinc-X alloys where X is a transition metal listed herein. In other examples, the first coating on one or more internal surfaces of the pipe may be an electrodeposited coating comprising Copper in combination with one or more of Scandium, Titanium, Vanadium, Chromium, Manganese, Iron, Cobalt, Zinc, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Copper-Molybdenum or other Copper-X alloys where X is a transition metal listed herein. As noted herein, the surface coating on one or more internal surfaces of the pipe typically is produced using one or more silane systems and silane systems comprising reactive silanol groups or other reactive groups may be particularly desirable, e.g., silane systems comprising aqueous, alcohol-free products of epoxysilanes may be particularly suitable. If desired, these coatings and materials can be present on both the internal and external surfaces of the pipe.

Figure 7:
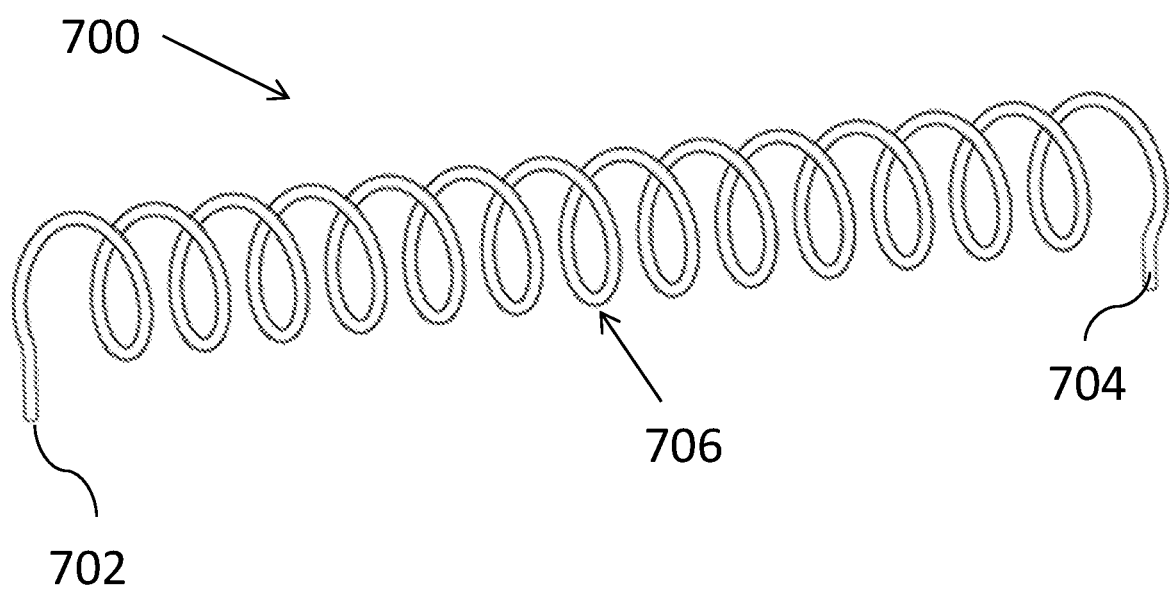
FIG. 7 is an illustration of a tubing coil, in accordance with certain embodiments.

In certain examples, one or more of the coatings described herein can be present on flexible hoses or tubing. For example, hydraulic hoses, tubing, etc. commonly used in hydraulic applications, e.g., brake lines, rubber lines, etc. may comprise a coating on an exterior or interior surface (or both). Similarly, tubing coils commonly used in refrigeration or cooling systems may comprise one or more coatings on an interior surface, exterior surface or both. Referring to FIG. 7 a tubing coil 700 is shown as comprising a first end 702, a second end 704 and a body comprising coil turn 706 between the first end 702 and the second end 704. The body 706 may comprise a transition metal alloy similar to the substrates described herein or a coating comprising a transition metal alloy as described herein may be deposited, e.g., electrodeposited, between a surface coating and the body 706. The coiled tubing 700 may carry many different types of materials including, but not limited to, liquid, gases, refrigerants, organic solvents, acids, bases or other materials in a liquid or gaseous state. In some configurations, one or more surfaces of the tubing may comprise a first coating adjacent to the substrate of the article, e.g., an electrodeposited coating, and a surface coating disposed on the first coating. If desired, the first coating can be omitted and the electrodeposited coating may be disposed directly on the substrate. In some instances, the first coating of the tubing may comprise one, two, three or more of Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In other examples, the first coating on one or more surfaces of the tubing may comprise nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In certain examples, the first coating on one or more surfaces of the tubing may be an electrodeposited coating comprising nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Nickel-Molybdenum or other Nickel-X alloys where X is a transition metal listed herein. In other examples, the first coating on one or more surfaces of the tubing may be an electrodeposited coating comprising Zinc in combination with one or more of Scandium, Titanium, Vanadium, Chromium, Manganese, Iron, Cobalt, Copper, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Zinc-Molybdenum or other Zinc-X alloys where X is a transition metal listed herein. In other examples, the first coating on one or more surfaces of the tubing may be an electrodeposited coating comprising Copper in combination with one or more of Scandium, Titanium, Vanadium, Chromium, Manganese, Iron, Cobalt, Zinc, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Copper-Molybdenum or other Copper-X alloys where X is a transition metal listed herein. As noted herein, the surface coating on one or more surfaces of the tubing typically is produced using one or more silane systems and silane systems comprising reactive silanol groups or other reactive groups may be particularly desirable, e.g., silane systems comprising aqueous, alcohol-free products of epoxysilanes may be particularly suitable.

Figure 8A:
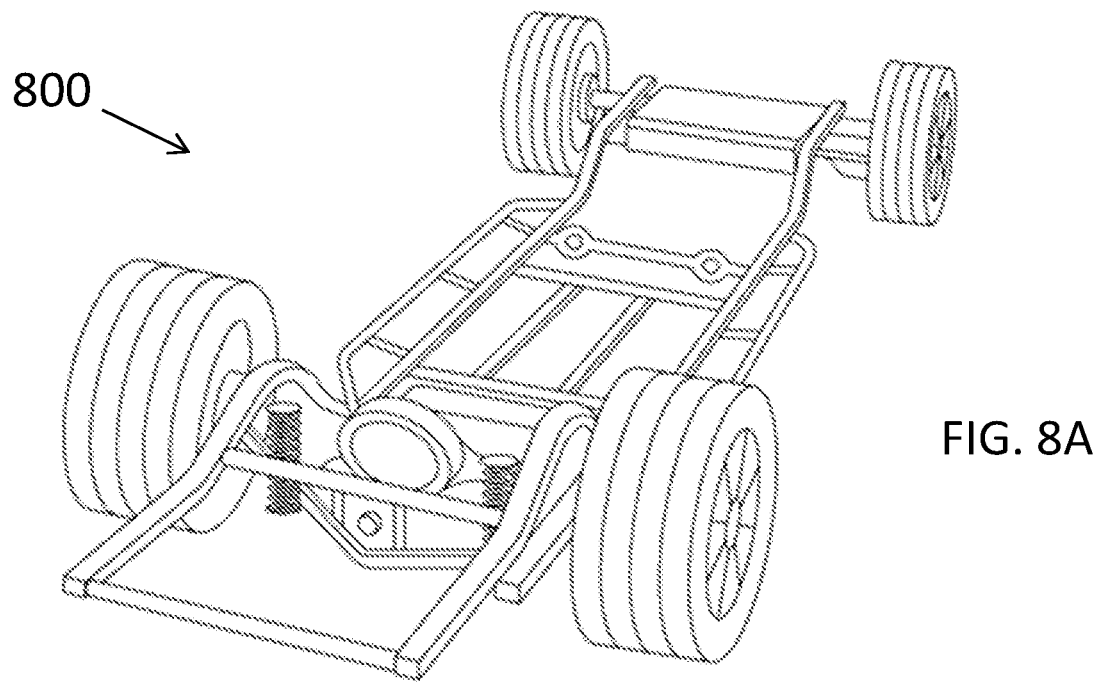
FIG. 8A is an illustration of a vehicle chassis, in accordance with certain embodiments.

In certain embodiments, the coatings described herein may be present on a vehicle chassis or undercarriage. Referring to FIG. 8A, an automotive vehicle chassis 800 is shown. The vehicle chassis comprises a metal frame structure designed to support an automotive body, engine, passengers, etc. The metal frame structure may be coated with one of more of the coatings described herein. In addition, the wheels or rims attached to the chassis can also comprise one or more of the coatings described herein. In some configurations, one or more surfaces of the vehicle chassis, undercarriage or components coupled thereto may comprise a first coating adjacent to the substrate of the article, e.g., an electrodeposited coating, and a surface coating disposed on the first coating. If desired, the first coating can be omitted and the electrodeposited coating may be disposed directly on the substrate. In some instances, the first coating of the vehicle chassis, undercarriage or components may comprise one, two, three or more of Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In other examples, the first coating on one or more surfaces of the vehicle chassis, undercarriage or components coupled thereto may comprise nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In certain examples, the first coating on one or more surfaces of the vehicle chassis, undercarriage or components coupled thereto may be an electrodeposited coating comprising nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Nickel-Molybdenum or other Nickel-X alloys where X is a transition metal listed herein. In other examples, the first coating on one or more surfaces of the vehicle chassis, undercarriage or components coupled thereto may be an electrodeposited coating comprising Zinc in combination with one or more of Scandium, Titanium, Vanadium, Chromium, Manganese, Iron, Cobalt, Copper, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Zinc-Molybdenum or other Zinc-X alloys where X is a transition metal listed herein. In other examples, the first coating on one or more surfaces of the vehicle chassis, undercarriage or components coupled thereto may be an electrodeposited coating comprising Copper in combination with one or more of Scandium, Titanium, Vanadium, Chromium, Manganese, Iron, Cobalt, Zinc, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Copper-Molybdenum or other Copper-X alloys where X is a transition metal listed herein. As noted herein, the surface coating on one or more surfaces of the vehicle chassis, undercarriage or components coupled thereto typically is produced using one or more silane systems and silane systems comprising reactive silanol groups or other reactive groups may be particularly desirable, e.g., silane systems comprising aqueous, alcohol-free products of epoxysilanes may be particularly suitable.

Figure 8B:
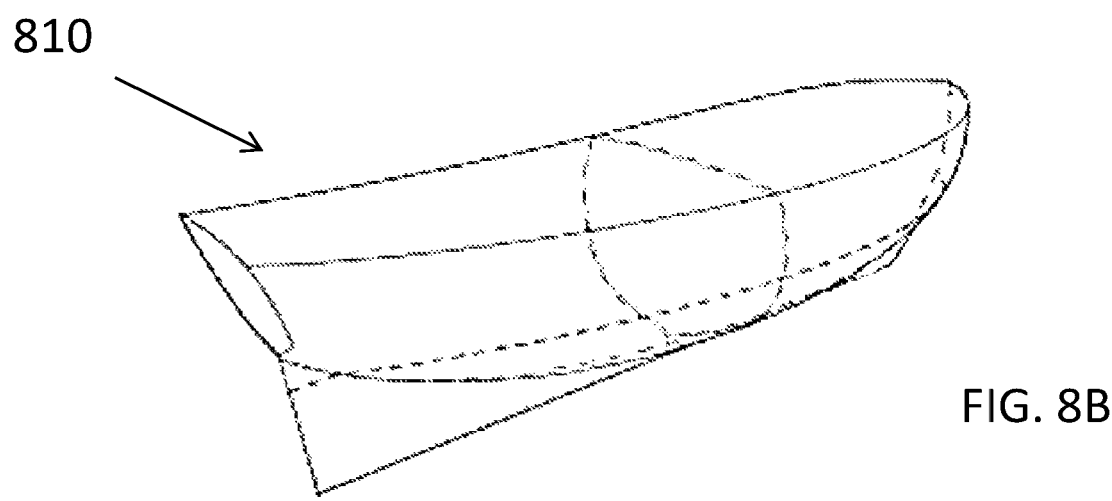
FIG. 8B is an illustration of a ship hull, in accordance with certain embodiments.

In other embodiments, the coatings described herein may be present on a ship hull. Referring to FIG. 8B, a ship hull 810 is shown that comprises metal structure (though wooden ship hulls could be used instead) comprising one or more of the coatings described herein. In some instances, substantially all exterior surface of the ship hull 810 that contact water may comprise the coatings, whereas in other instances only select areas of the ship hulls may comprise the coatings.

In certain examples, one or more surfaces of the ship hull or components coupled thereto may comprise a first coating adjacent to the substrate of the article, e.g., an electrodeposited coating, and a surface coating disposed on the first coating. If desired, the first coating can be omitted and the electrodeposited coating may be disposed directly on the substrate. In some instances, the first coating of the ship hull or components coupled thereto may comprise one, two, three or more of Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In other examples, the first coating on one or more surfaces of the ship hull or components coupled thereto may comprise nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In certain examples, the first coating on the ship hull or components coupled thereto may be an electrodeposited coating comprising nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Nickel-Molybdenum or other Nickel-X alloys where X is a transition metal listed herein. In other examples, the first coating on the ship hull or components coupled thereto may be an electrodeposited coating comprising Zinc in combination with one or more of Scandium, Titanium, Vanadium, Chromium, Manganese, Iron, Cobalt, Copper, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Zinc-Molybdenum or other Zinc-X alloys where X is a transition metal listed herein. In other examples, the first coating on the ship hull or components coupled thereto may be an electrodeposited coating comprising Copper in combination with one or more of Scandium, Titanium, Vanadium, Chromium, Manganese, Iron, Cobalt, Zinc, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Copper-Molybdenum or other Copper-X alloys where X is a transition metal listed herein. As noted herein, the surface coating on one or more surfaces of the ship hull or components coupled thereto typically is produced using one or more silane systems and silane systems comprising reactive silanol groups or other reactive groups may be particularly desirable, e.g., silane systems comprising aqueous, alcohol-free products of epoxysilanes may be particularly suitable.

Figure 8C:
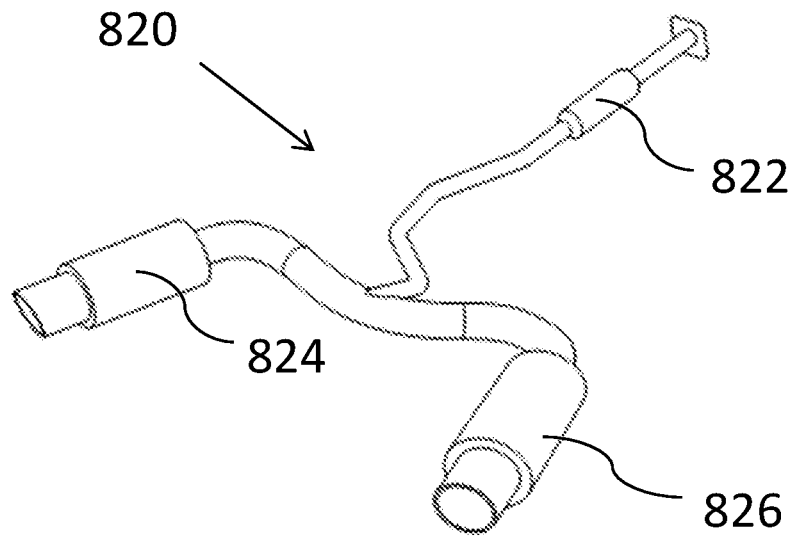
FIG. 8C is an illustration of an exhaust system, in accordance with some configurations.

In some examples, the coatings described herein may be present on one or more components of an exhaust system for a vehicle. Referring to FIG. 8C, an exhaust system 820 comprises a catalytic converter 822 and mufflers 824, 826. In some examples, the coatings described herein may be present on all exterior surfaces of the exhaust system 820, whereas in other instances, the coatings may only be present on certain areas of the exhaust system 820. For example, the mufflers 824, 826 and connecting pipes may comprise the coatings and the catalytic converter 822 may operate at too high a temperature for the coatings to remain intact.

In certain examples, one or more surfaces of the exhaust system or components coupled thereto may comprise a first coating adjacent to the substrate of the article, e.g., an electrodeposited coating, and a surface coating disposed on the first coating. If desired, the first coating can be omitted and the electrodeposited coating may be disposed directly on the substrate. In some instances, the first coating of the exhaust system or components coupled thereto may comprise one, two, three or more of Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In other examples, the first coating on one or more surfaces of the exhaust system or components coupled thereto may comprise nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable. In certain examples, the first coating of the exhaust system or components coupled thereto may be an electrodeposited coating comprising nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Nickel-Molybdenum or other Nickel-X alloys where X is a transition metal listed herein. In other examples, the first coating of the exhaust system or components coupled thereto may be an electrodeposited coating comprising Zinc in combination with one or more of Scandium, Titanium, Vanadium, Chromium, Manganese, Iron, Cobalt, Copper, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Zinc-Molybdenum or other Zinc-X alloys where X is a transition metal listed herein. In other examples, the first coating of the exhaust system or components coupled thereto may be an electrodeposited coating comprising Copper in combination with one or more of Scandium, Titanium, Vanadium, Chromium, Manganese, Iron, Cobalt, Zinc, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Copper-Molybdenum or other Copper-X alloys where X is a transition metal listed herein. As noted herein, the surface coating on one or more surfaces of the of the exhaust system or components coupled thereto typically is produced using one or more silane systems and silane systems comprising reactive silanol groups or other reactive groups may be particularly desirable, e.g., silane systems comprising aqueous, alcohol-free products of epoxysilanes may be particularly suitable.

Figure 8D:
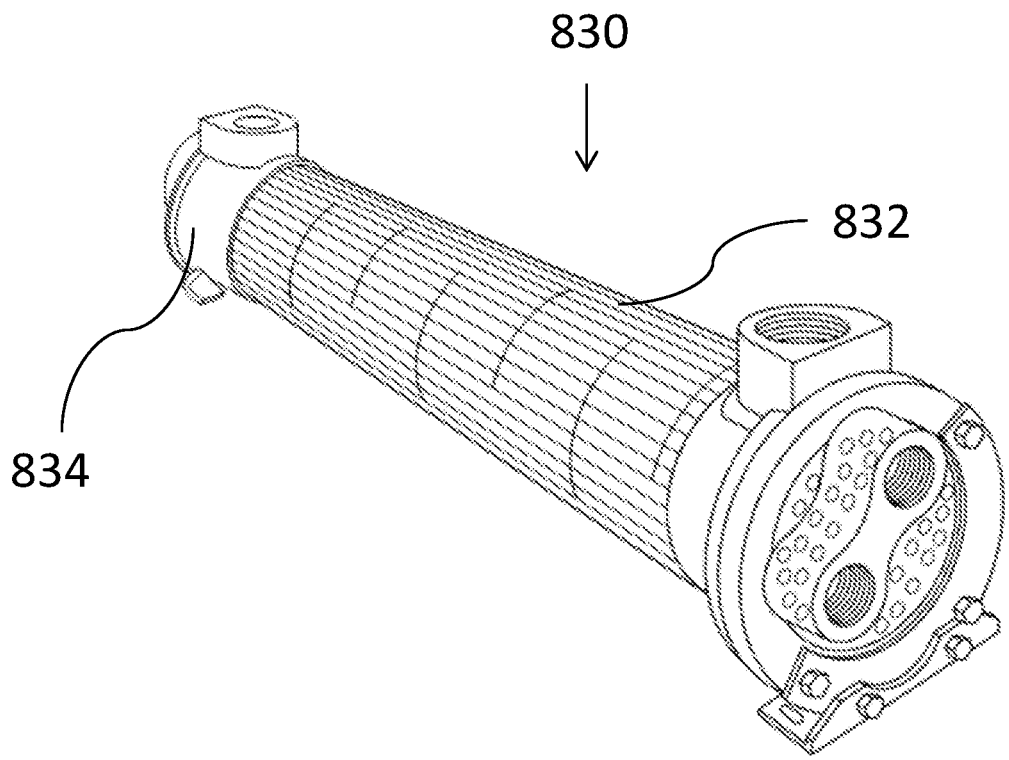
FIGS. 8D and 8E are illustration of heat exchangers, in accordance with certain configurations.

In other instances, the coatings described herein may be present on one or more surfaces of a heat exchanger. The exact configuration and use of the heat exchanger can vary and illustrative applications include industrial heat exchangers (e.g., used in industrial processes to heat/cool a fluid or other material), automotive heat exchangers (e.g., radiators, oil coolers, transmission coolers, air conditioning heat exchangers, etc.), heat exchangers used in commercial, automotive and domestic heating, ventilation and cooling (HVAC) applications, heat exchangers used in refrigeration and freezer systems, heat exchangers used with microprocessors or other electronic components to cool them and other devices where heat is transferred to cool or heat a fluid or gas or an article. One illustration of an industrial heat exchanger is shown in FIG. 8D. This shell and tube heat exchanger design is but one illustration of an industrial heat exchanger. The heat exchanger 830 comprises an inner tube 832 and outer tubes 834. A first fluid can run through the inner tube 832, and a second fluid can run through the outer tubes 834 to transfer heat from the inner tube 832 to the outer tubes 834. In some instances, the internal surfaces of the inner tube 832 may comprise the coatings described herein. In other instances, all surfaces of the inner tube 832 may comprise the coatings described herein. In some configurations, the exterior surfaces of the outer tubes 834 may also comprise the coatings described herein.

Figure 8E:
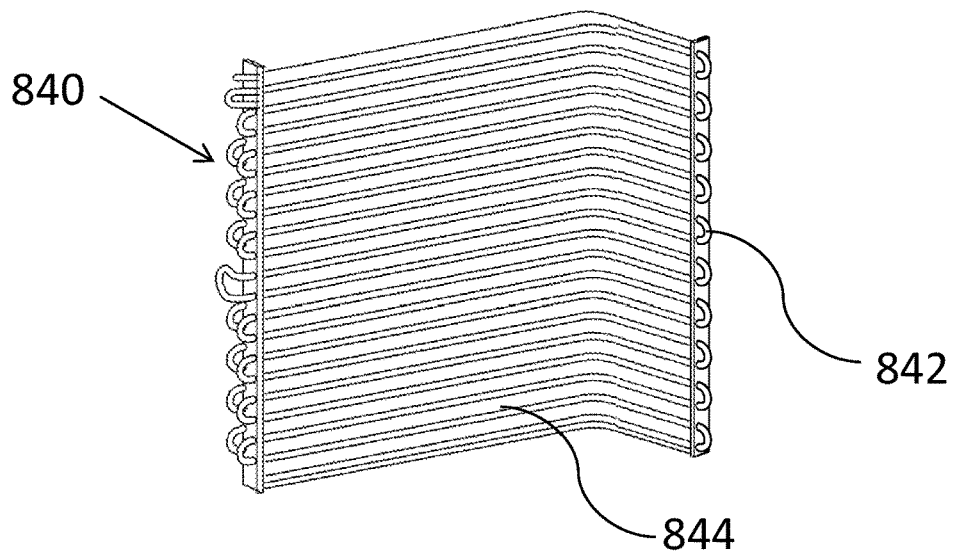

Another illustration of a heat exchanger which might be used in a domestic air conditioning system is shown in FIG. 8E. The heat exchanger 840 comprises a series of coils 842 and cooling fins 844. In some instances, the external surfaces of the coils 842 may comprise one or more of the coatings described herein. In other examples, the interior surfaces of the coils 842 may comprise one or more of the coatings described herein. In other examples, both the interior surfaces and the exterior surfaces of the coils 842 may comprise one or more of the coatings described herein. If desired, the cooling fins 844 may also comprise one or more of the coatings described herein. The heat exchanger 840 is typically used in domestic and commercial air conditioning systems, e.g., such as those including heat pumps, and may be used in above-ground and below ground applications, e.g., can be present in ground-coupled heat exchangers used in geothermal heat pumps.

In certain examples, one or more internal surfaces, external surfaces or both of the heat exchanger may comprise a first coating adjacent to the substrate of the article, e.g., an electrodeposited coating, and a surface coating disposed on the first coating. If desired, the first coating can be omitted and the electrodeposited coating may be disposed directly on the substrate. In some instances, the first coating on one or more internal surfaces, external surfaces or both of the heat exchanger may comprise one, two, three or more of Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In other examples, the first coating on one or more internal surfaces, external surfaces or both of the heat exchanger may comprise nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable. In certain examples, the first coating on one or more internal surfaces, external surfaces or both of the heat exchanger may be an electrodeposited coating comprising nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Nickel-Molybdenum or other Nickel-X alloys where X is a transition metal listed herein. In other examples, the first coating on one or more internal surfaces, external surfaces or both of the heat exchanger may be an electrodeposited coating comprising Zinc in combination with one or more of Scandium, Titanium, Vanadium, Chromium, Manganese, Iron, Cobalt, Copper, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Zinc-Molybdenum or other Zinc-X alloys where X is a transition metal listed herein. In other examples, the first coating on one or more internal surfaces, external surfaces or both of the heat exchanger may be an electrodeposited coating comprising Copper in combination with one or more of Scandium, Titanium, Vanadium, Chromium, Manganese, Iron, Cobalt, Zinc, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Copper-Molybdenum or other Copper-X alloys where X is a transition metal listed herein. As noted herein, the surface coating on one or more internal surfaces, external surfaces or both of the heat exchanger typically is produced using one or more silane systems and silane systems comprising reactive silanol groups or other reactive groups may be particularly desirable, e.g., silane systems comprising aqueous, alcohol-free products of epoxysilanes may be particularly suitable.

Figure 9A:
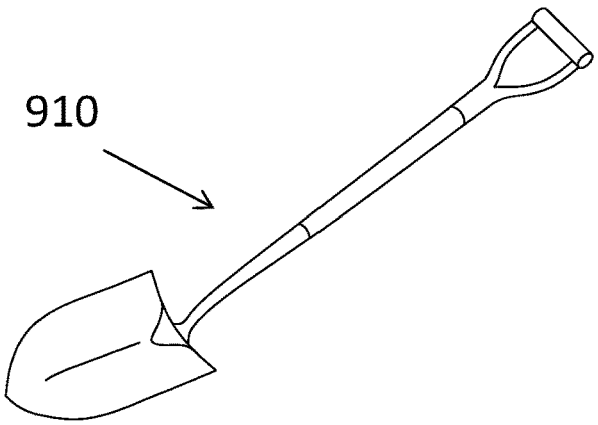
FIGS. 9A and 9B are illustrations of outdoor equipment implements, in accordance with some examples.
Figure 9B:
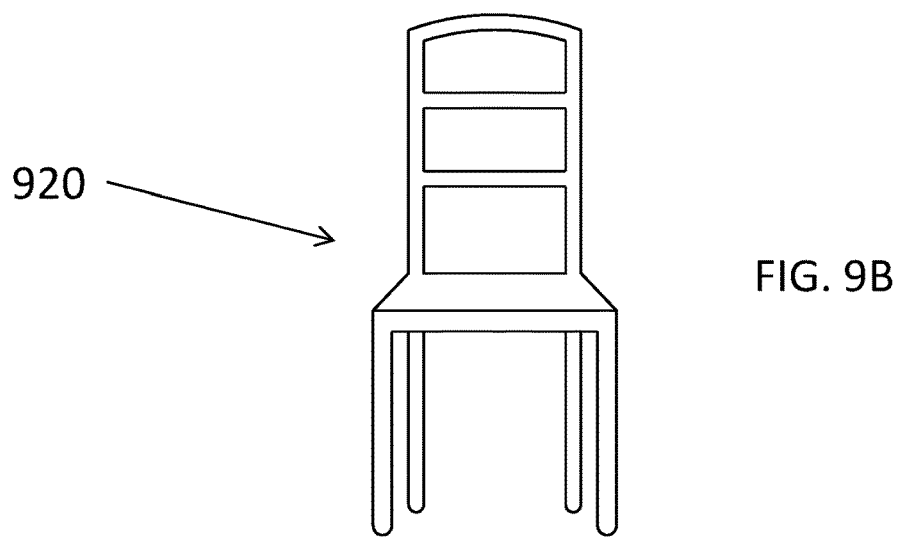
Figure 9C:
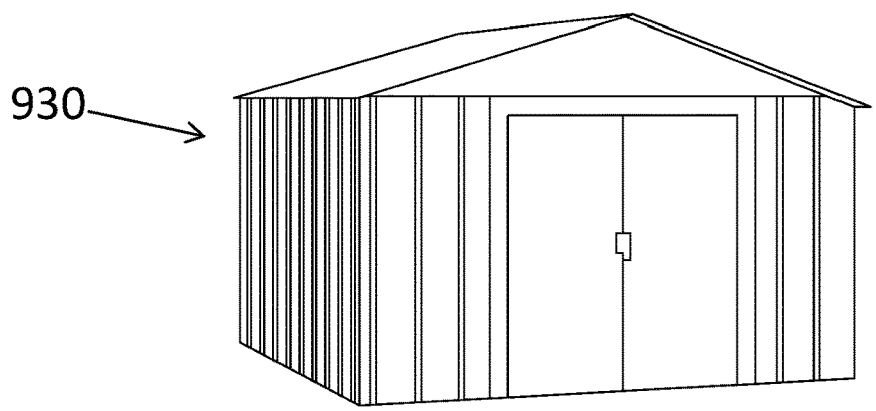
FIG. 9C is an illustration of an outdoor building, in accordance with some examples.

In some examples, the coatings described herein may be present on outdoor equipment and/or furniture. Illustrations are shown in FIGS. 9A-9C. Referring to FIG. 9A, a shovel 910 is shown that may comprise the coatings described herein. In a typical configuration, the exposed metal surfaces of the shovel would comprise the coatings described herein. For example, the shovel head may comprise the coatings and the shovel handle may lack the coatings. Referring to FIG. 9B, an outdoor chair 920 is shown that comprises a metal substrate and one or more of the coatings described herein. Referring to FIG. 9C, an outdoor building 930 is shown that comprises metal walls and/or a metal roof any one or more of which may comprise one or more of the coatings described herein. In some examples, the doors of the outdoor building 930 may also comprise one of the coatings described herein.

In certain examples, one or more surfaces of the outdoor equipment and/or furniture may comprise a first coating adjacent to the substrate of the article, e.g., an electrodeposited coating, and a surface coating disposed on the first coating. If desired, the first coating can be omitted and the electrodeposited coating may be disposed directly on the substrate. In some instances, the first coating on one or more surfaces of the outdoor equipment and/or furniture comprise one, two, three or more of Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In other examples, the first coating on one or more surfaces of the outdoor equipment and/or furniture may comprise nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable. In certain examples, the first coating on one or more surfaces of the outdoor equipment and/or furniture may be an electrodeposited coating comprising nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Nickel-Molybdenum or other Nickel-X alloys where X is a transition metal listed herein. In other examples, the first coating on one or more surfaces of the outdoor equipment and/or furniture may be an electrodeposited coating comprising Zinc in combination with one or more of Scandium, Titanium, Vanadium, Chromium, Manganese, Iron, Cobalt, Copper, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Zinc-Molybdenum or other Zinc-X alloys where X is a transition metal listed herein. In other examples, the first coating on one or more surfaces of the outdoor equipment and/or furniture may be an electrodeposited coating comprising Copper in combination with one or more of Scandium, Titanium, Vanadium, Chromium, Manganese, Iron, Cobalt, Zinc, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Copper-Molybdenum or other Copper-X alloys where X is a transition metal listed herein. As noted herein, the surface coating on one or more surfaces of the outdoor equipment and/or furniture typically is produced using one or more silane systems and silane systems comprising reactive silanol groups or other reactive groups may be particularly desirable, e.g., silane systems comprising aqueous, alcohol-free products of epoxysilanes may be particularly suitable.

Figure 10A:
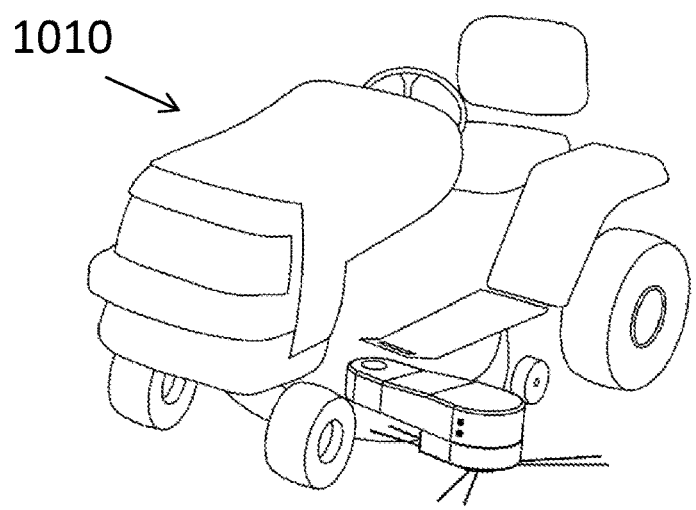
FIGS. 10A, 10B, 10C and 10D are illustrations of outdoor power equipment, in accordance with certain examples.
Figure 10B:
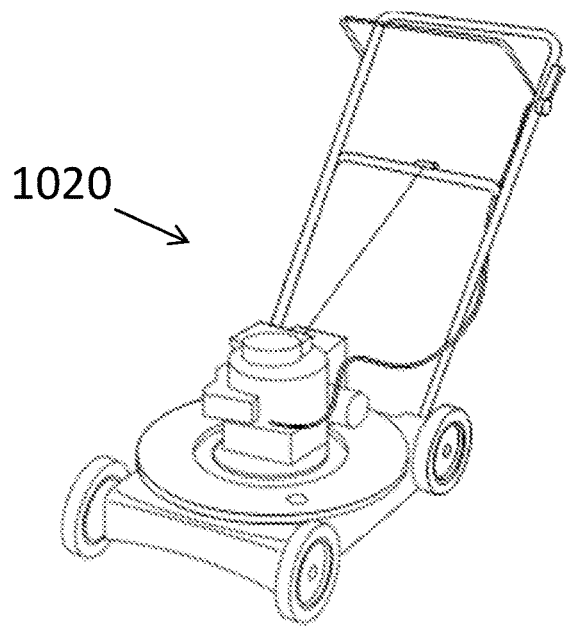
Figure 10C:
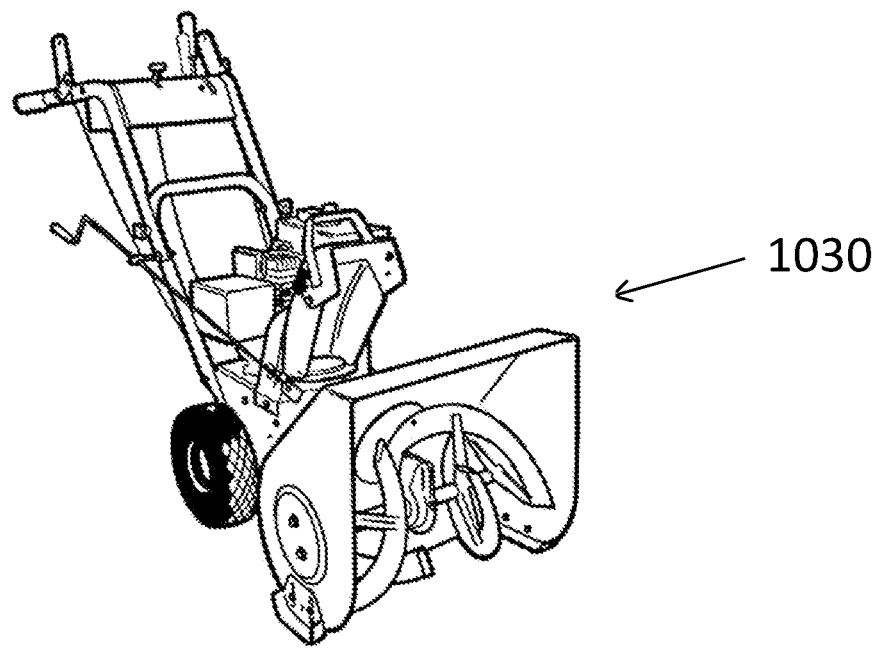
Figure 10D:
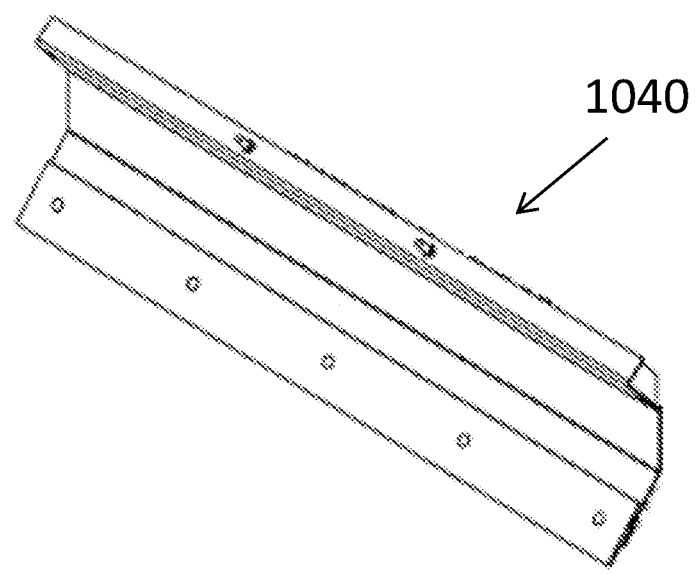

In certain instances, the coatings described herein may be used on or in outdoor power equipment. For example, outdoor power equipment such as tractors, lawn mowers, snow blowers, snow plow equipment, etc. typically comprises metal surfaces that often corrode after exposure to moisture, salt, etc. The outdoor power equipment typically comprises a motor or engine coupled to a deck, chassis or other structure. For example, a riding lawn mower 1010 is shown in FIG. 10A, a push mower 1020 is shown in FIG. 10B, a snow blower 1030 is shown in FIG. 10C and a snowplow blade 104 is shown in FIG. 10D.

In certain examples, one or more surfaces of the outdoor power equipment and/or power tools may comprise a first coating adjacent to the substrate of the article, e.g., an electrodeposited coating, and a surface coating disposed on the first coating. If desired, the first coating can be omitted and the electrodeposited coating may be disposed directly on the substrate. In some instances, the first coating on one or more surfaces of the outdoor power equipment and/or power tools may comprise one, two, three or more of Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In other examples, the first coating on one or more surfaces of the outdoor power equipment and/or power tools may comprise nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable. In certain examples, the first coating on one or more surfaces of the outdoor power equipment and/or power tools may be an electrodeposited coating comprising nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Nickel-Molybdenum or other Nickel-X alloys where X is a transition metal listed herein. In other examples, the first coating on one or more surfaces of the outdoor power equipment and/or power tools may be an electrodeposited coating comprising Zinc in combination with one or more of Scandium, Titanium, Vanadium, Chromium, Manganese, Iron, Cobalt, Copper, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Zinc-Molybdenum or other Zinc-X alloys where X is a transition metal listed herein. In other examples, the first coating on one or more surfaces of the outdoor power equipment and/or power tools may be an electrodeposited coating comprising Copper in combination with one or more of Scandium, Titanium, Vanadium, Chromium, Manganese, Iron, Cobalt, Zinc, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Copper-Molybdenum or other Copper-X alloys where X is a transition metal listed herein. As noted herein, the surface coating on one or more surfaces of the outdoor power equipment and/or power tools typically is produced using one or more silane systems and silane systems comprising reactive silanol groups or other reactive groups may be particularly desirable, e.g., silane systems comprising aqueous, alcohol-free products of epoxysilanes may be particularly suitable.

In some embodiments, the coatings described herein may be used on semiconductor manufacturing chambers and related apparatus. The coatings can be used on equipment present in many different steps of semiconductor manufacturing processes including wafer preparation, front-end processing (e.g., thermal oxidation, silicon nitride deposition, polysilicon deposition, annealing, etc.), photolithography, etching, cleaning, film deposition, ion implantation, planarization or other techniques used to produce semiconductors. For example, ovens or furnaces commonly used in front-end processing operations may comprise a coating as described herein. In other instances, boats, supports, etc. that are used in the etching processes may comprise one or more of the coatings described herein. For example, acids and fluorochemicals are commonly used to etch silicon and can also result in deterioration of the underlying support.

In certain examples, one or more surfaces of the semiconductor manufacturing chambers and related apparatus may comprise a first coating adjacent to the substrate of the article, e.g., an electrodeposited coating, and a surface coating disposed on the first coating. If desired, the first coating can be omitted and the electrodeposited coating may be disposed directly on the substrate. In some instances, the first coating on one or more surfaces of the semiconductor manufacturing chambers and related apparatus may comprise one, two, three or more of Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In other examples, the first coating on one or more surfaces semiconductor manufacturing chambers and related apparatus may comprise nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable. In certain examples, the first coating on one or more surfaces of the semiconductor manufacturing chambers and related apparatus may be an electrodeposited coating comprising nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Nickel-Molybdenum or other Nickel-X alloys where X is a transition metal listed herein. In other examples, the first coating on one or more surfaces of the semiconductor manufacturing chambers and related apparatus may be an electrodeposited coating comprising Zinc in combination with one or more of Scandium, Titanium, Vanadium, Chromium, Manganese, Iron, Cobalt, Copper, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Zinc-Molybdenum or other Zinc-X alloys where X is a transition metal listed herein. In other examples, the first coating on one or more surfaces of the semiconductor manufacturing chambers and related apparatus may be an electrodeposited coating comprising Copper in combination with one or more of Scandium, Titanium, Vanadium, Chromium, Manganese, Iron, Cobalt, Zinc, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Copper-Molybdenum or other Copper-X alloys where X is a transition metal listed herein. As noted herein, the surface coating on one or more surfaces of the semiconductor manufacturing chambers and related apparatus typically is produced using one or more silane systems and silane systems comprising reactive silanol groups or other reactive groups may be particularly desirable, e.g., silane systems comprising aqueous, alcohol-free products of epoxysilanes may be particularly suitable.

In certain embodiments, the coatings described herein can be present on wood substrates to enhance the overall durability of the wood substrate. In some examples, a conductive primer layer may first be deposited on the wood substrate to permit electrodeposition of the electrodeposited layer. The surface coating can then be added to the electrodeposited layer. Inclusion of the coatings described herein may permit standard kiln dried lumber to be used in place of pressure treated lumber in exterior and ground contact applications. Illustrative wood articles that may comprise the coatings described herein include, but are not limited to, kiln dried lumber, pressure treated lumber, wood siding, wood shingles, wood panels, etc.

In certain examples, one or more surfaces of the wood substrate may comprise a first coating adjacent to the substrate of the article, e.g., an electrodeposited coating, and a surface coating disposed on the first coating. If desired, the first coating can be omitted and the electrodeposited coating may be disposed directly on the substrate. In some instances, the first coating on one or more surfaces of the wood substrate may comprise one, two, three or more of Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In other examples, the first coating on one or more surfaces of wood substrate may comprise nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable. In certain examples, the first coating on one or more surfaces of the wood substrate may be an electrodeposited coating comprising nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Nickel-Molybdenum or other Nickel-X alloys where X is a transition metal listed herein. In other examples, the first coating on one or more surfaces of the wood substrate may be an electrodeposited coating comprising Zinc in combination with one or more of Scandium, Titanium, Vanadium, Chromium, Manganese, Iron, Cobalt, Copper, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Zinc-Molybdenum or other Zinc-X alloys where X is a transition metal listed herein. In other examples, the first coating on one or more surfaces of the wood substrate may be an electrodeposited coating comprising Copper in combination with one or more of Scandium, Titanium, Vanadium, Chromium, Manganese, Iron, Cobalt, Zinc, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Copper-Molybdenum or other Copper-X alloys where X is a transition metal listed herein. As noted herein, the surface coating on one or more surfaces of the wood substrate typically is produced using one or more silane systems and silane systems comprising reactive silanol groups or other reactive groups may be particularly desirable, e.g., silane systems comprising aqueous, alcohol-free products of epoxysilanes may be particularly suitable.

In some examples, the coatings described herein can be present on plastic substrate to enhance the overall durability of the plastic substrates. In some examples, a conductive primer layer may first be deposited on the plastic substrate to permit electrodeposition of the electrodeposited layer. The surface coating can then be added to the electrodeposited layer. Inclusion of the coatings described herein may increase the overall durability of plastic substrates used in exterior applications. Illustrative plastic articles that may include the coatings described herein include, but are not limited to, vinyl siding, vinyl panels, vinyl trim, vinyl gutters, vinyl flooring and other building applications.

In certain examples, one or more surfaces of the plastic substrate may comprise a first coating adjacent to the substrate of the article, e.g., an electrodeposited coating, and a surface coating disposed on the first coating. If desired, the first coating can be omitted and the electrodeposited coating may be disposed directly on the substrate. In some instances, the first coating on one or more surfaces of the plastic substrate may comprise one, two, three or more of Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In other examples, the first coating on one or more surfaces of plastic substrate may comprise nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable. In certain examples, the first coating on one or more surfaces of the plastic substrate may be an electrodeposited coating comprising nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Nickel-Molybdenum or other Nickel-X alloys where X is a transition metal listed herein. In other examples, the first coating on one or more surfaces of the plastic substrate may be an electrodeposited coating comprising Zinc in combination with one or more of Scandium, Titanium, Vanadium, Chromium, Manganese, Iron, Cobalt, Copper, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Zinc-Molybdenum or other Zinc-X alloys where X is a transition metal listed herein. In other examples, the first coating on one or more surfaces of the plastic substrate may be an electrodeposited coating comprising Copper in combination with one or more of Scandium, Titanium, Vanadium, Chromium, Manganese, Iron, Cobalt, Zinc, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Copper-Molybdenum or other Copper-X alloys where X is a transition metal listed herein. As noted herein, the surface coating on one or more surfaces of the plastic substrate typically is produced using one or more silane systems and silane systems comprising reactive silanol groups or other reactive groups may be particularly desirable, e.g., silane systems comprising aqueous, alcohol-free products of epoxysilanes may be particularly suitable.

Figure 10E:
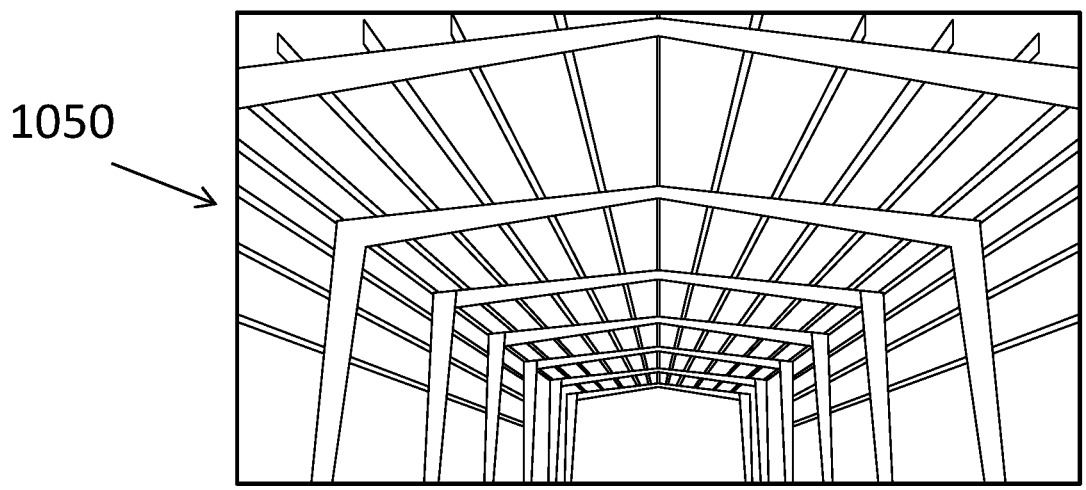
FIG. 10E is an illustration of a building frame, in accordance with some embodiments.
Figure 11A:
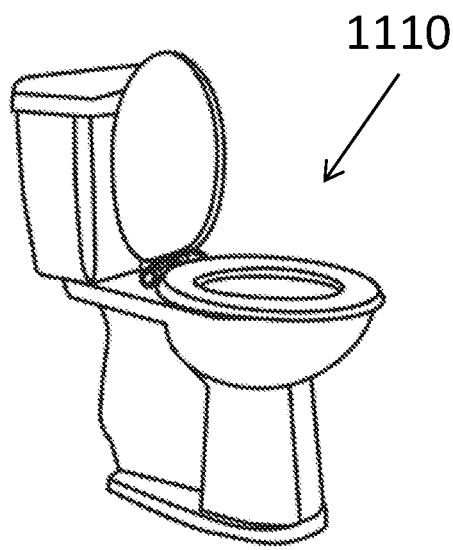
FIGS. 11A, 11B, 11C, 11D, 11E, 11F, 11G and 11H are illustrations of bathroom apparatus, in accordance with some examples.
Figure 11B:
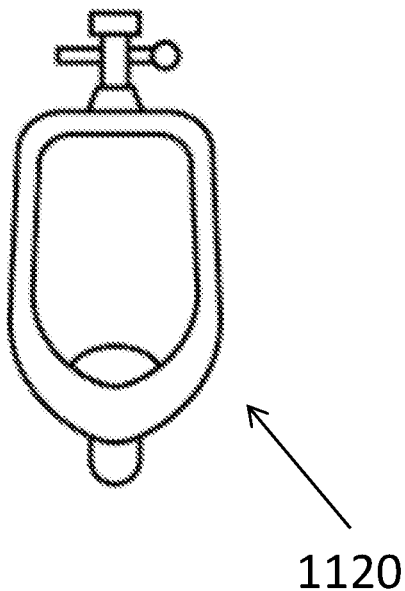
Figure 11C:
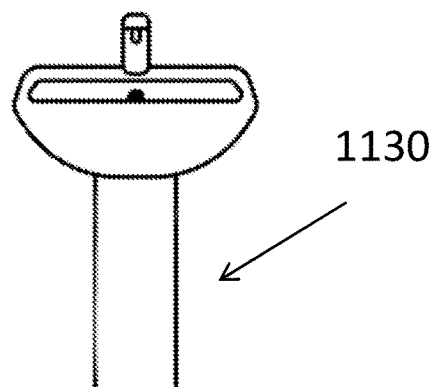
Figure 11D:
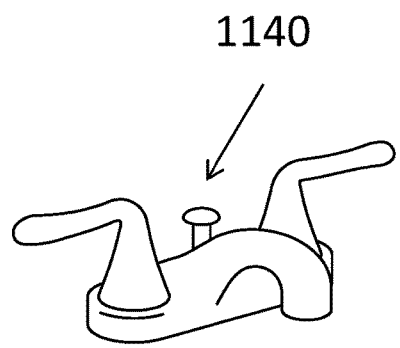
Figure 11E:
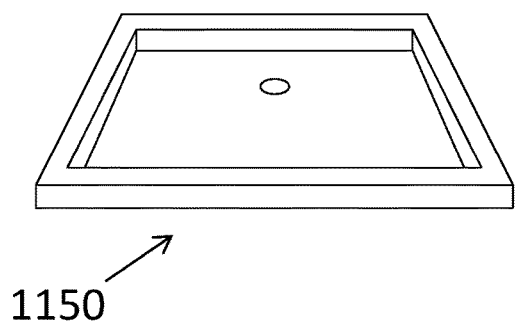
Figure 11G:
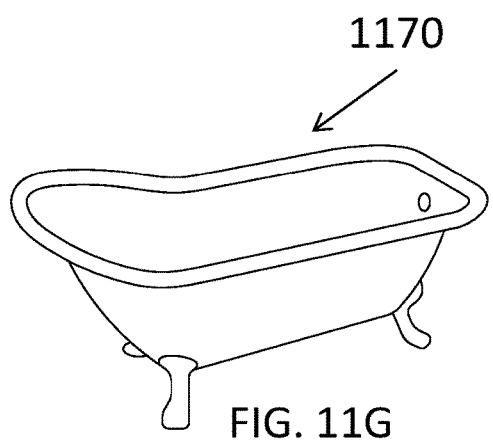
Figure 11F:
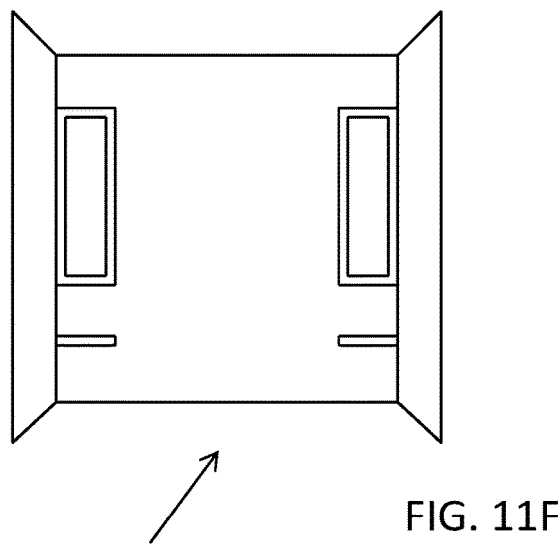
Figure 11H:
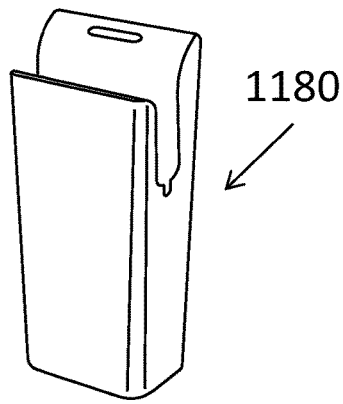

In certain examples, the structural members commonly used in producing commercial buildings may comprise the coatings described herein. Referring to FIG. 10E, a building frame 1050 is shown that comprises a plurality of structural members welded to each other. The structural members are typically produced from steel and are welded to each other to increase the overall strength of the building. Any one or more of the structural members may comprise the coatings described herein. Where the coating is removed at welded joints, a surface coating can be re-applied at those welded joints to reduce corrosion at the joints.

In certain embodiments, one or more surfaces of the structural members of the building frame may comprise a first coating adjacent to the substrate of the article, e.g., an electrodeposited coating, and a surface coating disposed on the first coating. If desired, the first coating can be omitted and the electrodeposited coating may be disposed directly on the substrate. In some instances, the first coating one or more surfaces of the structural members of the building frame may comprise one, two, three or more of Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In other examples, the first coating on one or more surfaces of the structural members of the building frame may comprise nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable. In certain examples, the first coating on one or more surfaces of the structural members of the building frame may be an electrodeposited coating comprising nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Nickel-Molybdenum or other Nickel-X alloys where X is a transition metal listed herein. In other examples, the first coating on one or more surfaces of the structural members of the building frame may be an electrodeposited coating comprising Zinc in combination with one or more of Scandium, Titanium, Vanadium, Chromium, Manganese, Iron, Cobalt, Copper, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Zinc-Molybdenum or other Zinc-X alloys where X is a transition metal listed herein. In other examples, the first coating on one or more surfaces of the structural members of the building frame may be an electrodeposited coating comprising Copper in combination with one or more of Scandium, Titanium, Vanadium, Chromium, Manganese, Iron, Cobalt, Zinc, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Copper-Molybdenum or other Copper-X alloys where X is a transition metal listed herein. As noted herein, the surface coating on one or more surfaces of the structural members of the building frame typically is produced using one or more silane systems and silane systems comprising reactive silanol groups or other reactive groups may be particularly desirable, e.g., silane systems comprising aqueous, alcohol-free products of epoxysilanes may be particularly suitable.

In certain embodiments, the coatings described herein can be used in various bathroom apparatus (see FIGS. 11A-11H). For example, the bathroom apparatus include, but are not limited to a toilet 1110 (FIG. 11A), a urinal 1120 (FIG. 11B), a sink 1130 (FIG. 11C), a faucet 1140 (FIG. 11D), a shower pan 1150 (FIG. 11E), shower walls 1160 (FIG. 11F), a bath tub 1170 (FIG. 11G), a hand dryer 1180 (FIG. 11H) and other bathroom apparatus. In some examples, the bathroom apparatus comprises a water inlet and a water outlet and a receptacle between the water inlet and the water outlet. In other examples, the bathroom apparatus is configured to receive human waste or dry a user's hands.

In certain examples, one or more surfaces of the bathroom apparatus may comprise a first coating adjacent to the substrate of the article, e.g., an electrodeposited coating, and a surface coating disposed on the first coating. If desired, the first coating can be omitted and the electrodeposited coating may be disposed directly on the substrate. In some instances, the first coating one or more surfaces of the bathroom apparatus may comprise one, two, three or more of Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In other examples, the first coating on one or more surfaces of the bathroom apparatus may comprise nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable. In certain examples, the first coating on one or more surfaces of the bathroom apparatus may be an electrodeposited coating comprising nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Nickel-Molybdenum or other Nickel-X alloys where X is a transition metal listed herein. In other examples, the first coating on one or more surfaces of the bathroom apparatus may be an electrodeposited coating comprising Zinc in combination with one or more of Scandium, Titanium, Vanadium, Chromium, Manganese, Iron, Cobalt, Copper, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Zinc-Molybdenum or other Zinc-X alloys where X is a transition metal listed herein. In other examples, the first coating on one or more surfaces of the bathroom apparatus may be an electrodeposited coating comprising Copper in combination with one or more of Scandium, Titanium, Vanadium, Chromium, Manganese, Iron, Cobalt, Zinc, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Copper-Molybdenum or other Copper-X alloys where X is a transition metal listed herein. As noted herein, the surface coating on one or more surfaces of the bathroom apparatus typically is produced using one or more silane systems and silane systems comprising reactive silanol groups or other reactive groups may be particularly desirable, e.g., silane systems comprising aqueous, alcohol-free products of epoxysilanes may be particularly suitable.

Figure 12A:
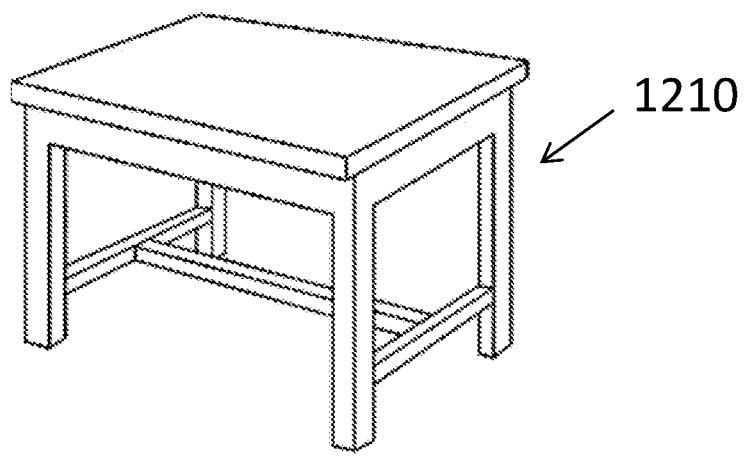
FIGS. 12A, 12B, and 12C are illustrations of indoor furniture, in accordance with some embodiments.
Figure 12B:
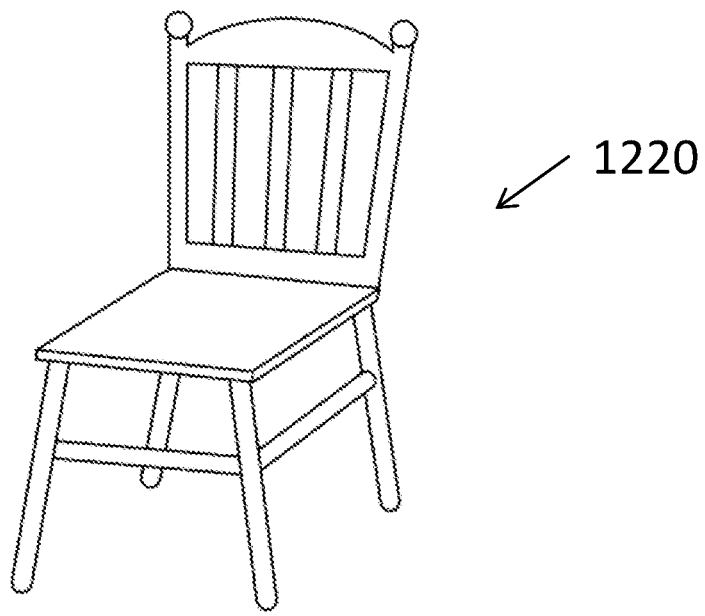
Figure 12C:
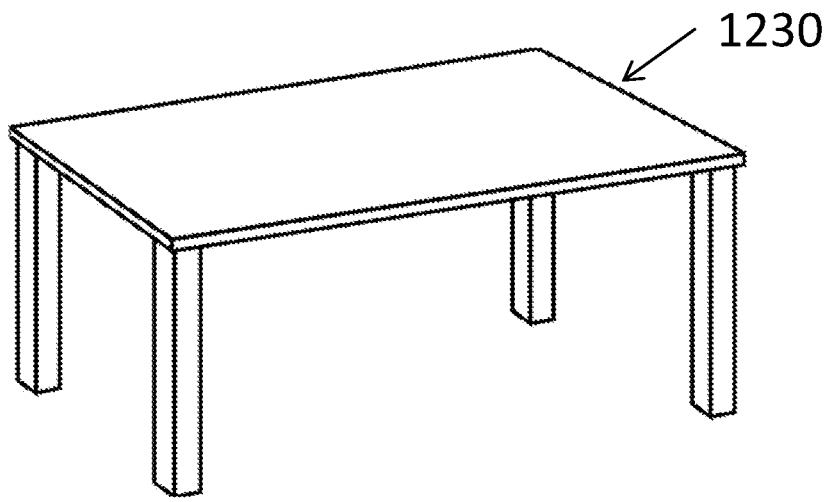

In certain examples, the coatings described herein can be used on indoor furniture including, but not limited to, a desk surface, a table surface, a chair surface etc. of items typically found in indoor settings. Illustrations of a desk 1210, a chair 1220 and a table 1230 are shown in FIGS. 12A, 12B and 12C, respectively. The desk 1210 comprises a top or work surface and underlying support members. The chair 1220 comprises a seating surface and connected support legs and back. The table 1230 comprises a top surface and four legs coupled to the top surface. One or more surface of these items may comprise the electrodeposited coatings and surface coatings described herein.

In certain examples, one or more surfaces of the indoor furniture may comprise a first coating adjacent to the substrate of the article, e.g., an electrodeposited coating, and a surface coating disposed on the first coating. If desired, the first coating can be omitted and the electrodeposited coating may be disposed directly on the substrate. In some instances, the first coating one or more surfaces of the indoor furniture may comprise one, two, three or more of Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In other examples, the first coating on one or more surfaces of the indoor furniture may comprise nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable. In certain examples, the first coating on one or more surfaces of the indoor furniture may be an electrodeposited coating comprising nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Nickel-Molybdenum or other Nickel-X alloys where X is a transition metal listed herein. In other examples, the first coating on one or more surfaces of the indoor furniture may be an electrodeposited coating comprising Zinc in combination with one or more of Scandium, Titanium, Vanadium, Chromium, Manganese, Iron, Cobalt, Copper, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Zinc-Molybdenum or other Zinc-X alloys where X is a transition metal listed herein. In other examples, the first coating on one or more surfaces of the indoor furniture may be an electrodeposited coating comprising Copper in combination with one or more of Scandium, Titanium, Vanadium, Chromium, Manganese, Iron, Cobalt, Zinc, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Copper-Molybdenum or other Copper-X alloys where X is a transition metal listed herein. As noted herein, the surface coating on one or more surfaces of the indoor furniture typically is produced using one or more silane systems and silane systems comprising reactive silanol groups or other reactive groups may be particularly desirable, e.g., silane systems comprising aqueous, alcohol-free products of epoxysilanes may be particularly suitable.

Figure 13A:
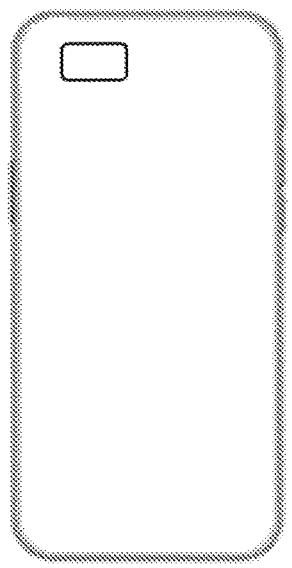
FIG. 13A is an illustration of a mobile device case.
Figure 13B:
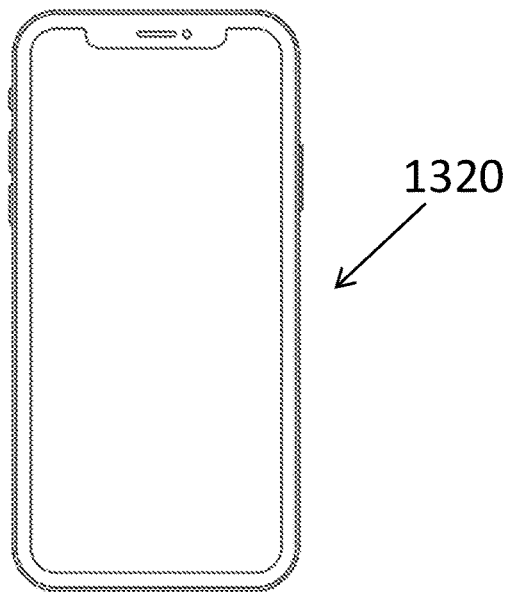
FIG. 13B is an illustration of a mobile device.
Figure 13C:
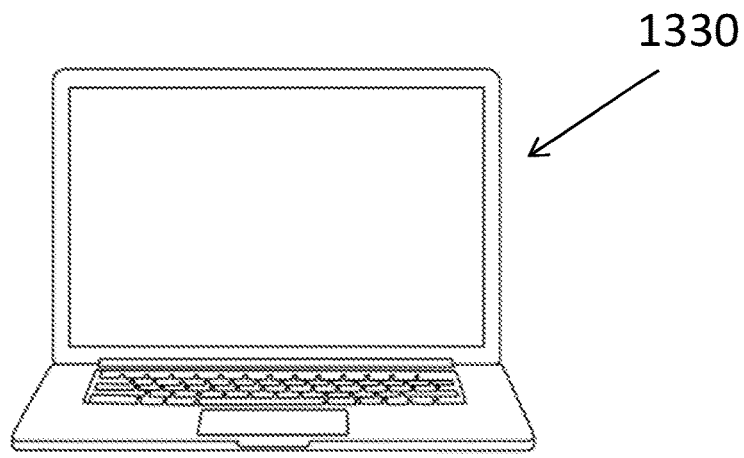
FIG. 13C is an illustration of a laptop computer, in accordance with some examples.

In other examples, the coatings described herein can be present on electronic devices and components including, but not limited to, electronic screens, cases for electronic devices or other electronic components that may comprise or use a processor such as a microprocessor and optionally a display or other visual or audio output device. Referring to FIG. 13A, a mobile device case 1310 is shown that may comprise the coatings described herein. Referring to FIG. 13B, a mobile device 1320 is shown that may comprise the coatings described herein. For example, non-glass surfaces of the mobile device may comprise the coatings described herein, e.g., the mobile device housing may comprise the coatings described herein. In other instances, some portion or all of a glass surface may comprise the coatings described herein. In additional instances, buttons present on the phone (e.g., physical buttons or virtual buttons) may comprise the coatings described herein. Referring to FIG. 13C, a laptop computer 1330 may comprise the coatings described herein. Additional electronic devices and cases, housings, accessories, etc. for such electronic devices may also comprise the coatings described herein.

In some examples, one or more surfaces of the electronic devices and components may comprise a first coating adjacent to the substrate of the article, e.g., an electrodeposited coating, and a surface coating disposed on the first coating. If desired, the first coating can be omitted and the electrodeposited coating may be disposed directly on the substrate. In some instances, the first coating one or more surfaces of the electronic devices and components may comprise one, two, three or more of Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In other examples, the first coating on one or more surfaces of the electronic devices and components may comprise nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable. In certain examples, the first coating on one or more surfaces of the electronic devices and components may be an electrodeposited coating comprising nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Nickel-Molybdenum or other Nickel-X alloys where X is a transition metal listed herein. In other examples, the first coating on one or more surfaces of the electronic devices and components may be an electrodeposited coating comprising Zinc in combination with one or more of Scandium, Titanium, Vanadium, Chromium, Manganese, Iron, Cobalt, Copper, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Zinc-Molybdenum or other Zinc-X alloys where X is a transition metal listed herein. In other examples, the first coating on one or more surfaces of the electronic devices and components may be an electrodeposited coating comprising Copper in combination with one or more of Scandium, Titanium, Vanadium, Chromium, Manganese, Iron, Cobalt, Zinc, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Copper-Molybdenum or other Copper-X alloys where X is a transition metal listed herein. As noted herein, the surface coating on one or more surfaces of the electronic devices and components typically is produced using one or more silane systems and silane systems comprising reactive silanol groups or other reactive groups may be particularly desirable, e.g., silane systems comprising aqueous, alcohol-free products of epoxysilanes may be particularly suitable.

Figure 14A:
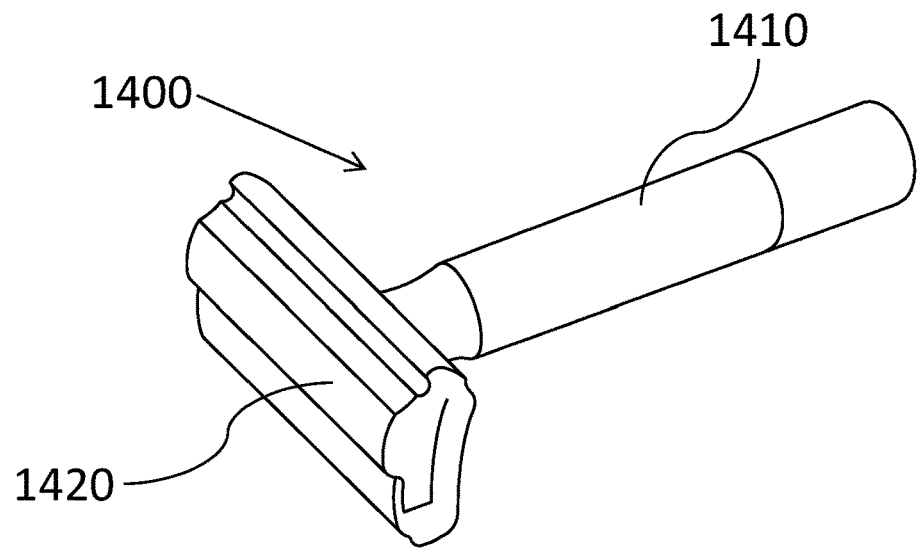
FIG. 14A is an illustration of a safety razor.
Figure 14B:
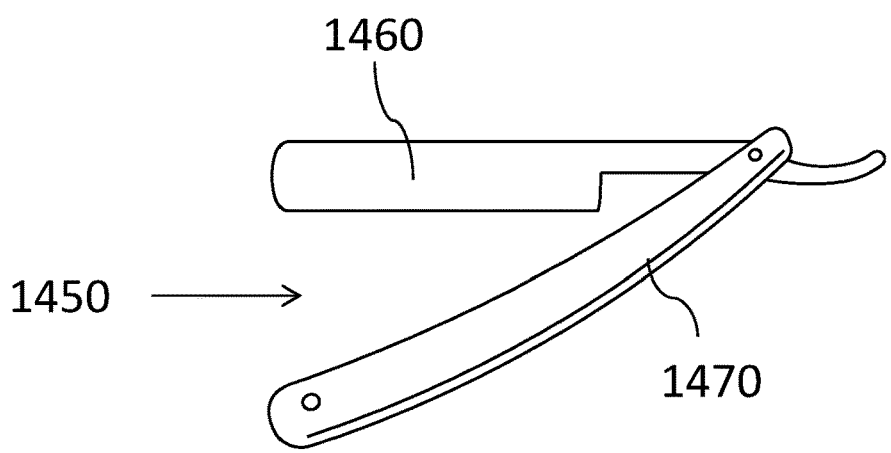
FIG. 14B is an illustration of a straight razor, in accordance with certain examples.

In some instances, the coatings described herein can be present on razor blades, razor handles or both. One illustration of a razor is shown in FIGS. 14A and 14B. The razor 1400 comprises a handle 1410 and a detachable head 1420 comprising one or more blades. The coatings described herein can be present on the handle 1410, the head 1420, the blades or any combination of these components. In some instances and referring to FIG. 14B, one or more components of a straight razor 1450 comprising a razor blade 1460 and handle 1470 may also comprise the coatings described herein.

In some examples, one or more surfaces of the razor blades, razor handles or both may comprise a first coating adjacent to the substrate of the article, e.g., an electrodeposited coating, and a surface coating disposed on the first coating. If desired, the first coating can be omitted and the electrodeposited coating may be disposed directly on the substrate. In some instances, the first coating one or more surfaces of the razor blades, razor handles or both may comprise one, two, three or more of Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In other examples, the first coating on one or more surfaces of the razor blades, razor handles or both may comprise nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable. In certain examples, the first coating on one or more surfaces of the razor blades, razor handles or both may be an electrodeposited coating comprising nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Nickel-Molybdenum or other Nickel-X alloys where X is a transition metal listed herein. In other examples, the first coating on one or more surfaces of the razor blades, razor handles or both may be an electrodeposited coating comprising Zinc in combination with one or more of Scandium, Titanium, Vanadium, Chromium, Manganese, Iron, Cobalt, Copper, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Zinc-Molybdenum or other Zinc-X alloys where X is a transition metal listed herein. In other examples, the first coating on one or more surfaces of the razor blades, razor handles or both may be an electrodeposited coating comprising Copper in combination with one or more of Scandium, Titanium, Vanadium, Chromium, Manganese, Iron, Cobalt, Zinc, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Copper-Molybdenum or other Copper-X alloys where X is a transition metal listed herein. As noted herein, the surface coating on one or more surfaces of the razor blades, razor handles or both typically is produced using one or more silane systems and silane systems comprising reactive silanol groups or other reactive groups may be particularly desirable, e.g., silane systems comprising aqueous, alcohol-free products of epoxysilanes may be particularly suitable.

Figure 15A:
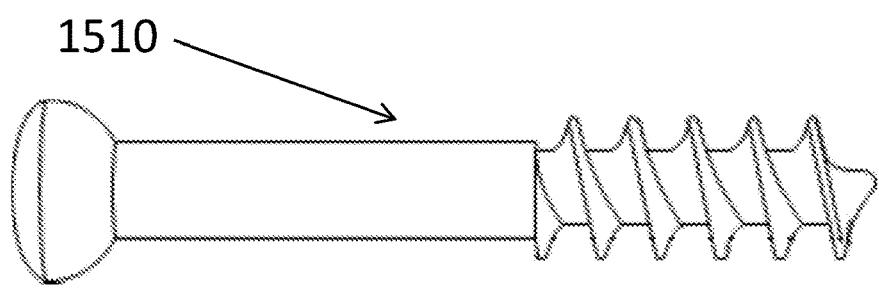
FIG. 15A is an illustration of a bone screw.
Figure 15B:
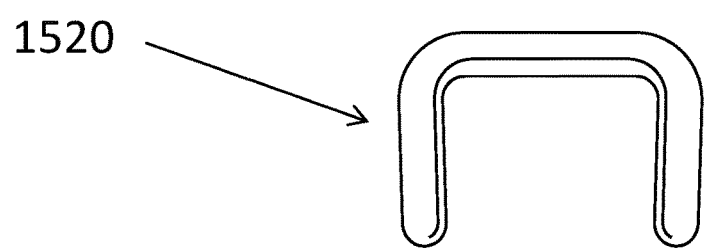
FIG. 15B is an illustration of a surgical staple, in accordance with some instances.

In other examples, the coatings described herein may be present on one or more surfaces of a medical implant. Referring to FIG. 15A, a bone screw 1510 is shown that may comprise the coatings described herein. Referring to FIG. 15B, a surgical staple 1520 is shown that may comprise the coatings described herein. In addition, joint implants and replacement joints such as knee implants, hip implants, shoulder implants, toe implants and the like may also comprise the coatings described herein. Further, the coatings can be used on scalpels, bone saws, syringes and other medical devices used in medical procedures.

In certain examples, one or more surfaces of the medical implant may comprise a first coating adjacent to the substrate of the article, e.g., an electrodeposited coating, and a surface coating disposed on the first coating. If desired, the first coating can be omitted and the electrodeposited coating may be disposed directly on the substrate. In some instances, the first coating one or more surfaces of the medical implant may comprise one, two, three or more of Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In other examples, the first coating on one or more surfaces of the medical implant may comprise nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable. In certain examples, the first coating on one or more surfaces of the medical implant may be an electrodeposited coating comprising nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Nickel-Molybdenum or other Nickel-X alloys where X is a transition metal listed herein. In other examples, the first coating on one or more surfaces of the medical implant may be an electrodeposited coating comprising Zinc in combination with one or more of Scandium, Titanium, Vanadium, Chromium, Manganese, Iron, Cobalt, Copper, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Zinc-Molybdenum or other Zinc-X alloys where X is a transition metal listed herein. In other examples, the first coating on one or more surfaces of the medical implant may be an electrodeposited coating comprising Copper in combination with one or more of Scandium, Titanium, Vanadium, Chromium, Manganese, Iron, Cobalt, Zinc, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Copper-Molybdenum or other Copper-X alloys where X is a transition metal listed herein. As noted herein, the surface coating on one or more surfaces of the medical implant typically is produced using one or more silane systems and silane systems comprising reactive silanol groups or other reactive groups may be particularly desirable, e.g., silane systems comprising aqueous, alcohol-free products of epoxysilanes may be particularly suitable.

In some examples, the coatings described herein can be present on one or more surfaces of an industrial mold. In some examples, the coatings disclosed herein can be deposited on the surface of a mold, for example. The mold can be used for providing molded articles by transferring the negative replica or shape of the article into the surface of a polymer, ceramic, or glass in a molding process using a suitably shaped cavity in the industrial mold. Examples of molding processes include, but are not limited to, rotational molding, injection molding, blow molding, compression molding, film insert molding, gas assist molding, structural foam molding, and thermoforming. Without wishing to be bound by any particular configuration, the presence of the coatings on the mold surface permits easy release of the molded article from the mold without the need to use release agents, heat, pressure or other means.

In certain examples, one or more surfaces of the industrial mold may comprise a first coating adjacent to the substrate of the article, e.g., an electrodeposited coating, and a surface coating disposed on the first coating. If desired, the first coating can be omitted and the electrodeposited coating may be disposed directly on the substrate. In some instances, the first coating one or more surfaces of the industrial mold may comprise one, two, three or more of Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In other examples, the first coating on one or more surfaces of the industrial mold may comprise nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable. In certain examples, the first coating on one or more surfaces of the industrial mold may be an electrodeposited coating comprising nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Nickel-Molybdenum or other Nickel-X alloys where X is a transition metal listed herein. In other examples, the first coating on one or more surfaces of the industrial mold may be an electrodeposited coating comprising Zinc in combination with one or more of Scandium, Titanium, Vanadium, Chromium, Manganese, Iron, Cobalt, Copper, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Zinc-Molybdenum or other Zinc-X alloys where X is a transition metal listed herein. In other examples, the first coating on one or more surfaces of the industrial mold may be an electrodeposited coating comprising Copper in combination with one or more of Scandium, Titanium, Vanadium, Chromium, Manganese, Iron, Cobalt, Zinc, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Copper-Molybdenum or other Copper-X alloys where X is a transition metal listed herein. As noted herein, the surface coating on one or more surfaces of the industrial mold typically is produced using one or more silane systems and silane systems comprising reactive silanol groups or other reactive groups may be particularly desirable, e.g., silane systems comprising aqueous, alcohol-free products of epoxysilanes may be particularly suitable.

Figure 16:
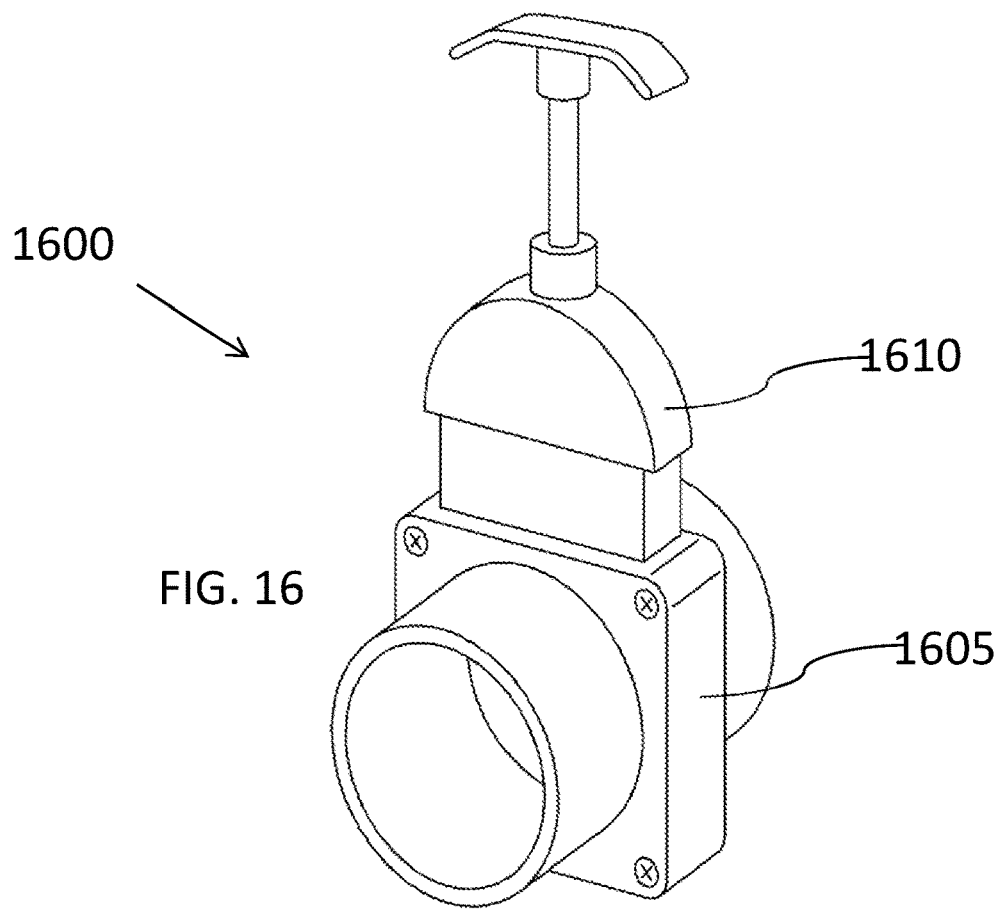
FIG. 16 is an illustration of a gate valve, in accordance with certain examples.

In other examples, the coatings described herein may be present on one or more valves such as gate valves. For example, a gate valve can be configured to open by lifting a round or rectangular gate/wedge out of the path of a fluid. The sealing surfaces between the gate and seats are planar, so gate valves are often used when a straight-line flow of fluid and minimum restriction is desired. Any one or more surfaces of the gate valve may comprise the coatings described herein. For example, internal surfaces, external surfaces or both may comprise the coatings described herein. Referring to FIG. 16, a gate valve 1600 is shown that comprises a gate 1610 in a housing 1605. The gate 1610 can be lifted to permit flow through the valve 1600 or closed to stop flow through the valve 1600. For example, fluid can flow through an inlet and out of an outlet when the gate 1610 is in the up or open position, and is generally prohibit from flowing through the gate valve 1600 when the gate 1610 is in the closed or down position.

In certain examples, one or more surfaces of the gate valve may comprise a first coating adjacent to the substrate of the article, e.g., an electrodeposited coating, and a surface coating disposed on the first coating. If desired, the first coating can be omitted and the electrodeposited coating may be disposed directly on the substrate. In some instances, the first coating one or more surfaces of the gate valve may comprise one, two, three or more of Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In other examples, the first coating on one or more surfaces of the gate valve may comprise nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable. In certain examples, the first coating on one or more surfaces of the gate valve may be an electrodeposited coating comprising nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Nickel-Molybdenum or other Nickel-X alloys where X is a transition metal listed herein. In other examples, the first coating on one or more surfaces of the gate valve may be an electrodeposited coating comprising Zinc in combination with one or more of Scandium, Titanium, Vanadium, Chromium, Manganese, Iron, Cobalt, Copper, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Zinc-Molybdenum or other Zinc-X alloys where X is a transition metal listed herein. In other examples, the first coating on one or more surfaces of the gate valve may be an electrodeposited coating comprising Copper in combination with one or more of Scandium, Titanium, Vanadium, Chromium, Manganese, Iron, Cobalt, Zinc, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Copper-Molybdenum or other Copper-X alloys where X is a transition metal listed herein. As noted herein, the surface coating on one or more surfaces of the gate valve typically is produced using one or more silane systems and silane systems comprising reactive silanol groups or other reactive groups may be particularly desirable, e.g., silane systems comprising aqueous, alcohol-free products of epoxysilanes may be particularly suitable.

In some instances, the coatings described herein may be present on one or more pollution control systems such as, for example, scrubbers and similar devices used to control gaseous emissions. The coatings can be present on internal surfaces of the pollution control system components, external surfaces of the pollution control system components or both. For example, the pollution control system may comprise a chemical scrubber, gas scrubber, particular scrubber, ammonia scrubber, chlorine scrubber, dust scrubber, sulfuric acid scrubber or other scrubbers. While the exact operation of the pollution control system can vary, a typical pollution control system comprising a scrubber uses a scrubbing liquid (or other material) to absorb or dissolve the pollutants to be removed. The coatings described herein may be particularly desirable for use on surfaces that will be contacted by the scrubbing liquid (or other material) and any removed pollutants.

In certain embodiments, one or more surfaces of the pollution control systems and components thereof may comprise a first coating adjacent to the substrate of the article, e.g., an electrodeposited coating, and a surface coating disposed on the first coating. If desired, the first coating can be omitted and the electrodeposited coating may be disposed directly on the substrate. In some instances, the first coating one or more surfaces of the pollution control systems and components thereof may comprise one, two, three or more of Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In other examples, the first coating on one or more surfaces of the pollution control systems and components thereof may comprise nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable. In certain examples, the first coating on one or more surfaces of the pollution control systems and components thereof may be an electrodeposited coating comprising nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Nickel-Molybdenum or other Nickel-X alloys where X is a transition metal listed herein. In other examples, the first coating on one or more surfaces of the pollution control systems and components thereof may be an electrodeposited coating comprising Zinc in combination with one or more of Scandium, Titanium, Vanadium, Chromium, Manganese, Iron, Cobalt, Copper, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Zinc-Molybdenum or other Zinc-X alloys where X is a transition metal listed herein. In other examples, the first coating on one or more surfaces of the pollution control systems and components thereof may be an electrodeposited coating comprising Copper in combination with one or more of Scandium, Titanium, Vanadium, Chromium, Manganese, Iron, Cobalt, Zinc, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Copper-Molybdenum or other Copper-X alloys where X is a transition metal listed herein. As noted herein, the surface coating on one or more surfaces of the pollution control systems and components thereof typically is produced using one or more silane systems and silane systems comprising reactive silanol groups or other reactive groups may be particularly desirable, e.g., silane systems comprising aqueous, alcohol-free products of epoxysilanes may be particularly suitable.

Figure 17:
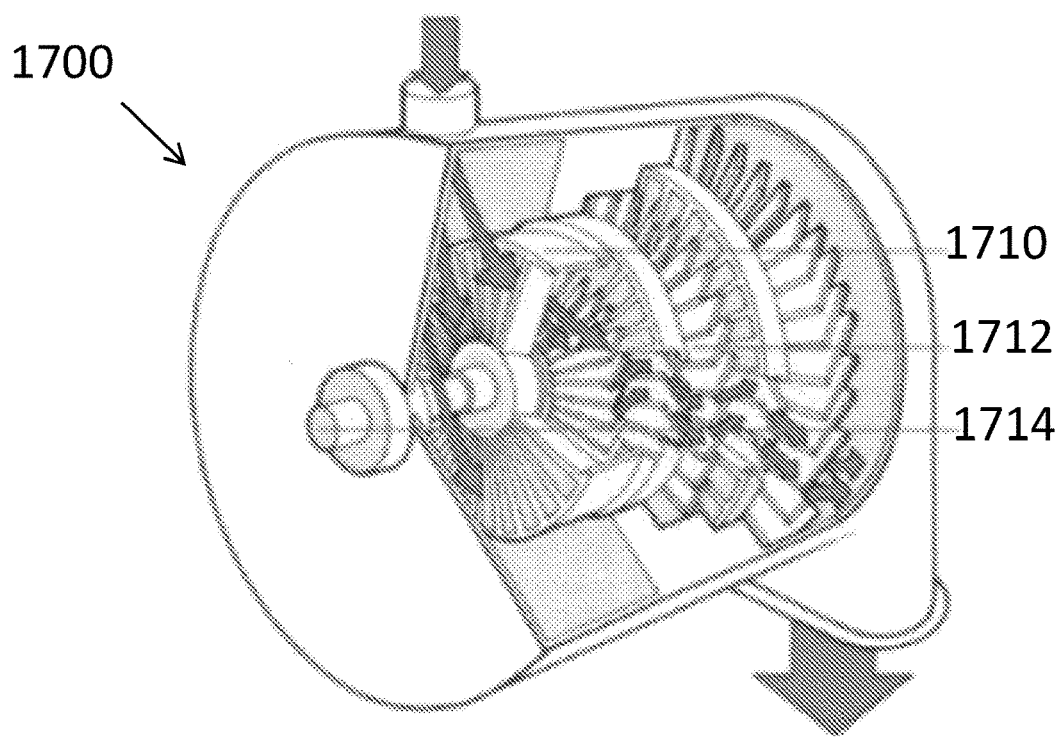
FIG. 17 is an illustration of a turbine, in accordance with some examples.

In certain examples, the coatings described herein may be present on one or more blades of a compressor or turbine. For example, the coatings can be present on turbine or compressor blades to reduce corrosion of the blades. Suitable turbines include gas turbines, steam turbines and turbines used to propel vehicles such as airplanes. Referring to FIG. 17, a turbine 1700 is shown comprising a fan comprising fixed blades 1710, rotating blades 1712 and a shaft 1714. In some instances, the underlying blade material, e.g., the blade substrate, may comprise a transition metal alloy as described herein so that the electrodeposited coating can be omitted and only the surface coating can be applied. The turbine 1700 can convert thermal energy into mechanical energy by receiving steam through an inlet (the feed) and permitting exit of the steam through an outlet (exhaust). The speed of the entering steam (and a pressure differential) can act to turn the fan blades 1712 which causes the shaft 1714 to turn.

In certain embodiments, one or more surfaces of the blades of a compressor or turbine may comprise a first coating adjacent to the substrate of the article, e.g., an electrodeposited coating, and a surface coating disposed on the first coating. If desired, the first coating can be omitted and the electrodeposited coating may be disposed directly on the substrate. In some instances, the first coating one or more surfaces of the blades of a compressor or turbine may comprise one, two, three or more of Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In other examples, the first coating on one or more surfaces of the blades of a compressor or turbine may comprise nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable. In certain examples, the first coating on one or more surfaces of the blades of a compressor or turbine may be an electrodeposited coating comprising nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Nickel-Molybdenum or other Nickel-X alloys where X is a transition metal listed herein. In other examples, the first coating on one or more surfaces of the blades of a compressor or turbine may be an electrodeposited coating comprising Zinc in combination with one or more of Scandium, Titanium, Vanadium, Chromium, Manganese, Iron, Cobalt, Copper, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Zinc-Molybdenum or other Zinc-X alloys where X is a transition metal listed herein. In other examples, the first coating on one or more surfaces of the blades of a compressor or turbine may be an electrodeposited coating comprising Copper in combination with one or more of Scandium, Titanium, Vanadium, Chromium, Manganese, Iron, Cobalt, Zinc, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Copper-Molybdenum or other Copper-X alloys where X is a transition metal listed herein. As noted herein, the surface coating on one or more surfaces of the blades of a compressor or turbine typically is produced using one or more silane systems and silane systems comprising reactive silanol groups or other reactive groups may be particularly desirable, e.g., silane systems comprising aqueous, alcohol-free products of epoxysilanes may be particularly suitable.

Figure 18A:
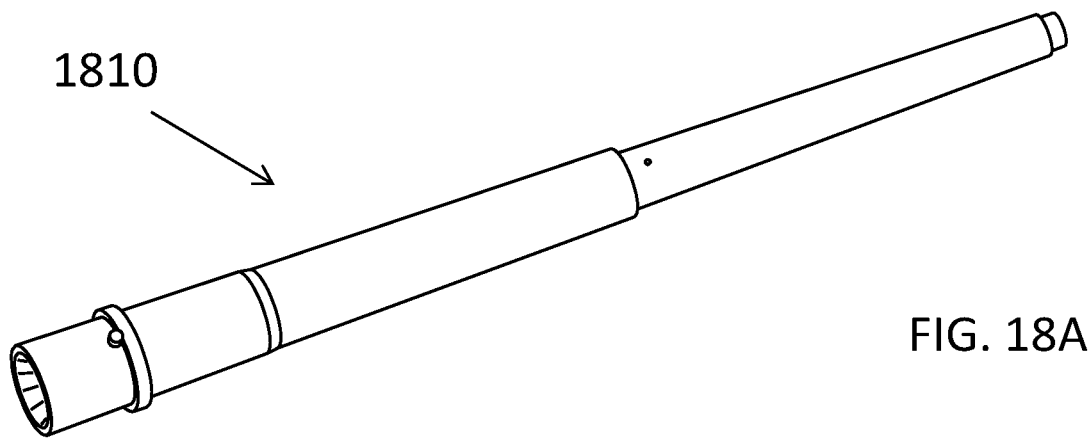
FIGS. 18A, 18B, 18C and 18D are illustration of firearm components, in accordance with certain embodiments.
Figure 18B:
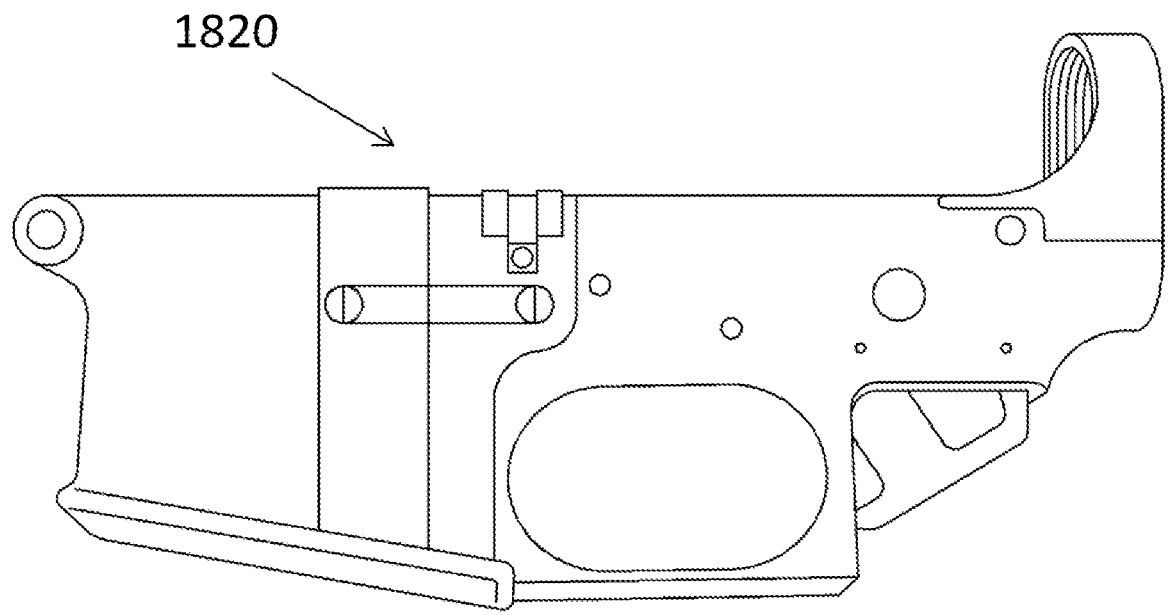
Figure 18C:
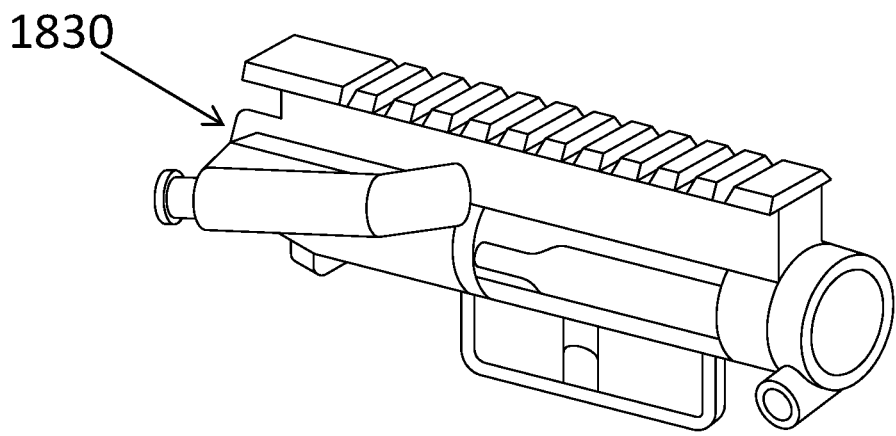
Figure 18D:
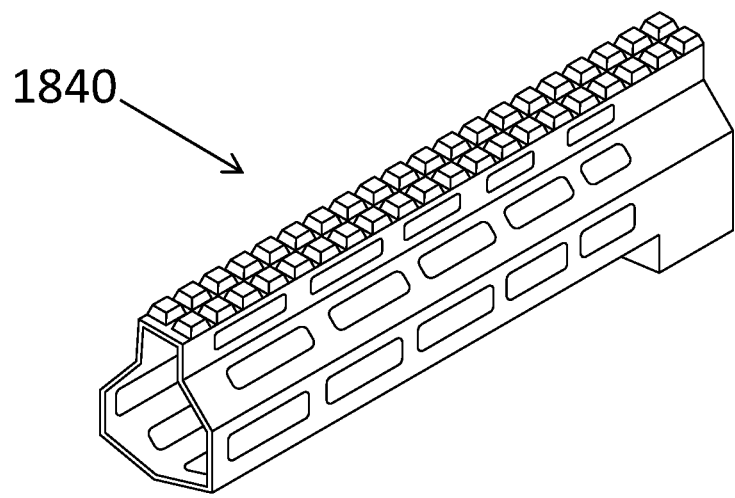

In certain examples, the coatings described herein may be present on one or more firearm components. For example, the coatings can be present on gun barrels, trigger mechanisms, lower receivers, upper receiver or other components of the firearms to reduce corrosion. Illustrative firearm components are shown in FIGS. 18A-18D and include a gun barrel 1810 (FIG. 18A), a lower receiver 1820 (FIG. 18B), an upper receiver 1830 (FIG. 18C) and a handguard 1840 (FIG. 18D). In some instances, the underlying firearm component material, e.g., the firearm component substrate, may comprise a transition metal alloy as described herein so that the electrodeposited coating can be omitted and only the surface coating can be applied.

In certain embodiments, one or more surfaces of the firearm component may comprise a first coating adjacent to the substrate of the article, e.g., an electrodeposited coating, and a surface coating disposed on the first coating. If desired, the first coating can be omitted and the electrodeposited coating may be disposed directly on the substrate. In some instances, the first coating one or more surfaces of the firearm component may comprise one, two, three or more of Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In other examples, the first coating on one or more surfaces of the firearm component may comprise nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable. In certain examples, the first coating on one or more surfaces of the firearm component may be an electrodeposited coating comprising nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Nickel-Molybdenum or other Nickel-X alloys where X is a transition metal listed herein. In other examples, the first coating on one or more surfaces of the firearm component may be an electrodeposited coating comprising Zinc in combination with one or more of Scandium, Titanium, Vanadium, Chromium, Manganese, Iron, Cobalt, Copper, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Zinc-Molybdenum or other Zinc-X alloys where X is a transition metal listed herein. In other examples, the first coating on one or more surfaces of the firearm component may be an electrodeposited coating comprising Copper in combination with one or more of Scandium, Titanium, Vanadium, Chromium, Manganese, Iron, Cobalt, Zinc, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Copper-Molybdenum or other Copper-X alloys where X is a transition metal listed herein. As noted herein, the surface coating on one or more surfaces of the firearm component typically is produced using one or more silane systems and silane systems comprising reactive silanol groups or other reactive groups may be particularly desirable, e.g., silane systems comprising aqueous, alcohol-free products of epoxysilanes may be particularly suitable.

Figure 19A:
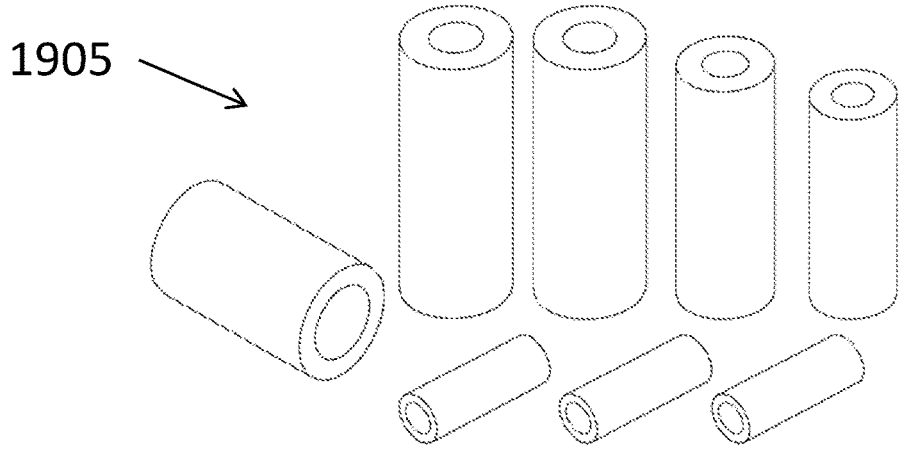
FIGS. 19A, 19B, 19C, 19D, 19E, 19F, 19G, 19H, and 19I are illustrations of vehicle components in accordance with certain embodiments.
Figure 19B:
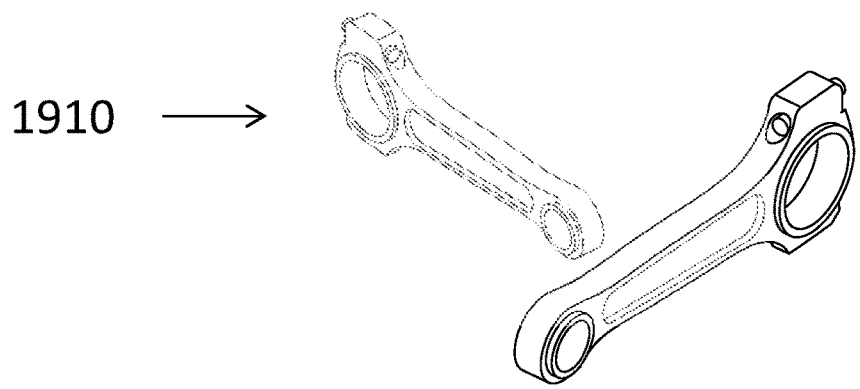
Figure 19C:
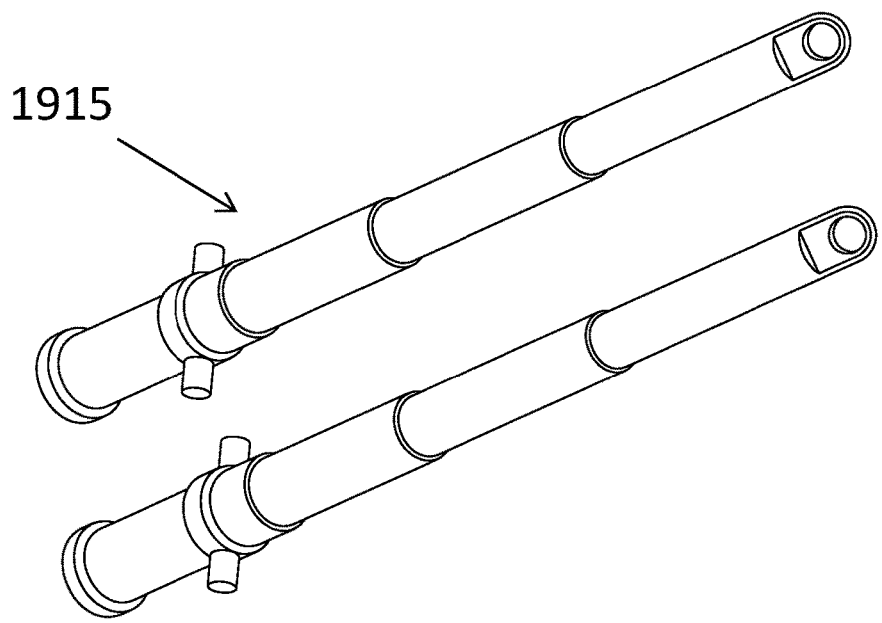
Figure 19D:
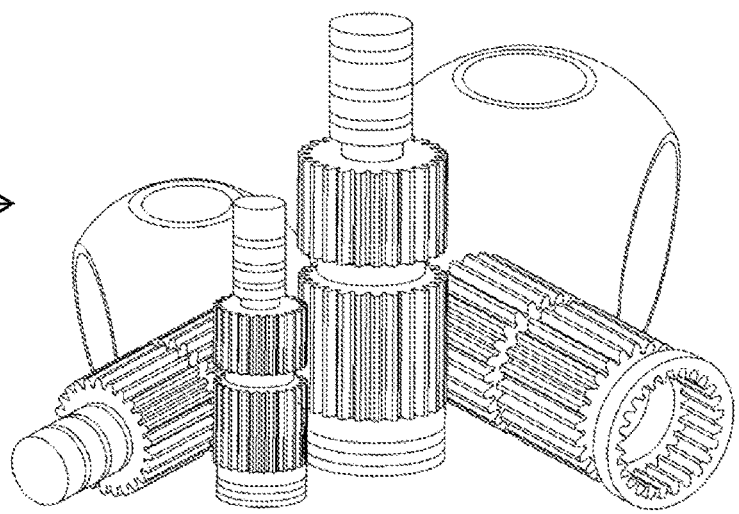
Figure 19E:
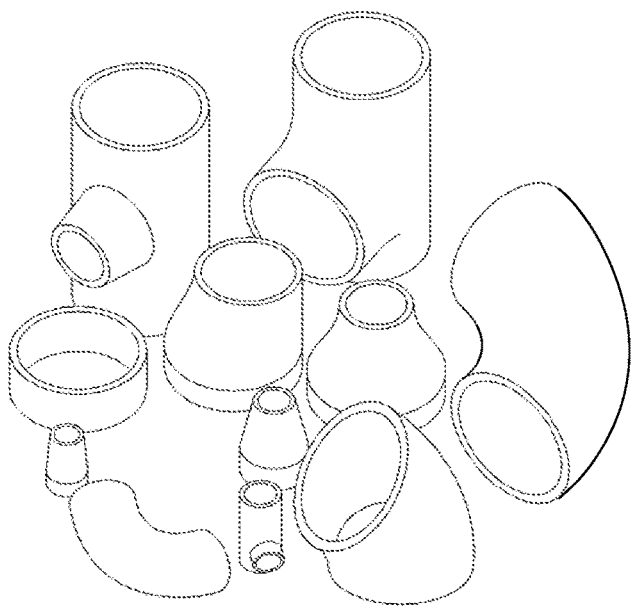
Figure 19F:
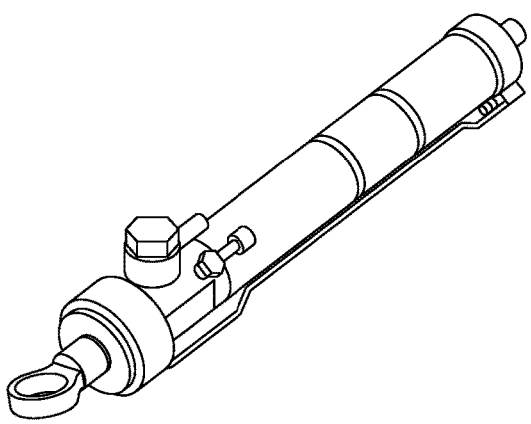
Figure 19G:
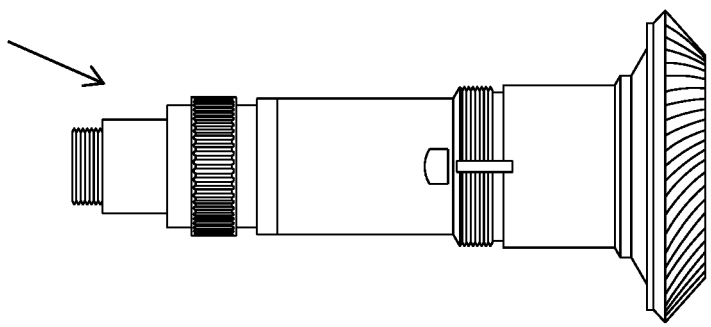
Figure 19H:
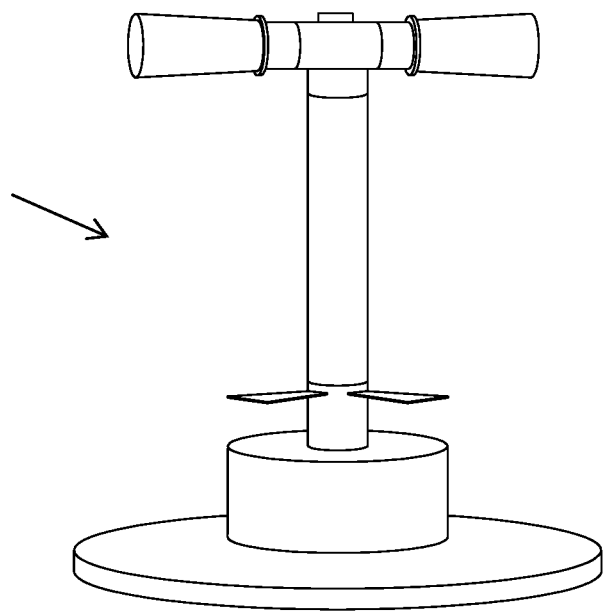
Figure 19I:
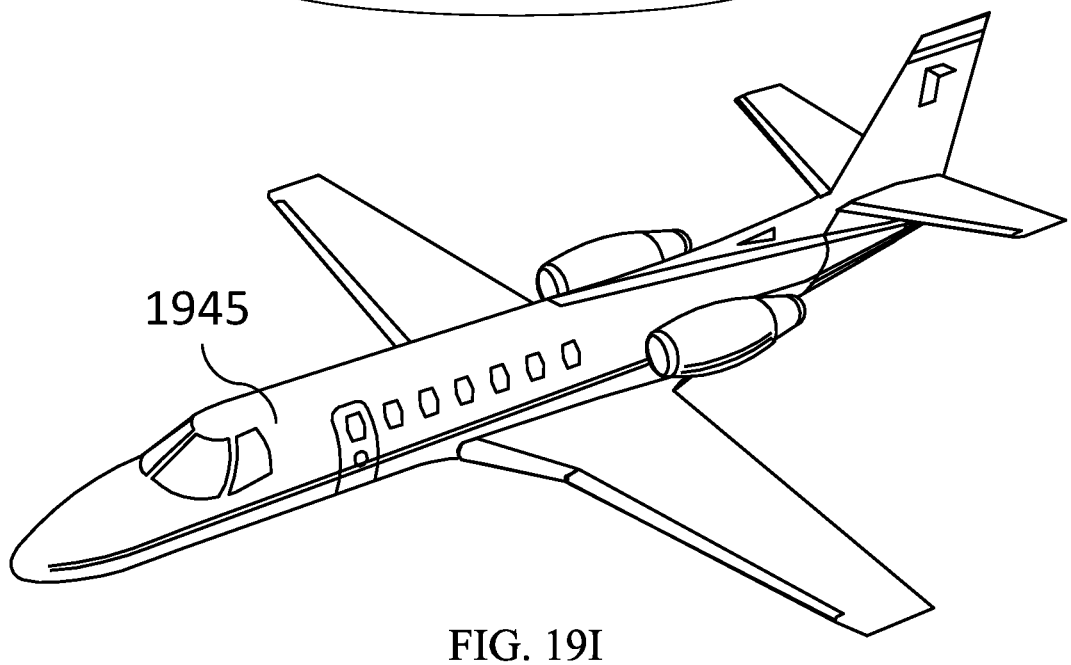

In certain examples, the coatings described herein may be present on one or more vehicle components including internal engine components, external components or other components of vehicles. The term vehicle is used in a broad sense and is intended to include, but is not limited to, automobiles, trucks, trains, subway cars, airplanes, boats, aerospace vehicles, rockets, submarines, satellites, earth moving equipment, backhoes, bulldozers, tractors, extraterrestrial vehicles, extraterrestrial landers, extraterrestrial telescopes and other devices or systems that use a fuel, batteries, electricity, magnetic fields, solar power, wind power, water power or one or more gases to provide propulsion or movement of the vehicle. For example, the coatings can be present on rods, pistons, valves, engine cylinders, engine cylinder sleeves, gears, gear shafts, differentials, clutches, transmission components, transfer case components, driveshafts, exterior covering surfaces, landing gear, cargo doors, door actuators, window actuators, forklift rods, hydraulic cylinders, hydraulic lines, Illustrative vehicle components are shown in FIGS. 19A-19I and include piston rods (collectively 1905 shown in FIG. 19A), connecting rods 1910 (FIG. 19B), fork lift piston rods 1915 (FIG. 19C), toothed shafts such as rings, pinions and ring and pinion carriers 1920 (FIG. 19D), automotive connectors or tubing 1925 (FIG. 19E), a cargo door actuator 1930 (FIG. 19F), a gear shaft 1935 (FIG. 19G), aircraft landing gear 1940 (FIG. 19H), and an exterior skin 1945 of an airplane (FIG. 19I). In some instances, the underlying vehicle component material, e.g., the vehicle component substrate material, may comprise a transition metal alloy as described herein so that the electrodeposited coating can be omitted and only the surface coating can be applied.

In certain embodiments, one or more surfaces of the vehicle component may comprise a first coating adjacent to the substrate of the article, e.g., an electrodeposited coating, and a surface coating disposed on the first coating. If desired, the first coating can be omitted and the electrodeposited coating may be disposed directly on the substrate. In some instances, the first coating one or more surfaces of the vehicle component may comprise one, two, three or more of Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In other examples, the first coating on one or more surfaces of the vehicle component may comprise nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable. In certain examples, the first coating on one or more surfaces of the vehicle component may be an electrodeposited coating comprising nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Nickel-Molybdenum or other Nickel-X alloys where X is a transition metal listed herein. In other examples, the first coating on one or more surfaces of the vehicle component may be an electrodeposited coating comprising Zinc in combination with one or more of Scandium, Titanium, Vanadium, Chromium, Manganese, Iron, Cobalt, Copper, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Zinc-Molybdenum or other Zinc-X alloys where X is a transition metal listed herein. In other examples, the first coating on one or more surfaces of the vehicle component may be an electrodeposited coating comprising Copper in combination with one or more of Scandium, Titanium, Vanadium, Chromium, Manganese, Iron, Cobalt, Zinc, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Copper-Molybdenum or other Copper-X alloys where X is a transition metal listed herein. As noted herein, the surface coating on one or more surfaces of the vehicle component typically is produced using one or more silane systems and silane systems comprising reactive silanol groups or other reactive groups may be particularly desirable, e.g., silane systems comprising aqueous, alcohol-free products of epoxysilanes may be particularly suitable.

In certain examples, the coatings described herein may be present on one or more components used in the oil or gas industry. For example, pipes, drilling mandrels, rotors, drilling bits, drills, gears, gear boxes including internal engine components, external components or other components used in the oil or gas industry may comprise the coatings described herein. Illustrative oil and gas industry components are shown in FIG. 20A-20C and include a pipe 2010 (FIG. 20A), drilling mandrels 2020 (FIG. 20B), a gear box 2030 (FIG. 20C. In some instances, the underlying oil or gas industry component material, e.g., the oil or gas industry component substrate material, may comprise a transition metal alloy as described herein so that the electrodeposited coating can be omitted and only the surface coating can be applied.

In certain embodiments, one or more surfaces of the oil or gas industry component may comprise a first coating adjacent to the substrate of the article, e.g., an electrodeposited coating, and a surface coating disposed on the first coating. If desired, the first coating can be omitted and the electrodeposited coating may be disposed directly on the substrate. In some instances, the first coating one or more surfaces of the oil or gas industry component may comprise one, two, three or more of Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium with stable and non-radioactive transition metals being desirable. In other examples, the first coating on one or more surfaces of the oil or gas industry component may comprise nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable. In certain examples, the first coating on one or more surfaces of the oil or gas industry component may be an electrodeposited coating comprising nickel in combination with one or more of Scandium, Titanium, Vanadium, Chromium, Manganese, Iron, Cobalt, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Nickel-Molybdenum or other Nickel-X alloys where X is a transition metal listed herein. In other examples, the first coating on one or more surfaces of the oil or gas industry component may be an electrodeposited coating comprising Zinc in combination with one or more of Scandium, Titanium, Vanadium, Chromium, Manganese, Iron, Cobalt, Copper, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Zinc-Molybdenum or other Zinc-X alloys where X is a transition metal listed herein. In other examples, the first coating on one or more surfaces of the oil or gas industry component may be an electrodeposited coating comprising Copper in combination with one or more of Scandium, Titanium, Vanadium, Chromium, Manganese, Iron, Cobalt, Zinc, Nickel, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Darmstadtium, Roentgenium, and Copernicium, with stable and non-radioactive transition metals being desirable, to form a transition metal alloy such as Copper-Molybdenum or other Copper-X alloys where X is a transition metal listed herein. As noted herein, the surface coating on one or more surfaces of the oil or gas industry component typically is produced using one or more silane systems and silane systems comprising reactive silanol groups or other reactive groups may be particularly desirable, e.g., silane systems comprising aqueous, alcohol-free products of epoxysilanes may be particularly suitable.

Production Methods

In certain embodiments, the coatings described herein can be produced in many different methods. For example, the surfaces of the substrate can be treated, e.g., etched, abraded, physically or chemically treated, etc., prior to electrodeposition of a coating on the treated surface. Alternatively, the electrodeposited coating can be deposited on the substrate and then the combination can be etched prior to deposition of a surface coating. In other instances, substrate surfaces can be etched and a transition metal alloy coating can be deposited using electroless plating followed by application of a surface coating. Several illustrative methods are described below.

In another embodiment, a process for providing a coating adjacent to a substrate may comprise one or more electrodeposition techniques. The electrodeposition technique desirably provides the formation of a coating which comprises some or all of the characteristics or features described herein, e.g., can be hydrophobic and/or comprises a large water contact angle. Electrodeposition methods may comprise providing an electrolyte mixture. Possible compositions of this mixture are discussed below. Steps such as cleaning or activating the substrate and placing that in the electrolyte mixture can be performed. Different cleaning processes including but not limited to pickling, acid wash, saponification, vapor degreasing, and alkaline wash may be used for cleaning the substrate. The activation process may include but not limited to removal of the inactivate oxides by acid wash or pickling and catalytic deposition of a seed layer; providing an anode. An anode can be provided and used to deposit the coating on the substrate. If desired, depositing optional intermediate layers between the substrate and the electrodeposited coating or between the electrodeposited coating and the surface coating can be performed. The substrate can be removed from the bath, and optional additional processes can be performed—these processes may include different physical or chemical treatments and will be discussed in more detail herein. A surface coating can then be applied by spraying, dipping, soaking, or other methods.

In certain examples, an illustrative electrodeposition system 2100 (see FIG. 21) may comprise three main components: an electrolyte 2110, a negative electrode or cathode 2120, and a positive electrode or anode 2130. A substrate can be a part of the cathode 2120 if desired. Both the cathode 2120 and anode 2130 can be placed in the electrolyte 2110. When electricity is applied, the substrate becomes negatively-charged and attracts positively-charged agents in the electrolyte 2110. A constant, multistep or varying voltage or current can be applied in the electroplating process to control or enhance the resulting coating properties. As a result of applying electricity, positively-charged agents are reduced or neutralized on the substrate and provide the textured layer. As a non-limiting example, a constant voltage in the range of −1 V to −10 V can be applied. As another non-limiting example a constant current in the range of −0.01 to −0.1 mA/cm$^2$ can be applied. The other non-limiting example is applying a varying voltage that alternates or swipes between the open circuit potential and a high voltage beyond the initiation of gas formation during the electrodeposition process. The electrolyte 2110 comprises an aqueous mixture of different components. At least one of these components can be a positively-charged agent that is reduced by applying a voltage or current and gets deposited on the negative electrode. This deposit forms, at least in part, the textured coating layer. Other components of the electrolyte 2110 may also get entrapped in the structure of the electrodeposited layer during the electrodeposition process. The electrodeposition process may be performed at a temperature ranging from 25 to 95° C. Moreover, the electrodeposition may be performed under non-agitation or agitation condition with the agitation rate of 0 to 800 rpm.

In addition to positively-charged agents, electrolyte 2110 may comprise other compounds including, but not limited to, ionic compounds such as negatively-charged agents to enhance electrolyte conductivity, buffer compounds to stabilize electrolyte pH, and different additives. Examples of natively-charged agents, include but are not limited to, bromide ($Br^-$), carbonate ($CO_3^-$), hydrogen carbonate ($HCO_3^-$), chlorate ($ClO_3^-$), chromate ($CrO_4^-$), cyanide ($CN^-$), dichromate ($Cr_2O_7^{2-}$), dihydrogenphosphate ($H_2PO_4^-$), fluoride ($F^-$), hydride ($H^-$), hydrogen phosphate ($HPO_4^{2-}$), hydrogen sulfate or bisulfate ($HSO_4^-$), hydroxide ($OH^-$), iodide ($F^-$), nitride ($N^{3-}$), nitrate ($NO_3^-$), nitrite ($NO_2^-$), oxide ($O_2^-$), permanganate ($MnO_4^-$), peroxide ($O_2^{2-}$), phosphate ($PO_4^{3-}$), sulfide ($S^{2-}$), thiocyanate ($SCN^-$), sulfite ($SO_3^{2-}$), sulfate ($SO_4^{2-}$), chloride ($Cl^-$), boride ($B^{3-}$), borate ($BO_3^{3-}$), disulfide ($S_2^{2-}$), phosphanide ($PH_2^-$), phosphanediide ($PH^{2-}$), superoxide ($O_2^-$), ozonide ($O_3^-$), triiodide ($I_3^-$), dichloride ($Cl_2^-$), dicarbide ($C_2^{2-}$), azide ($N_3^-$), pentastannide ($Sn_5^{2-}$), nonaplumbide ($Pb_9^{4-}$), azanide or dihydridonitrate ($NH_2^-$), germanide ($GeH_3^-$), sulfanide ($HS^-$), sulfanuide ($H_2S^-$), hypochlorite ($ClO^-$), hexafluoridophosphate ($[PF_6]^-$), tetrachloridocuprate(II) ($[CuCl_4]^{2-}$), tetracarbonylferrate ($[Fe(CO)_4]^{2-}$), hydrogen (nonadecaoxidohexamolybdate) ($HMo_6O_{19}^-$), tetrafluoroborate ($[BF_4]^-$), Bis(trifluoromethylsulfonyl)imide ($[NTf_2]^-$), trifluoromethanesulfonate ($[TfO]^-$), Dicyanamide $[N(CN)_2]^-$, methylsulfate $[MeSO_4]^-$, dimethylphosphate $[Me_2PO_4]^-$, acetate $[MeCO_2]^-$, other similar groups, or any combination thereof.

In addition to the positively- and negatively charged agents, the electrolyte 2110 can also comprise one or several additives. Illustrative examples of additives, include are but not limited to, thiourea, acetone, ethanol, cadmium ion, chloride ion, stearic acid, ethylenediamine dihydrochloride, saccharin, cetyltrimethylammonium bromide (CTAB), sodium dodecyl sulfate, ethyl vanillin, ammonia, ethylene diamine, polyethylene glycol (PEG), bis(3-sulfopropyl)disulfide (SPS), Janus green B (JGB), azobenzene-based surfactant (AZTAB), the polyoxyethylene family of surface active agents, sodium citrate, perfluorinated alkylsulfate, additive K, calcium chloride, ammonium chloride, potassium chloride, boric acid, myristic acid, choline chloride, citric acid, any redox active surfactant, any conductive ionic liquids, any wetting agents, any leveling agent, any defoaming agent, any emulsifying agent or any combination thereof. Examples of wetting agents include, but are not limited, to polyglycol ethers, polyglycol alcohols, sulfonated oleic acid derivatives, sulfate form of primary alcohols, alkylsulfonates, alkylsulfates aralkylsulfonates, sulfates, Perfluoro-alkylsulfonates, acid alkyl and aralkyl-phosphoric acid esters, alkylpolyglycol ether, alkylpolyglycol phosphoric acid esters or their salts, or any combination thereof. Examples of leveling agents include but not limited to N-containing and optionally substituted and/or quaternized polymers, such as polyethylene imine and its derivatives, polyglycine, poly(allylamine), polyaniline (sulfonated), polyvinylpyrrolidone, polyvinylpyridine, polyvinylimidazole, polyurea, polyacrylamide, poly(melamine-co-formaldehyde), polyalkanolamines, polyaminoamide and derivatives thereof, polyalkanolamine and derivatives thereof, polyethylene imine and derivatives thereof, quaternized polyethylene imine, poly(allylamine), polyaniline, polyurea, polyacrylamide, poly(melamine-co-formaldehyde), reaction products of amines with epichlorohydrin, reaction products of an amine, epichlorohydrin, and polyalkylene oxide, reaction products of an amine with a polyepoxide, polyvinylpyridine, polyvinylimidazole, polyvinylpyrrolidone, or copolymers thereof, nigrosines, pentamethyl-para-rosaniline, or any combination thereof. Examples of defoaming agents include but not limited to fats, oils, long chained alcohols or glycols, alkylphosphates, metal soaps, special silicone defoamers, commercial perfluoroalkyl-modified hydrocarbon defoamers and perfluoroalkyl-substituted silicones, fully fluorinated alkylphosphonates, perfluoroalkyl-substituted phosphoric acid esters, or any combination thereof. Examples of emulsifying agents include but not limited to cationic-based agents such as the alkyl tertiary heterocyclic amines and alkyl imadazolinium salts, amphoteric-based agents such as the alkyl imidazoline carboxylates, and nonionic-based agents such as the aliphatic alcohol ethylene oxide condensates, sorbitan alkyl ester ethylene oxide condensates, and alkyl phenol ethylene oxide condensates.

In some instances, the electrolyte mixture 2110 may also comprise a pH adjusting agent selected from a group including but not limited to inorganic acids, ammonium bases, phosphonium bases, or any combination thereof. The pH of the electrolyte mixture can be adjusted to a value within the range of 3 to 10 using these pH adjusting agents. The electrolyte can also include nanoparticles that can get entrapped in the electrodeposited layer. Examples of nanoparticles include but not limited to PTFE particles, silica ($SiO_2$) particles, alumina particles ($Al_2O_3$), silicon carbide (SiC), diatomaceous earth (DE), boron nitride (BN), titanium oxide ($TiO_2$), diamond, particles formed from differential etching of spinodally decomposed glass, single wall carbon nanotubes (SWCNTs), multi-wall carbon nanotubes (MWCNTs), platinum oxide ($PtO_2$), other nanoparticles, any chemically or physically modified versions of the foregoing particles, or any combination thereof.

Figure 21:
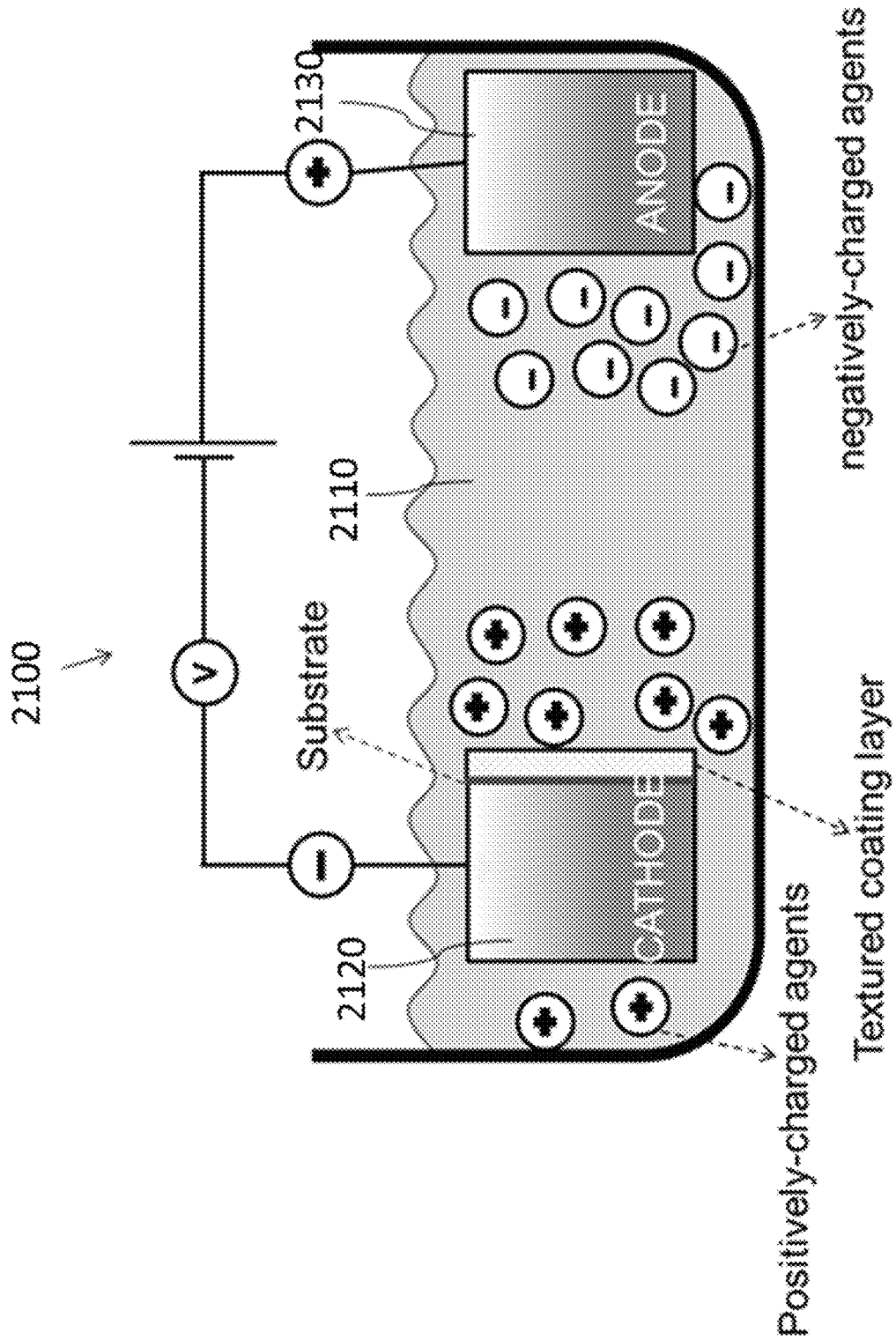
FIG. 21 is an illustration of an electrodeposition system, in accordance with some examples.

In certain examples, the substrate or the base article can be a part of cathode 2120. In FIG. 21, the substrate is schematically depicted as a flat plate; however, it can have different shapes. As an instance, the substrate can be a part of a tube or an object with any regular or irregular geometry. The substrate can be made of any material that is susceptible to receipt of an electroplated coating or electroless coatings including metals, alloys, plastics, composites, and ceramics. An intermediate layer can be applied between the substrate and the electrodeposited coating. The substrate can be conductive or non-conductive. However, for non-conductive substrates an intermediate activation layer or seed layer may be applied before the electrodeposition process.

In some embodiments, in a two-electrode electrodeposition process, such as that depicted in FIG. 21, the anode 2130 can be the reference of the voltage. It is also possible to provide a third electrode as a voltage reference. In FIG. 21, the anode 2130 is schematically depicted as a flat plate; however, it can have different shapes. As an instance, it can be in the shape of pallets, mesh, bar, cylinder or it can be a part of an object with any regular or irregular geometry. The anode 2130 can gradually dissolve during the electrodeposition process and contribute in replenishing the positively charged-ions in the electrolyte. As a non-limiting example, zinc and nickel plates can be used in the zinc and nickel electrodeposition process, respectively. Some anodes such as those made of platinum or titanium remain intact during the electrodeposition process.

In certain examples and while not wishing to be bound by any particular theory, the electroplating process is based on a nucleation and growth mechanism. Non-homogeneous conditions during the nucleation and growth process can result in the formation of textures on the surface of the growing material layer. When the conditions of the growth are not homogeneous, different locations of the surface encounter different growth rates. Some locations grow faster and form peaks while others grow slower and become valleys. This presence of these different resulting features can provide for a surface texture on the substrate. In electroplating, different parameters such as voltage, bath composition, agitation, and bath temperature can be adjusted to control the level of non-homogeneity in the nucleation and growth process, and therefore, make different surface textures. In some instances, the electroplating conditions can be altered during surface coating formation to promote the formation of the textures surfaces. The effects of the process parameters on the deposit surface texture can be better understood by the following non-limiting explanation on the effects of voltage and bath composition. In some examples, the applied voltage can be controlled or tuned during coating to promote formation of textured surfaces. The effect of the applied voltage can be explained by unstable growth theories such as Mullins-Sekerka instability model (see, for example, Mullins and Sekerka, Journal of Applied Physics, Volume 35, Issue 2 (2004). Based on these theories, diffusional mass transfer favors the growth of the arbitrary protrusions of the surface and enhances the morphological instabilities or texture of the growing surface. By controlling the applied voltage, desired growth rates and effects for the surface textures can be achieved.

In certain configurations, similar to the applied voltage, the concentration of different species of the electrolyte can also affect the level of diffusional mass transfer in the bath and, therefore, can have an effect on the deposited surface textures. In addition to this effect, bath composition can have other interesting effects on the deposit surface texture, which is called the additive effect. The additive effect refers to the effect of a chemical reagent on making non-homogeneous growth conditions and subsequently forming a surface texture. Different chemical reagents can undergo different mechanisms to promote the non-homogeneous growth condition.

In certain examples, the exact attributes and properties of the coatings described herein can vary depending on the particular materials which are present, the coating conditions used, etc. In some examples, the surface features of the textured layer of the coatings may exhibit a hierarchical structure. Hierarchical structure refers to the condition where each surface feature comprises smaller features. The size of surface features in hierarchical structures can desirably be at least two times larger than their constituent features. As a prophetic example, the first feature size might be 10 microns while the second feature size is 1 micron.

In certain instances, one or more of the coating layers may comprise nanoparticles. Illustrative nanoparticles can include, but are not limited to, PTFE particles, silica ($SiO_2$) particles, alumina particles ($Al_2O_3$), silicon carbide (SiC), diatomaceous earth (DE), boron nitride (BN), titanium oxide ($TiO_2$), platinum oxide ($PtO_2$), diamond, particles formed from differential etching of spinodally decomposed glass, single wall carbon nanotubes (SWCNTs), mix silicon/titanium oxide particles ($TiO_2/SiO_2$, titanium inner core/silicon outer surface), ceramic particles, thermo-chromic metal oxide, multi-wall carbon nanotubes (MWCNTs), any chemically or physically modified versions of the foregoing particles, and any combination thereof.

In certain configurations, in addition to the electrodeposited and surface coatings, the overall coating can comprise other layers as well. Each coating layer can be distinguished from its top and underneath layers by its different composition. Two adjacent layers might have distinct or indistinct interfaces. Two examples of multiple-layer coatings are discussed below. In a first example, the condition wherein one or multiple conformal coating layers are present on top of the electrodeposited layer is described. Conformal layers are defined as the coating layers that approximately follow the surface texture of their underlying layer. The conformal coating layer can comprise one or more of Chromium Nitride (CrN), Diamond Like Carbon (DLC), Titanium Nitride (TiN), Titanium Carbo-nitride (TiCN), Aluminum Titanium Nitride (ALTiN), Aluminum Titanium Chromium Nitride (AlTiCrN), Zirconium Nitride (ZrN), Nickel, gold, PlasmaPlus®, Cerablack™ Chromium, Nickel Fluoride ($NiF_2$), any Nickel Composite, any organic or inorganic-organic material and combinations thereof. Examples of nickel composites suitable for use as the conformal coating include, but are not limited to, composites of nickel with different particles selected from a group consisting of PTFE, silica ($SiO_2$), alumina ($Al_2O_3$), silicon carbide (SiC), diamond, diatomaceous earth (DE), boron nitride (BN), titanium oxide (TiO2), single wall carbon nanotubes (SWCNTs), multi-wall carbon nanotubes (MWCNTs), kaoline ($Al_2O_3.2SiO_2.2H_2O$), graphite, other nanoparticles, or any combination thereof. Examples of organic or inorganic-organic materials suitable for use as the conformal coating include, but are not limited to, parylene, organo-functional silanes, fluorinated alkylsilane, fluorinated alkyl-siloxane, organofunctional resins, hybrid inorganic organo-functional resins, organofunctional polyhedral oligomeric silsesquioxane (POSS), hybrid inorganic organofunctional POSS resins, silicone polymers, fluorinated oligomeric polysiloxane, organofunctional oligomeric poly siloxane, fluorinated organofunctional silicone copolymers, organo-functional silicone polymers, hybrid inorganic organofunc-tional silicone polymers, organofunctional silicone copolymers, hybrid inorganic organofunctional silicone copolymers, fluorinated polyhedral oligomeric silsesquioxane (FPOSS), Dynasylan® SIVO, other similar groups, or any combination thereof.

In some instances, two or more different types of organofunctional silanes can be present in any one layer. For example, an organofunctional silanes, or two or more organofunctional silanes, can be co-deposited with one or more of the other materials described herein. As noted herein, organofunctional silanes are a group of compounds that combine the functionality of a reactive organic group with inorganic functionality in a single molecule. This special property allows them to be used as molecular bridges in-between organic polymers and inorganic materials. The organic moiety of the silane system can be tailored with different functionalities consisting amino, benzylamino, benzyl, chloro, fluorinated alkyl/aryl, disulfido, epoxy, epoxy/melamine, mercapto, methacrylate, tetrasulfido, ureido, vinyl, vinyl-benzyl-amino, and any combination thereof. While any of these groups can be used application of the following groups is more common: amino, chloro, fluorinated alkyl/aryl, vinyl, and vinyl-benzyl-amino. The examples of aminosilane system are n-(3-acryloxy-2-hydroxypropyl)-3-aminopropyltriethoxysilane, n-(n-acetyl-leucyl)-3-aminopropyltriethoxysilane, 3-(n-allylamino)pro-pyltrimethoxysilane, 4-aminobutyltriethoxysilane, 4-amino-3,3-dimethylbutylmethyldimethoxysilane, 4-amino-3,3-dimethylbutyltrimethoxysilane, aminoneohexyltrimethoxysilane, 1-amino-2-(dimethyl-ethoxysilyl)propane, n-(2-aminoethyl)-3-aminoisobutyldi-methylmethoxysilane, n-(2-aminoethyl)-3-aminoisobutylm-ethyldimethoxysilane, (aminoethylaminomethyl) phenethyltrimethoxysilane, n-(2-aminoethyl)-3-aminopropylmethyldiethoxysilane, n-(2-aminoethyl)-3-aminopropylmethyldimethoxysilane, n-(2-aminoethyl)-3-amino propyltrimethoxysilane, oligomeric co-hydrolysate, n-(2-aminoethyl)-2,2,4-trimethyl-1-aza-2-silacyclopentane, n-(6-aminohexyl)aminomethyltriethoxysilane, n-(2-amino-ethyl)-11-aminoundecyltrimethoxysilane, 3-(m-aminophe-noxy)propyltrimethoxysilane, m-aminophenyltrimethoxysi-lane, p-aminophenyltrimethoxysilane, aminophenyltrimethoxysilane, n-3-[(amino(polypropyl-enoxy)]aminopropyltrimethoxysilane, 3-aminopropyldiiso-propylethoxysilane, 3-aminopropyldiisopropylethoxysilane, 3-aminopropyldimethylethoxysilane, 3-aminopropyldim-ethylfluorosila, n-(3-aminopropyldimethylsilyl)aza-2,2-di-methyl-2-silacyclopentane, 3-aminopropylmethyldiethox-ysilane, 3-aminopropyltris(methoxyethoxyethoxy)silane, 11-aminoundecyltriethoxysilane, n-(2-n-benzylamino-ethyl)-3-aminopropyltrimethoxysilane, n,n-bis(2-hydroxy-ethyl)-3-aminopropyltriethoxysilane, bis(trimethylsilyl)-3-aminopropyltrimethoxysilane, n-butylaminopropyltrimethoxysilane, t-butylaminopropylt-rimethoxysilane, (n-cyclohexylaminomethyl) methyldi-ethoxysilane, (n-cyclohexylaminopropyl) trimethoxysilane, (n,n-diethylaminomethyl)triethoxysilane, (n,n-diethyl-3-aminopropyl)trimethoxysilane, 3-(n,n-dimethylaminopro-pyl)aminopropylmethyldimethoxysilane, (n,n-dimethylami-nopropyl)-aza-2-methyl-2-methoxysilacyclopentane, n,n-dimethyl-3-aminopropylmethyldimethoxysilane, 3-(1,3-dimethylbutylidene)aminopropyltriethoxysilane, (3-(n-ethylamino)isobutyl)methyldiethoxysilane, (3-(n-ethylamino)isobutyl)trimethoxysilane, n-methyl-n-trimethylsilyl-3-aminopropyltrimethoxysilane, (phenylaminomethyl)methyldimethoxysilane, n-phenylami-nomethyltriethoxysilane, n-phenylaminopropyltrimethox-ysilane, 3-(n-styrylmethyl-2-aminoethylamino)propylt-rimethoxysilane hydrochloride, (3-trimethoxysilylpropyl) diethylenetriamine, (cyclohexylaminomethyl)triethoxy-silane, (n-methylaminopropyl)methyl(1,2-propanediolato) silane, n-(trimethoxysilylpropyl)ethylenediaminetriacetate, tripotassium salt, n-(trimethoxysilylpropyl)ethylenediamin-etriacetate, trisodium salt, 1-[3-(2-aminoethyl)-3-ami-noisobutyl]-1,1,3,3,3-pentaethoxy-1,3-disilapropane, bis(m-ethyldiethoxysilylpropyl)amine, bis (methyldimethoxysilylpropyl)-n-methylamine, bis(3-triethoxysilylpropyl)amine, n,n'-bis[(3-trimethoxysilyl) propyl]ethylenediamine, tris(triethoxysilylpropyl)amine, tris(triethoxysilylmethyl)amine, bis[4-(triethoxysilyl)butyl] amine, tris[(3-diethoxymethylsilyl)propyl)amine, n-(hy-droxyethyl)-n,n-bis(trimethoxysilylpropyl)amine, n-(hy-droxyethyl)-n-methylaminopropyltrimethoxysilane, n-(3-methacryloxy-2-hydroxypropyl)-3-aminopropyltriethoxysilane, 3-(n-styrylmethyl-2-aminoethylamino)propyltrimethoxysilane, 3-(2,4-dinitrophenylamino)propyltriethoxysilane, 4-nitro-4(n-ethyl-n-trimethoxysilylcarbamato)aminoazobenzene, bis (diethylamino)dimethylsilane, bis(dimethylamino) diethylsilane, bis(dimethylamino)dimethylsilane, (diethylamino)trimethylsilane, (n,n-dimethylamino)trimeth-ylsilane, tris(dimethylamino)methylsilane, n-butyldimethyl (dimethylamino)silane, n-decyltris(dimethylamino) silane, n-octadecyldiisobutyl(dimethylamino) silane, n-octa-decyldimethyl(diethylamino) silane, n-octadecyldimethyl (dimethylamino) silane, n-octadecyltris(dimethylamino) silane, n-octyldiisopropyl(dimethylamino) silane, n-octyldi-methyl(dimethylamino) silane, and any combination thereof. the examples of the benzylaminosilane system are n-(2-benzylaminoethyl)-3-aminopropyltrimethoxysilane, n-(2-n-benzylaminoethyl)-3-aminopropyltrimethoxysilane hydrochloride, n-benzylaminomethyltrimethylsilane, or any combination thereof. The example of benzylsilane system are benzyldimethylchlorosilane, benzyldimethylsilane, n-benzyl-n-methoxymethyl-n-(trimethylsilylmethyl) amine, benzyloxytrimethylsilane, benzyltrichlorosilane, benzyltriethoxysilane, benzyltrimethylsilane, bis(trimethylsilylmethyl)benzylamine, (4-bromobenzyl) trimethylsilane, dibenzyloxydiacetoxysilane, or any combination thereof. The examples of chloro and chlorosilane system are (−)-camphanyldimethylchlorosilane, 10-(carbomethoxy)decyldimethylchlorosilane, 10-(carbomethoxy)decyltrichlorosilane, 2-(carbomethoxy)ethylmethyldichlorosilane, 2-(carbomethoxy)ethyltrichlorosilane, 3-chloro-n,n-bis(trimethylsilyl)aniline, 4-chlorobutyldimethylchlorosilane, (chlorodimethylsilyl)-5-[2-(chlorodimethylsilyl)ethyl]bicycloheptane, 13-(chlorodimethylsilylmethyl)heptacosane, 11-(chlorodimethylsilyl)methyltricosane, 7-[3-(chlorodimethylsilyl)propoxy]-4-methylcoumarin, 2-chloroethylmethyldichlorosilane, 2-chloroethylmethyldimethoxysilane, 2-chloroethylsilane, 1-chloroethyltrichlorosilane, 2-chloroethyltrichlorosilane, 2-chloroethyltriethoxysilane, 1-chloroethyltrimethylsilane, 3-chloroisobutyldimethylchlorosilane, 3-chloroisobutyldimethylmethoxysilane, 3-chloroisobutylmethyldichlorosilane, 1-(3-chloroisobutyl)-1,1,3,3,3-pentachloro-1,3-disilapropane, 1-(3-chloroisobutyl)-1,1,3,3,3-pentaethoxy-1,3-disilapropane, 3-chloroisobutyltrimethoxysilane, 2-(chloromethyl)allyltrichlorosilane, 2-(chloromethyl)allyltrimethoxysilane, 3-[2-(4-chloromethylbenzyloxy)ethoxy]propyltrichlorosilane, chloromethyldimethylchlorosilane, chloromethyldimethylethoxysilane, chloromethyldimethylisopropoxysilane, chloromethyldimethylmethoxysilane, (chloromethyl)dimethylphenylsilane, chloromethyldimethylsilane, 3-(chloromethyl)heptamethyltrisiloxane, chloromethylmethyldichlorosilane, chloromethylmethyldiethoxysilane, chloromethylmethyldiisopropoxysilane, chloromethylmethyldimethoxysilane, chloromethylpentamethyldisiloxane, ((chloromethyl)phenylethyl)dimethylchlorosilane, ((chloromethyl)phenylethyl)methyldichlorosilane, ((chloromethyl)phenylethyl)methyldimethoxysilane, ((chloromethyl)phenylethyl)trichlorosilane, ((chloromethyl)phenylethyl)triethoxysilane, ((chloromethyl)phenylethyl)trimethoxysilane, chloromethylphenethyltris(trimethylsiloxy) silane, (p-chloromethyl)phenyltrichlorosilane, (p-chloromethyl)phenyltrimethoxysilane, chloromethylsilatrane, chloromethyltrichlorosilane, chloromethyltriethoxysilane, chloromethyltriisopropoxysilane, chloromethyltrimethoxysilane, chloromethyltrimethylsilane, 2-chloromethyl-3-trimethylsilyll-propene, chloromethyltris(trimethylsiloxy)silane, (5-chloro-1-pentynyl)trimethylsilane, chlorophenylmethyldichloro-silane, chlorophenyltrichlorosilane, chlorophenyltriethoxysilane, p-chlorophenyltriethoxysilane, p-chlorophenyltrimethylsilane, (3-chloropropoxy)isopropyldimethylsilane, (3-chloropropyl)(t-butoxy)dimethoxysilane, 3-chloropropyldimethylchlorosilane, 3-chloropropyldimethylethoxysilane, 3-chloropropyldimethylmethoxysilane, 3-chloropropyldimethylsilane, 3-chloropropyldiphenylmethylsilane, chloropropylmethyldichlorosilane, 3-chloropropylmethyldiethoxysilane, 3-chloropropylmethyldiisopropoxysilane, 3-chloropropylmethyldimethoxysilane, (3-chloropropyl)pentamethyldisiloxane, 3-chloropropyltrichlorosilane, 3-chloropropyltriethoxysilane, 3-chloropropyltrimethoxysilane, 3-chloropropyltrimethylsilane, 3-chloropropyltriphenoxysilane, 3-chloropropyltris(trimethylsiloxy) silane, 2-(4-chlorosulfonylphenyl)ethyltrichlorosilane, 2-(4-chlorosulfonylphenyl)ethyltrichlorosilane, 2-(4-chlorosulfonylphenyl)ethyltrimethoxysilane, 2-(4-chlorosulfonylphenyl)ethyltrimethoxysilane, 1-chloro-5-(trimethylsilyl)-4-pentyne, chlorotris(trimethylsilyl)silane, 11-chloroundecyltrichlorosilane, 11-chloroundecyltriethoxysilane, 11-chloroundecyltrimethoxysilane, 1-chlorovinyltrimethylsilane, (3-cyanobutyl)dimethylchlorosilane, (3-cyanobutyl)methyldichlorosilane, (3-cyanobutyl)trichlorosilane, 12-cyanododec-10-enyltrichlorosilane, 2-cyanoethylmethyldichlorosilane, 2-cyanoethyltrichlorosilane, 3-cyanopropyldiisopropylchlorosilane, 3-cyanopropyldimethylchlorosilane, 3-cyanopropylmethyldichlorosilane, 3-cyanopropylphenyldichlorosilane, 3-cyanopropyltrichlorosilane, 3-cyanopropyltriethoxysilane, 11-cyanoundecyltrichlorosilane, [2-(3-cyclohexenyl)ethyl]dimethylchlorosilane, [2-(3-cyclohexenyl)ethyl]methyldichlorosilane, [2-(3-cyclohexenyl)ethyl]trichlorosilane, 3-cyclohexenyltrichlorosilane, cyclohexyldimethylchlorosilane, cyclohexylmethyldichlorosilane, (cyclohexylmethyl)trichlorosilane, cyclohexyltrichlorosilane, (4-cyclooctenyl)trichlorosilane, cyclooctyltrichlorosilane, cyclopentamethylenedichlorosilane, cyclopentyltrichlorosilane, cyclotetramethylenedichlorosilane, cyclotrimethylenedichlorosilane, cyclotrimethylenemethylchlorosilane, 1,3-dichlorotetramethyldisiloxane, 1,3-dichlorotetraphenyldisiloxane, dicyclohexyldichlorosilane, dicyclopentyldichlorosilane, di-n-dodecyldichlorosilane, dodecylmethylsilyl)methyldichlorosilane, diethoxydichlorosilane, or any combination thereof. the examples of the epoxysilane system are 2-(3,4-epoxycyclohexyl) ethylmethyldiethoxysilane, 2-(3,4-epoxycyclohexyl) ethyltriethoxysilane, 2-(3,4-epoxycyclohexyl) ethyltrimethoxysilane, 5,6-epoxyhexyltriethoxysilane, (epoxypropyl)heptaisobutyl-T8-silsesquioxane, or any combination thereof. The example of mercaptosilane system are (mercaptomethyl)methyldiethoxysilan, 3-mercaptopropylmethyldimethoxysilane, 3-mercaptopropyltriethoxysilane, 3-mercaptopropyltrimethoxysilane, 3-mercaptopropyltrimethoxysilane, 3-mercaptopropyltrimethylsilane, 3-mercaptopropyltriphenoxysilane, 11-mercaptoundecyloxytrimethylsilane, 11-mercaptoundecyltrimethoxysilane, or any combination thereof. The examples of ureidosilane are ureidopropyltriethoxysilane, ureidopropyltrimethoxysilane, or any combination thereof. The examples of vinyl, vinylbenzylsilane system are vinyl(bromomethyl)dimethylsilane, (m,p-vinylbenzyloxy)trimethylsilane, vinyl-t-butyldimethylsilane, vinyl(chloromethyl)dimethoxysilane, vinyl(chloromethyl)dimethylsilane, 1-vinyl-3-(chloromethyl)-1,1,3,3-tetramethyldisiloxane, vinyldiethylmethylsilane, vinyldimethylchlorosilane, vinyldimethylethoxysilane, vinyldimethylfluorosilane, vinyldimethylsilane, vinyldi-n-octylmethylsilane, vinyldiphenylchlorosilane, vinyldiphenylethoxysilane, vinyldiphenylmethylsilane, vinyl(diphenylphosphinoethyl)dimethylsilane, vinyl(p-methoxyphenyl)dimethylsilane, vinylmethylbis(methylethylketoximino) silane, vinylmethylbis(methylisobutylketoximino) silane, vinylmethylbis(trimethylsiloxy)silane, vinylmethyldiacetoxysilane, vinylmethyldichlorosilane, vinylmethyldichlorosilane, vinylmethyldiethoxysilane, vinylmethyldimethoxysilane, 1-vinyl-1-methylsilacyclopentane, vinyloctyldichlorosilane, o-(vinyloxybutyl)-n-triethoxysilylpropyl carbamate, vinyloxytrimethylsilane, vinylpentamethyldisiloxane, vinylphenyldichlorosilane, vinylphenyldiethoxysilane, vinylphenyldimethylsilane, vinylphenylmethylchlorosilane, vinylphenylmethylmethoxysilane, vinylphenylmethylsilane, vinylsilatrane, vinyl-1,1,3,3-tetramethyldisiloxane, vinyltriacetoxysilane, vinyltri-t-butoxysilane, vinyltriethoxysilane, vinyltriethoxysilane, oligomeric hydrolysate, vinyltriethoxysilane-propyltriethoxysilane, oligomeric co-hydrolysate, vinyltriethylsilane, vinyl(trifluoromethyl)dimethylsilane, vinyl(3,3,3-trifluoropropyl)dimethylsilane, vinyltriisopropenoxysilane, vinyltriisopropoxysilane, vinyltrimethoxysilane, vinyltrimethoxysilane, oligomeric hydrolysate, vinyltrimethylsilane, vinyltriphenoxysilane, vinyltriphenylsilane, vinyltris(dimethylsiloxy)silane, vinyltris(2-methoxyethoxy)silane, vinyltris(1-methoxy-2-propoxy)silane, vinyltris(methylethylketoximino)silane, vinyltris(trimethylsiloxy)silane, or any combination thereof.

Illustrative examples of fluorinated alkyl/aryl silane include, but are not limited to, 4-fluorobenzyltrimethylsilane, (9-fluorenyl) methyldichlorosilane, (9-fluorenyl) trichlorosilane, 4-fluorophenyltrimethylsilane, 1,3-bis(tridecafluoro-1,1,2,2-tetrahydrooctyl) tetramethyldisiloxane, 1H,1H,2H,2H-perfluorodecyltrimethoxysilane, 1H,1H,2H,2H-perfluorodecyltrichlorosilane, 1H,1H,2H,2H-perfluorooctyltrichlorosilane, 1H,1H,2H,2H-perfluorooctadecyltrichlorosilane, 1H,1H,2H,2H-Perfluorooctyltriethoxysilane, 1H,1H,2H,2H-Perfluorododecyltrichlorosilane, Trimethoxy(3,3,3-trifluoropropyl)silane, tridecafluoro-1,1,2,2-tetrahydrooctyl-1-trimethoxysilane, tridecafluoro-1,1,2,2-tetrahydrooctyl-1-triethoxysilane, and any combination thereof.

Where an organofunctional resin is present, the organofunctional resin can be selected from the group consisting of epoxy, epoxy putty, ethylene-vinyl acetate, phenol formaldehyde resin, polyamide, polyester resins, polyethylene resin, polypropylene, polysulfides, polyurethane, polyvinyl acetate, polyvinyl alcohol, polyvinyl chloride (PVC), polyvinyl chloride emulsion (PVCE), polyvinylpyrrolidone, rubber cement, silicones, and any combination thereof. Organofunctional polyhedral oligomeric silsesquioxane (POSS) can be selected from the group consisting acrylates, alcohols, amines, carboxylic acids, epoxides, fluoroalkyls, halides, imides, methacrylates, molecular silicas, norbornenyls, olefins, polyethylenglycols (PEGs), silanes, silanols, thiols, and any combination thereof. Illustrative examples of acrylates POSS's include acryloisobutyl POSS, or any combination thereof. Illustrative examples of alcohols POSS are diol isobutyl POSS, Cyclohexanediol isobutyl POSS, Propanediol isobutyl POSS, Octa (3-hydroxy-3-methylbutyldimethylsiloxy) POSS, or any combination thereof. Illustrative examples of amines POSS are Aminopropylisobutyl POSS, Aminopropylisooctyl POSS, Aminoethylaminopropylisobutyl POSS, OctaAmmonium POSS, Aminophenylisobutyl POSS, Phenylaminopropyl POSS Cage Mixture, or any combination thereof. Illustrative examples of a Carboxylic Acids POSS are Maleamic Acid-Isobutyl POSS, OctaMaleamic Acid POSS, or any combination thereof. Illustrative examples of an epoxide are Epoxycyclohexylisobutyl POSS, Epoxycyclohexyl POSS Cage Mixture, Glycidyl POSS Cage Mixture, Glycidylisobutyl POSS, Triglycidylisobutyl POSS, Epoxycyclohexyl dimethylsilyl POSS, OctaGlycidyldimethylsilyl POSS, or any combination thereof. In the case of fluoroalkyl POSS examples are Trifluoropropyl POSS Cage Mixture, Trifluoropropylisobutyl POSS, or any combination thereof. In the case of halid POSS is Chloropropylisobutyl POSS, or any combination thereof. In the case of Imides POSS examples are POSS Maleimide Isobutyl, or any combination thereof. In the case of Methacrylates examples are Methacryloisobutyl POSS, Methacrylate Ethyl POSS, Methacrylate Isooctyl POSS, Methacryl POSS Cage Mixture, or any combination thereof. In the case of molecular silica POSS examples are DodecaPhenyl POSS, Isooctyl POSS Cage Mixture, Phenylisobutyl POSS, Phenylisooctyl POSS, Octaisobutyl POSS, OctaMethyl POSS, OctaPhenyl POSS, OctaTMA POSS, OctaTrimethylsiloxy POSS, or any combination thereof. In the case of Norbornenyls examples are NB1010-1,3 -Bis(Norbornenylethyl)-1,1,3,3-tetramethyldisiloxane, Norbornenylethyldimethylchlorosilane, NorbornenylethylDiSilanolisobutyl POSS, Trisnorbornenylisobutyl POSS, or any combination thereof. In the case of Olefins example are Allyisobutyl POSS, Vinylisobutyl POSS, Vinyl POSS Cage Mixture, or any combination thereof. In the case of PEGs, examples include PEG POSS Cage Mixture, MethoxyPEGisobutyl POSS, or any combination thereof. In the case of a silane examples are OctaSilane POSS, or any combination thereof. In the case of silanols examples are DiSilanolisobutyl POSS, TriSilanolEthyl POSS, TriSilanolisobutyl POSS, TriSilanolisooctyl POSS, TriSilanolPhenyl POSS Lithium Salt, TrisilanolPhenyl POSS, TetraSilanolPhenyl POSS, or any combination thereof. In the case of thiols is Mercaptopropylisobutyl POSS, or any combination thereof.

In certain embodiments, one or more of the coatings described herein can be coated with an additional layer. For example, at least one additional layer comprising a lubricant, a polymer blend, nanoparticles, or any combination thereof, such as polymer-nanoparticle composite materials may be present. Nanoparticles can either be treated with a low surface energy material in advance or a low surface energy material can be added to the chemical blend of the additional layer. High surface energy materials are more easily wet than low surface energy materials. Low surface energy materials usually exhibit a surface energy value less than 70 $mJ/m^2$ when measured according to the ASTM D7490-13 standard. Examples of low surface energy materials include but not limited to organofunctional silane, low-surface-energy resins, fluorinated alkylsiloxane, fluorinated alkylsilane, silicone polymers, organofunctional silicone polymers, organofunctional silicone copolymers, fluorinated polyhedral oligomeric silsesquioxane (FPOSS), Dynasylan® SIVO, organofunctional polyhedral oligomeric silsesquioxane (POSS), or any combination thereof. Examples of nanoparticles used in the structure of the additional layer include but not limited to silica ($SiO_2$), alumina ($Al_2O_3$), silicon carbide (SiC), diamond, diatomaceous earth (DE), boron nitride (BN), titanium oxide ($TiO_2$), single wall carbon nanotubes (SWCNTs), multi-wall carbon nanotubes (MWCNTs), kaolin ($Al_2O_3.2SiO_2.2H_2O$), or any combination thereof. In particular, nanoparticles can be hydrophobic ceramic-based particles selected from the group consisting of AEROSIL® brand from Evonik industries, the product of Dry Surface Technologies (DST) under Barrian™ brand, CAB-O-SIL® brand from Cabot Corporation, HDK® brand from WACKER, and any combination thereof.

In some instances, the polymer used in the structure of the additional layer can be selected from the group including but not limited to organic polymers, thermoplastic polymers, thermosetting polymers, copolymers, terpolymers, a block copolymer, an alternating block copolymer, a random polymer, homopolymer, a random copolymer, a random block copolymer, a graft copolymer, a star block copolymer, a dendrimer, a poly electrolyte (polymers that have some repeat groups that contains electrolytes), a poly ampholyte (Poly ampholytes are polyelectrolytes with both cationic and anionic repeat groups. There are different types of poly ampholyte. In the first type, both anionic and cationic groups can be neutralized. In the second type, anionic group can be neutralized, while cationic group is a group insensitive to pH changes such as a quaternary alkyl ammonium group. In the third type, cationic group can be neutralized and anionic group is selected from those species such as sulfonate groups that are showing no response to pH changes. In the fourth type, both anionic and cationic groups are insensitive to the useful range of pH changes in the solution), ionomers (an ionomer is a polymer comprising repeat units of electrically neutral and ionized units. Ionized units are covalently bonded to the polymer backbone as pendant group moieties and usually consist mole fraction of no more than 15 mole percent), oligomers, cross-linkers, or any combination thereof. Examples of organic polymers include, but are not limited, to polyacetals, polyolefins, polyacrylics, polycarbonates, polystyrenes, polyesters, polyamides, polyamidimides, polyacrylates, polyarylsulfones, polyethersulfones, polyphenylene sulfides, polyvinylchlorides, polysulfones, polyimides, polyetherimides, polytetrafluoroethylenes, polyether ketone ketones, polybenzoxazoles, polyphthalides, polyacetals, polyanhydrides, polyvinyl ethers, polyvinyl thioethers, polyvinyl alcohols, polyvinyl ketones, poly vinyl halides, polyvinyl nitriles, polyvinyl esters, polysulfonates, poly sulfides, polythioesters, polysulfones, polysulfonamides, polyureas, polyphosphazenes, polysilazanes, styrene acrylonitrile, acrylonitrile-butadiene-styrene (ABS), polyethylene terephthalate, polybutylene terephthalate, polyurethane, ethylene ptopylene diene rubber (EPR), perfluoroelastomers, fluorinated ethylene propylene, perfluoroalkoxyethylene, poly-chlorotrifluoroethylene, polyvinylidene fluoride, polysiloxanes, or any combination thereof. Examples of polyelectrolytes include, but are not limited to, polystyrene sulfonic acid, polyacrylic acid, pectin, carrageenan, alginates, carboxymethylcellulose, polyvinylpyrrolidone, or any combination thereof. Examples of thermosetting polymers include, but are not limited to, epoxy polymers, unsaturated polyester polymers, polyimide polymers, bismaleimide polymers, bismaleimide triazine polymers, cyanate ester polymers, vinyl polymers, benzoxazine polymers, benzocyclobutene polymers, acrylics, alkyds, phenol-formaldehyde polymers, urea-formaldehyde polymers, novolacs, resoles, melamine-formaldehyde polymers, urea-formaldehyde polymers, hydroxymethylfuranes, isocyanates, diallyl phthalate, triallyl cyanurate, triallyl isocyanurate, unsaturated polysterimides, or any combination thereof. Examples of thermoplastic polymers include, but are not limited to, acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, poly sulfone/acrylonitrile-butadiene-styrene, polycarbonate/thermoplastic urethane, polycarbonate/polybutylene terephthalate, thermoplastic elastomer alloys, nylon/elastomers, polyester/elastomers, polyethylene terephthalate/polybutylene terephthalate, acetal/elastomer, styrene maleic anhydride/acrylonitrile-butadiene-styrene, polyether etherketone/polyethersulfone, polyether, etherketone/polyetherimide polyethylene/nylon, polyethylene/polyacetal, or any combination thereof.

In certain examples, processes other than electrodeposition processes can also be used in production of the coatings. The layer adjacent to the substrate can be produced, for example, through a process comprising a combination of the electrodeposition techniques and any other technique selected from the group consisting of annealing and thermal processing, vacuum conditioning, aging, plasma etching, grit blasting, wet etching, ion milling, exposure to electromagnetic radiation such as visible light, UV, and x-ray, other processes, and combinations thereof. In addition, the manufacturing process of the layer adjacent to the substrate can be followed by at least one additional coating process selected from the group consisting of electrodeposition, electroless deposition, surface functionalization, electro-polymerization, spray coating, brush coating, dip coating, electrophoretic deposition, reaction with fluorine gas, plasma deposition, brush plating, chemical vapor deposition, sputtering, physical vapor deposition, passivation through the reaction of fluorine gas, any other coating technique, and any combination thereof.

In certain instances, the coatings described herein can provide heat-resistant characteristics at least up to a certain maximum temperature. This characteristic is observed if a water contact angle of the coating changes less than 20 percent after the coating is subjected to a thermal process at 100° C. or higher for 12 hours or longer. In some examples, the coatings can be heat-resistant up to about 300 degrees Celsius, 350 degrees Celsius or 400 degrees Celsius.

Certain specific examples of coated articles that provide corrosion resistance are described below to illustrate further some of the novel and inventive aspects of the technology described herein. Damage to components can be caused by wear, corrosion, high temperature or by a combination of these three modes. The examples below describe the performance of the coating in exposure to different damaging factors. Almost in all tests, the damaging factor is exaggerated compared to the real environment. Therefore, the tests represent accelerated damaging condition or conditions which are generally much more harsh than those experienced by most substrates in their use environment.

Example 1

All articles that includes a MaxShield™ coatings in the examples below included a layer comprising nickel and molybdenum. An optional surface coating including a reaction product of a silane system with the underlying coating can be added if desired to further enhance certain properties.

Figure 22:
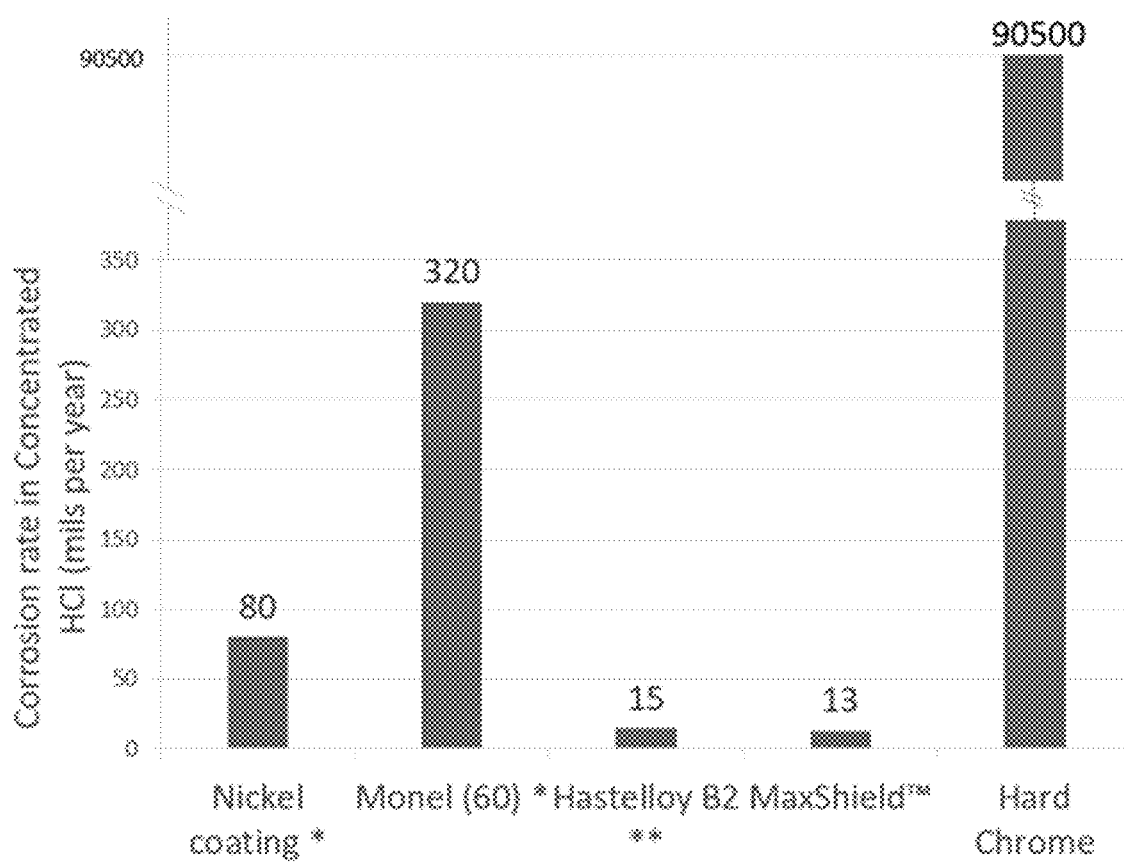
FIG. 22 is a graph showing corrosion rate of certain tested coatings, in accordance with some embodiments.

A coated surface of an article (carbon steel) was immersed in an aqueous solution of concentrated hydrochloric acid (32% HCl) for 24 hours. The weight loss of the coating (labeled as MaxShield) after the 24-hour exposure was then used to calculate its corrosion rate. FIG. 22 compares the corrosion rate of the MaxShield™ coating with existing nickel coating materials including Monel™ and Hastelloy™ materials. Table 1 below lists the Mdd, IPY and MPY values.

TABLE 1

|  | Mdd (mg/dm$^2$ · day) | IPY (Inch/yr) | MPY (milli-inch/yr) |
| --- | --- | --- | --- |
| Nickel coating (1) | 500 | 0.08 | 80 |
| Monel 60 (1) | 2000 | 0.32 | 320 |
| Hastelloy B2 (2) | 94 | 0.015 | 15 |
| Hard Chrome | 567133 | 90.5 | 90500 |
| MaxShield ™ | 71 | 0.013 | 13 |

The rate shown for the coatings in FIG. 22 is the average of the corrosion test on three different samples. As shown in FIG. 22, the average corrosion rate of the MaxShield™ coating (13 milli-inches per year) is more than six times lower than existing nickel coatings. The MaxShield™ coating even shows a lower corrosion rate than Hastelloy™ materials. It is worth mentioning that Hastelloy is a superalloy that is known for its extreme corrosion resistance in HCl environment. It is also worth mentioning that hard chromium coating dissolves in concentrated HCl in less than 10 minutes, and basically, its corrosion rate is not even in the scale of this figure.

While the exact anti-corrosive mechanism of the MaxShield™ coating is not yet fully understood, one of the reasons for this superior anti-corrosion performance of the MaxShield™ coating could be its repellency. Third-party testing shows that the coating remains hydrophobic after 24-hour exposure to concentrated hydrochloric acid. In these tests, a Theta Lite Optical Tensiometer (Biolin Scientific, Paramus, N.J.) was used to measure water contact angles of the samples before and after their exposure to concentrated hydrochloric acid. The test was performed on three different samples. Water contact angles of all samples both before and after 24 hours exposure to the concentrated acid was above 90°.

Example 2

Figure 23:
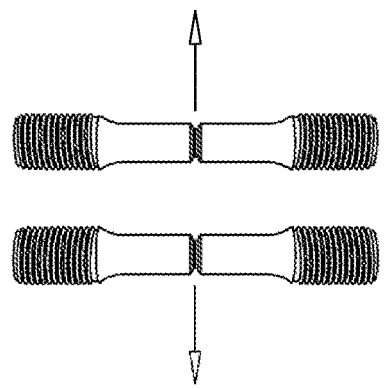
FIG. 23 is an image showing bare and coated samples that were tested, in accordance with some embodiments.

Hydrogen embrittlement or hydrogen-induced cracking is a type of corrosion that can result in catastrophic failure of steel structures. In this process, brittle hydrides are formed into the steel structure due to the introduction and subsequent diffusion of hydrogen into the metal. The formation of these hydrides results in a sudden fracture of the whole structure. One incident of hydrogen embrittlement was catastrophic failure of the threaded seismic anchor rods of California's San Francisco-Oakland Bay Bridge in 2013. Since this mode of corrosion can be catastrophic, the MaxShield™ coating was tested to determine if it induced hydrogen embrittlement. The test was performed on four notched bars covered with our coating by an accredited third-party lab. FIG. 23 shows the image of a notched bar before (left picture) and after (right picture) applying the MaxShield™ coating. The bars were tested per ASTM F519 for 200 hours of sustained loads in the amount of 75% of their fracture strength. All four coated samples passed the test and did not exhibit any fracture. The test results were consistent with the MaxShield™ coating not inducing hydrogen-induced cracking and it can resist against hydrogen embrittlement.

Example 3

Third-party testing shows a Vickers hardness of 660 to 750 for as-plated surface of carbon steel covered with the MaxShield™ coating. The test results also show that if the coating is annealed after plating at 300 deg. C. to 600 deg. C. for 1-6 hours, its microhardness will increase to 852. Table 2 compares the Vickers hardness of the as-plated and heat-treated surfaces covered with our coating with those obtained for surfaces covered with several other hard coatings.

TABLE 2

| Material | Microhardness (Vickers Hardness), $HV_{100}$ |
| --- | --- |
| Coated surface of the article - as plated | 660 |
| Coated surface of the article - Heat treated | 750-822 |
| Electroless Ni - as plated (5) | 480-500 |
| Electroless Ni - Heat treated (400 C. - 1 hr) (5) | 700-800 |
| Hard Chromium - as plated (5) | 800-1000 |
| Hard Chromium - Heat treated (190 C. - 23 hrs) (4) | 700-750 |

It is worth mentioning that electroless nickel is a wear-resistant coating that is known as one of the replacements for hard chromium coating. As Table 2 shows the microhardness of the as-plated MaxShield™ coating is better than that of the as-plated electroless nickel coating. Moreover, the heat-treated MaxShield™ coating exhibits slightly better Vickers hardness than heat-treated electroless nickel coating. The hardness of the heat-treated MaxShield™ coating is also comparable with that of the hard chromium coating. An important point that should be mentioned in reference to Table 2 is that hardness of hard chromium coating is reduced at high temperatures. As an instance, if hard chromium is heated at 190 C for 23 hours its hardness reduces from 800-1000 to a value between 700-750.

Therefore, regardless of environmental regulations and mandates on eliminating hard chromium coating, this coating does not perform at wear-resistant applications with high operating temperatures. An example of these applications is coating for inside gun barrels or coating on pistons; rotating parts (piston shafts, bearings) of heavy machineries; as turbine-aero engine parts operating at high temperature and wear environments such as valves (opening and shutting wear), pistons, actuators, piston rods, landing gears and drilling equipment (mud motor rotors, pump plungers, valve components, mandrels, torque rings, etc). Replacing hard chromium coating with the MaxShield™ coating for these applications can result in more durability and better performance.

Example 4

Figure 24:
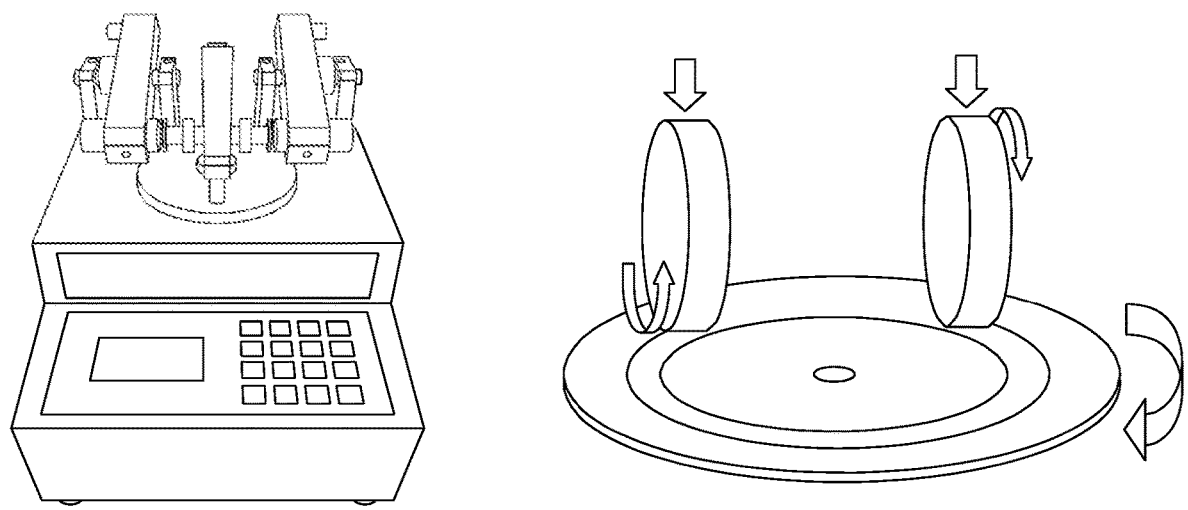
FIG. 24 is an illustration of an abraider machine, in accordance with some examples.
Figure 25:
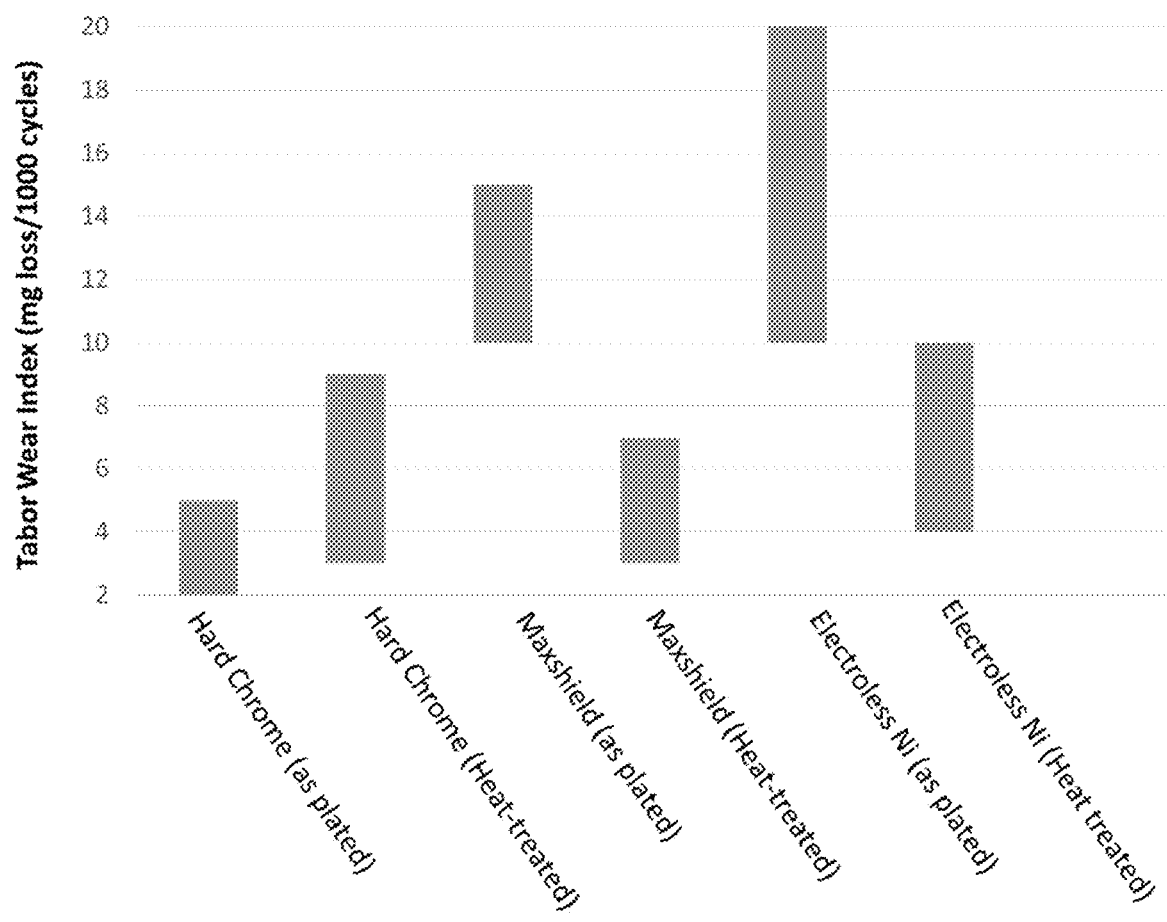
FIG. 25 is a graph comparing Tabor Wear indices for various tested coatings, in accordance with some embodiments.

The Standard Taber abrasion test was used to perform accelerated wear testing following ASTM D4060 standard. In this test, the abrader machine shown in FIG. 24 is used to abrade the surface of the coating by applying 1 kg load on each abrasive wheel. The results of the test are shown in FIG. 25 in the form of Taber wear index (TWI). Taber wear index is the milligram weight loss per 1000 cycles. FIG. 25 compares the TWI values of as-plated and heat-treated versions of the MaxShield™ coating with those of two other wear resistant coatings, Hard Chromium and Electroless Nickel coating. The test has been done on three different samples for each coating and the results for the electroless nickel and hard chromium coatings match with those in the literature. It is worth mentioning that considering the huge challenge of hard chromium coating with environmental regulations, electroless Nickel coating is accepted as one of its viable replacements in the industry. As FIG. 25 shows, the MaxShield™ coating without heat treatment has similar wear performance as electroless nickel and much better performance than other two nickel materials. After heat treatment at 300-600 deg. C. for 1-6 hours, the MaxShield™ coating exhibits around two times better wear performance than electroless nickel. Although our wear performance is better than one of the serious contenders of hard chromium, further improvement to the MaxShield™ coating can be achieved to provide the same wear resistance as that of a hard chromium coating. Table 3 below summarizes the abrasion test results.

TABLE 3

| Coated surface | TWI min | TWI max |
| --- | --- | --- |
| Hard Chrome (as plated) | 2 | 5 |
| Hard Chrome (Heat-treated) | 3 | 9 |
| MaxShield ™ (as-plated) | 10 | 15 |
| MaxShield ™ (Heat-treated) | 3 | 7 |

TABLE 3-continued

| Coated surface | TWI min | TWI max |
|---|---|---|
| Electroless Ni (as plated) | 10 | 20 |
| Electroless Ni (Heat-treated) | 4 | 10 |

Example 5

Figure 26:
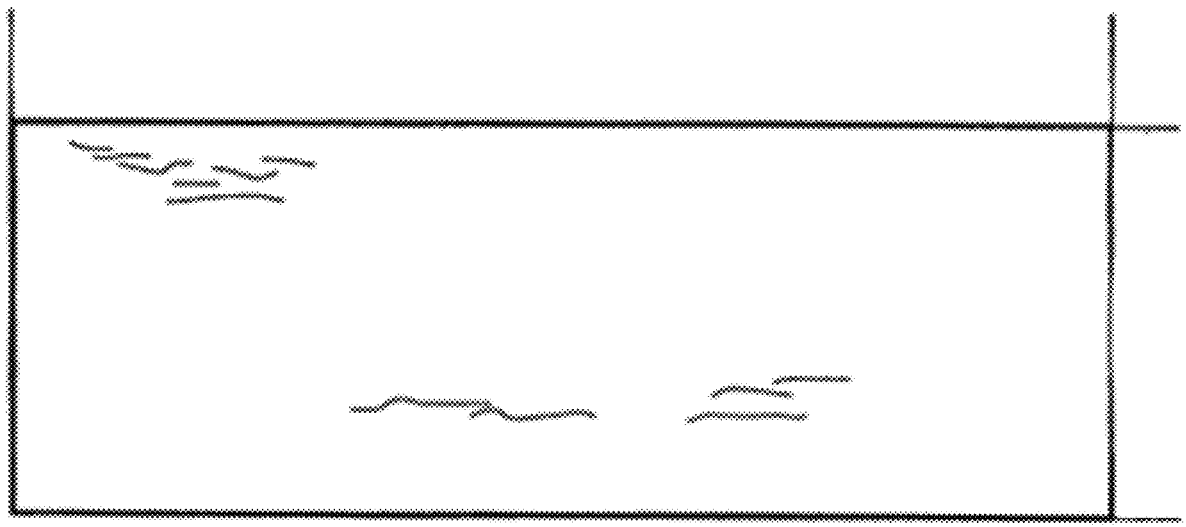
FIG. 26 is an illustration showing how cracks in a coating can be measured, in accordance with some embodiments.
Figure 27A:
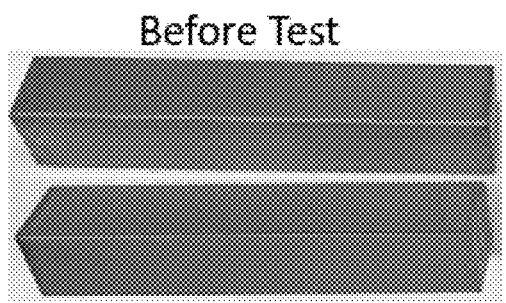
FIGS. 27A and 27B are images showing before and after testing using hydrogen sulfide, in accordance with some examples.
Figure 27B:
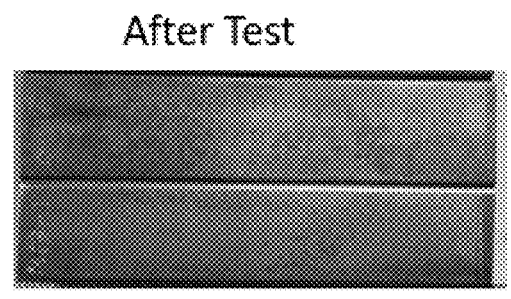
Figure 28:
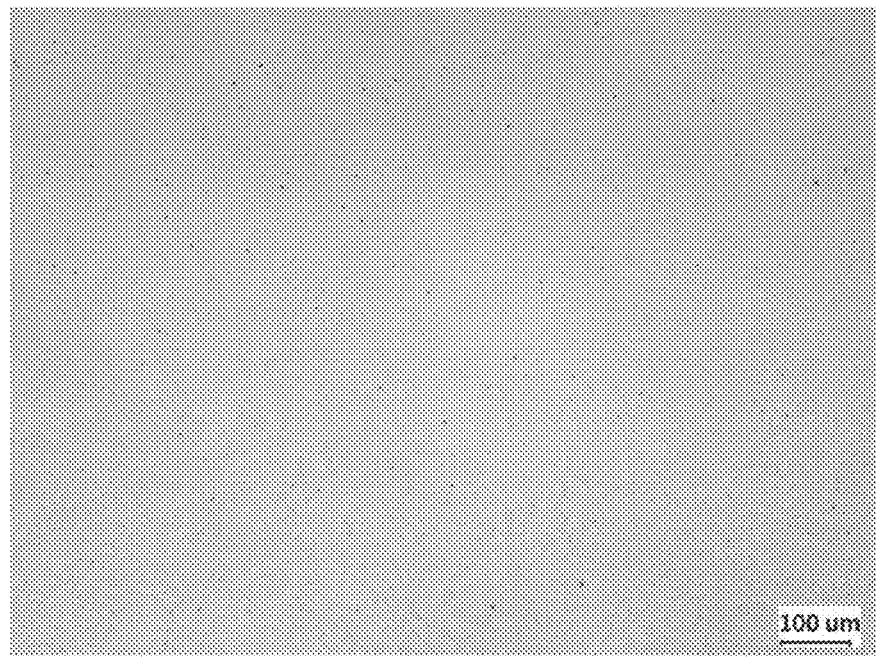
FIG. 28 is an electromicrograph image showing surfaces covered with a MaxShield™ coating were free of hydrogen induced blisters or cracking, in accordance with some embodiments.

Hydrogen sulfide cracking tests were performed according to NACE TM-0284 on coated surfaces by an accredited third-party lab. During this testing, the coated surfaces were introduced to an acidic environment for 96 hours, during which $H_2S$ gas and nitrogen purge gas are introduced. To evaluate the coatings, the coated surfaces are polished metallographically to highlight cracks caused by the $H_2S$ gas. Shown in FIG. 26, the cracks are measured and reported as stated by the standard. According to the report by a third-party test center, visual and stereoscopic examination and subsequent inverted microscope examination revealed no cracking in the MaxShield™ coating. FIGS. 27A and 27B shows the images of the coated carbon steel bars that are used in this test before and after the test, respectively. As shown in the microscopic images of FIG. 28, the surfaces covered with the MaxShield™ coating were free of hydrogen induced blisters or cracking.

Example 6

Salt spray testing was performed to evaluate the MaxShield™ coating. This test is a standard corrosion test, also known as salt fog test. During this test, the coated surface of the article was exposed to 5% sodium chloride mist which simulates marine environment corrosion. Test was done according to ASTM B 117 by an accredited third-party test center. In this test, a hard chrome coating as well as an electroless nickel coating were compared with the MaxShield™ coating after 1000 hours of exposure.

Figures 29A, 29B:
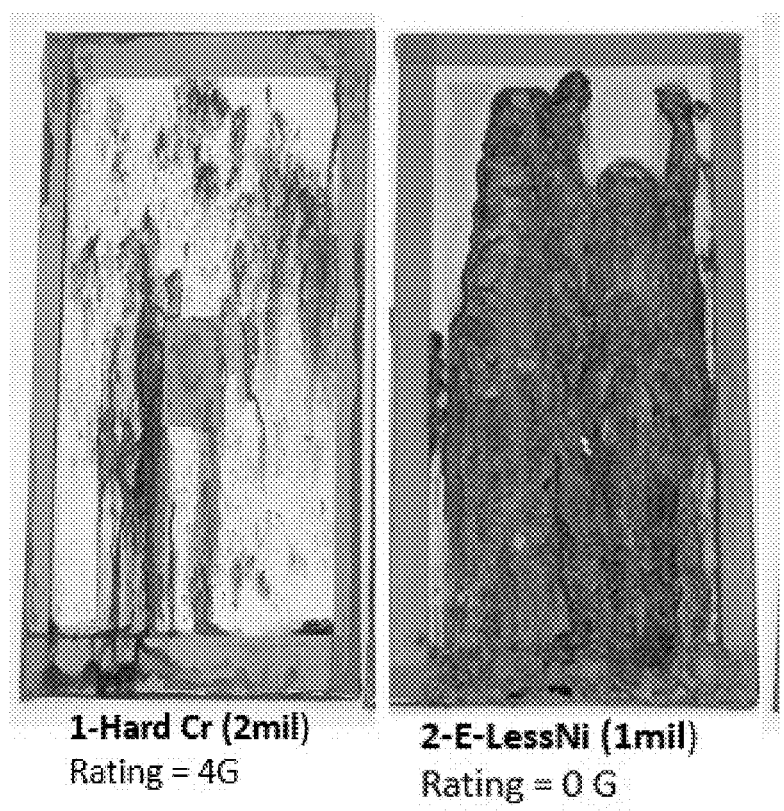
FIGS. 29A and 29B are photographs showing carbon steel surfaces covered with electroless nickel (FIG. 29B) and hard chromium coatings (FIG. 29A) after 1000 hours of the salt spray test.
Figures 30A, 30B, 30C, 30D, 30E:
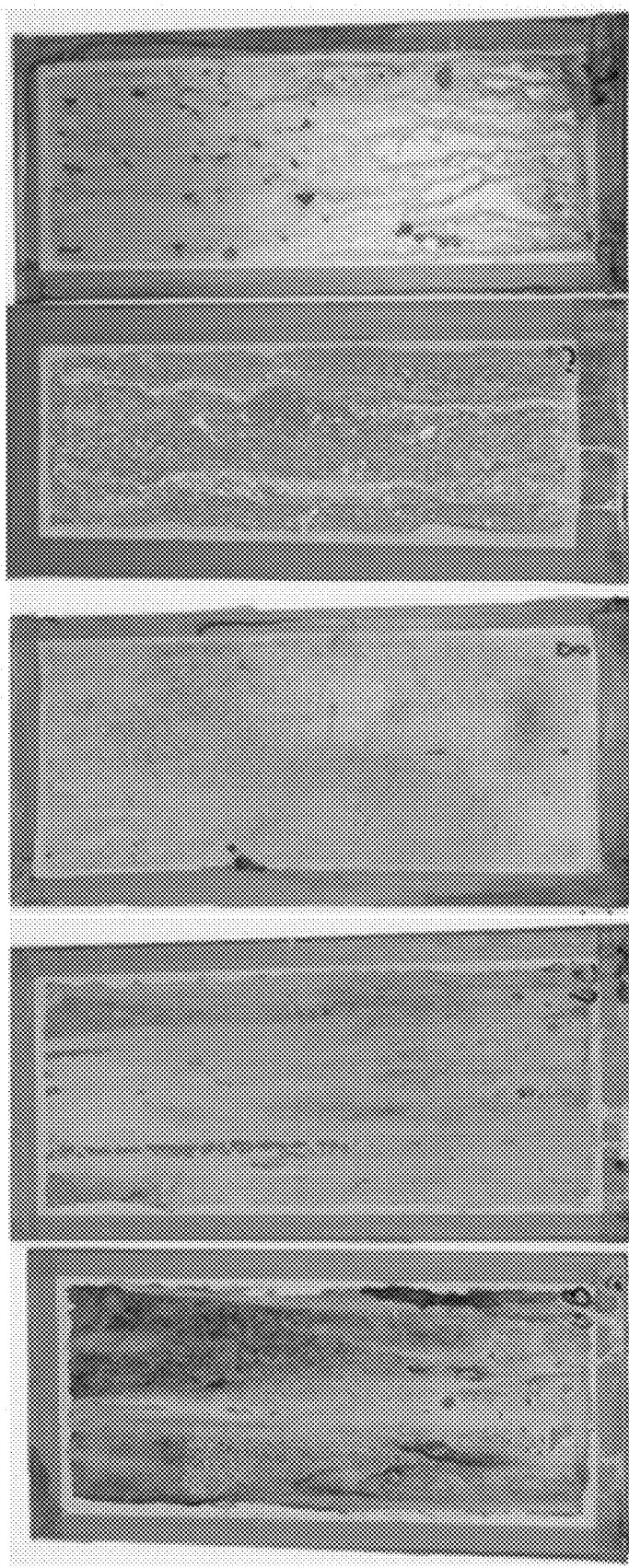
FIGS. 30A, 30B, 30C, 30D and 30E are photographs showing carbon steel surfaces covered with the MaxShield™ coatings that were salt spray tested.

Corrosion ratings were given by the third-party test specialists according to the ASTM D610 Rust Grade. According to this ASTM, a corrosion rate of 0 for electroless nickel after 1000 hours indicates rust formation over 50% of the surface area. A corrosion rate of 4 was obtained for the hard chromium coating after 1000 hours that indicates 3 to 10% of the surface area is corroded. FIGS. 29A and 29B shows the images of the carbon steel surfaces covered with electroless nickel (FIG. 29B) and hard chromium coatings (FIG. 29A) after 1000 hours of the salt spray test.

The salt spray test also shows a corrosion rate of 9 for three of the carbon steel surfaces covered with the MaxShield™ coating. A corrosion rate of 9 indicates rust formation in less than 0.03% of the surface area. The fourth surface covered with our coating did not rust at all, and its corrosion rate ranked 10. FIGS. 30A-30E shows all the carbon steel surfaces covered with the MaxShield™ coatings that were tested by the third-party and their ratings.

Figure 31:
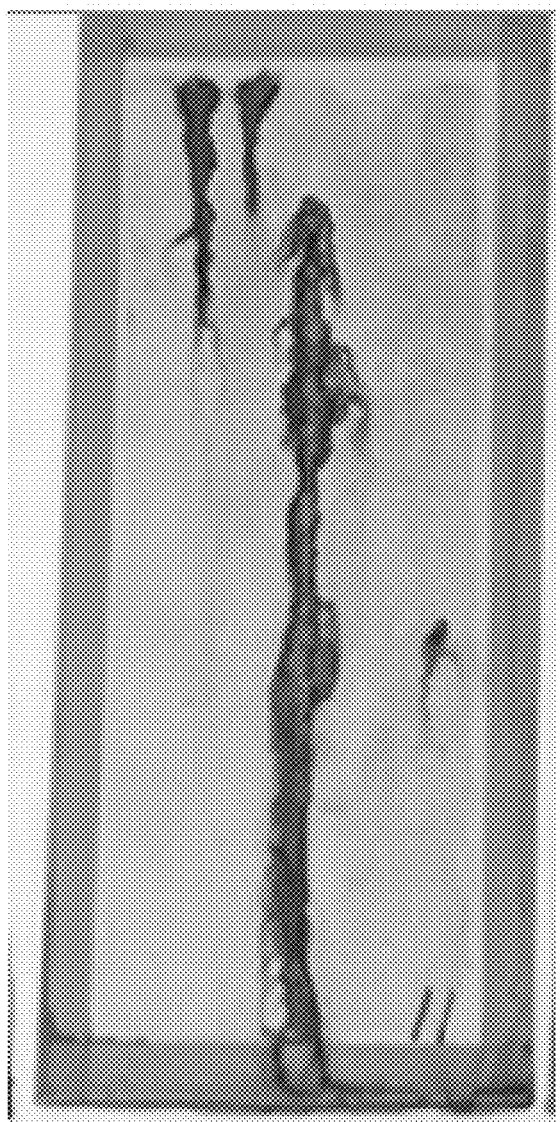
FIG. 31 is a photograph showing a scribed coated surface after 1000 hours exposure to the salt spray.

We also scribed one of the surfaces covered with the MaxShield™ coating and tested that in the salt spray chamber. The corrosion rate of 9 was obtained on the areas far from the scribed region. Moreover, creep measurement was performed on this sample, and the rating of 8 was obtained for the scribed region based on ASTM D1654. The image of the scribed coated surface after 1000 hours exposure to the salt spray is shown in FIG. 31.

The test on the scribed surface shows that the MaxShield™ coating does not have any problem with accelerated galvanic corrosion if it gets scratched and the underneath steel surface gets exposed at the location of the scratch. Galvanic corrosion is a major issue with some other corrosion resistant coatings. When these coatings get scratched, the underneath steel sacrificially corrodes, and the coating remains intact. Therefore, the coating fails in performing its main duty of protective the steel substrate. The results of the salt spray test on the MaxShield™ scribed coating shows that the MaxShield™ coating can provide a level of self-healing and limit the progress of corrosion from the scratched location. Without the intent to limit this self-healing characteristic to any particular reason, it is believed the MaxShield™ coating provides a protective oxide film at the location of the scratch that can prevent further progress of the corrosion.

Figure 32:
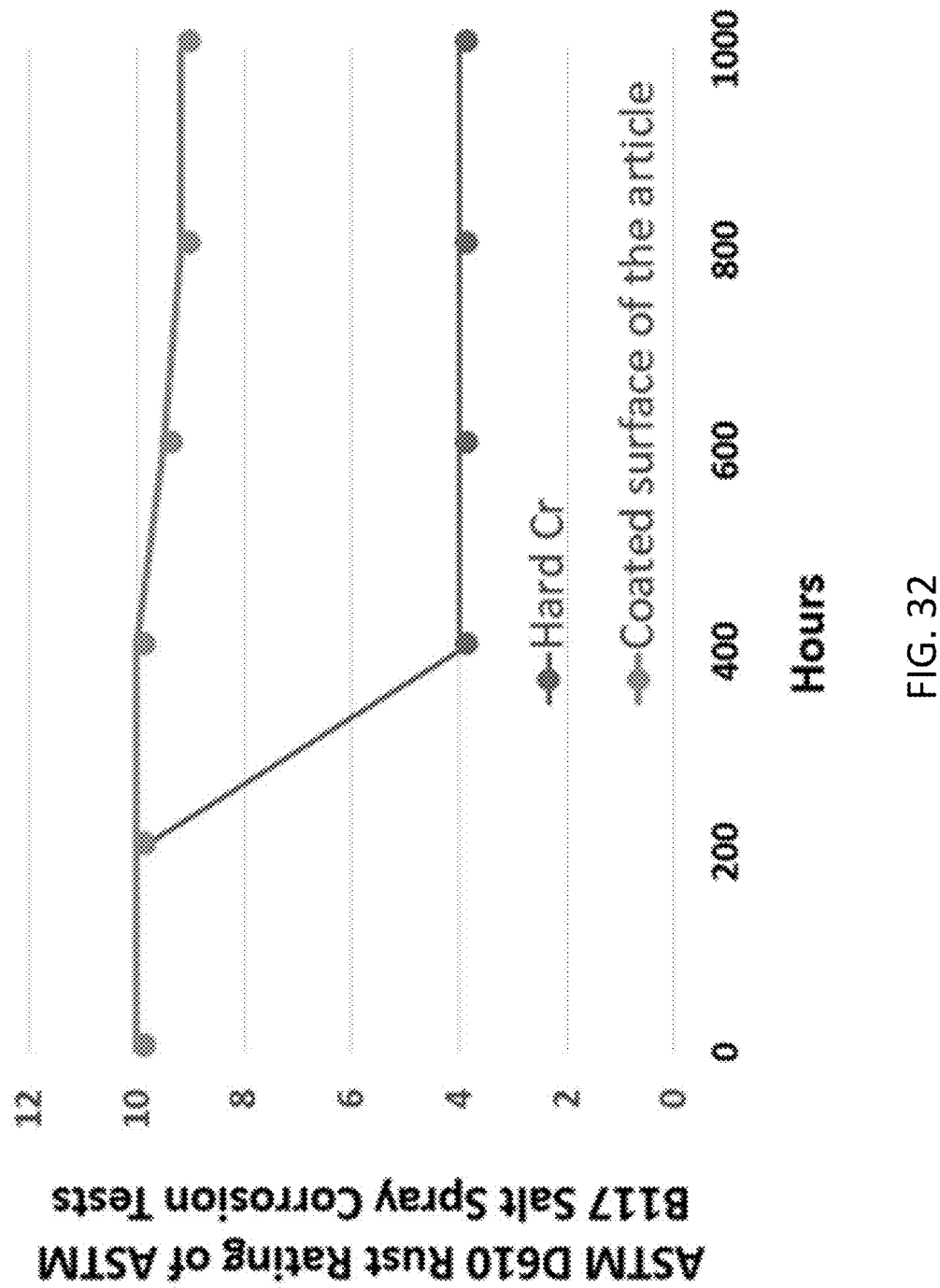
FIG. 32 is a graph comparing the rust ratings of two coatings.

FIG. 32 compares the results of the salt spray test for our coating with that of hard chromium coating. As this figure shows, the corrosion rating of hard chromium coating reduces sharply to 4 after 200 hours exposure to the salt spray while the corrosion rate of the MaxShield™ coating remains above 9 up to 1000 hours exposure.

Example 7

Ductility of the MaxShield™ coating was determined by an accredited third-party testing center according to ASTM E8 (Tension Testing of Metallic Materials). In this test, coated T-bone specimens are tensile tested uniaxially until the coating flakes off and the underneath surface can be seen in 50x microscopic images.

The test showed that the MaxShield™ coating can get elongated to above 6% without any flaking or fracturing. The ductility values, greater than 6%, is significantly higher than commercially used hard chrome coatings which is 0.1% and also electroless nickel which is 1-1.5%. FIGS. 33A and FIG. 33B shows the image of two of our coatings before (FIG. 33A) and after (FIG. 33B) the test by the third-party center.

FIG. 34 demonstrates our coatings after 6% elongation microscopically. As these two figures show, our coating exhibits at least 6% ductility without any fracture or blistering.

Example 8

Figures 35A, 35B:
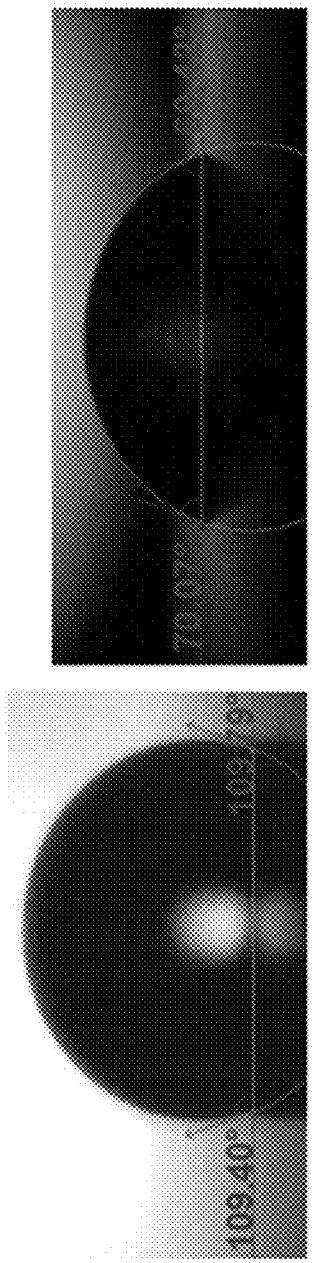
FIGS. 35A and 35B are images showing water droplet shape on a coated surface.

The water contact angle (WCA) of the MaxShield™ surface is always above 90°. However, this angle can be tuned based on the substrate below the coating, the coating composition and by varying parameters of the coating application process. WCA is generally between 110° and 125°. This angle can be compared with the WCA of uncoated steel that is between 60° to 80°. FIGS. 35A and 35B show the representative shapes of a water droplet on coated and uncoated carbon steel surfaces, respectively.

Example 9

Three MaxShield™ coated stainless steel surfaces were immersed in an aqueous solution of 20% NaOH for 24 hours with the coating in a vertical position. After the 24 hours exposure, coatings were washed with deionized (DI) water and wiped dry, followed by being subjected to a heat drying program. After the heat drying program, coatings were weighed, and their water contact angle was measured.

Figure 36A:
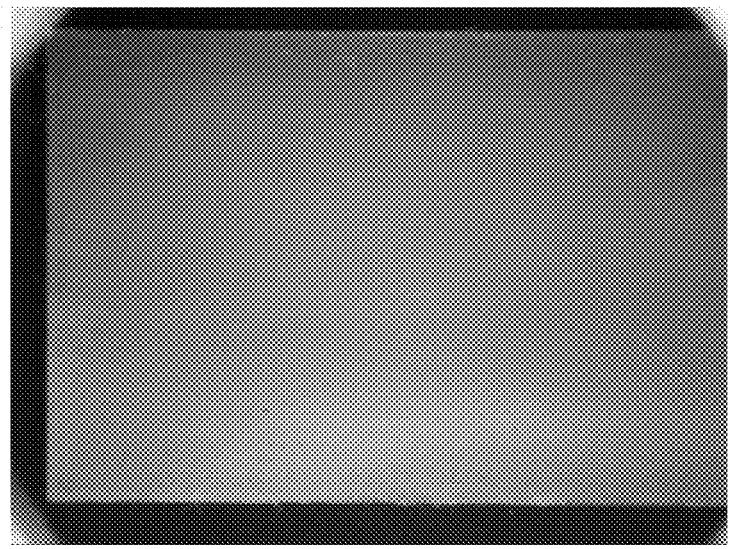
FIG. 36A shows an image of a coated article before alkaline testing.
Figure 36B:
FIG. 36B shows an image of the coated article after alkaline testing.

The weight loss remained below 1 mg/cm² and water contact angle remained above 100° after 24 hours exposure to the alkaline environment in this test. The average weight loss and contact angles of the coating are provided in Table 4 below. Moreover, as shown in FIG. 36B which shows an image 1 hour after testing, no damage was observed on the coating after 24 hours exposure to the alkaline environment. As a result, the coating can resist alkaline environments without any corrosion and loss of properties. FIG. 36A shows an image of the article before alkaline testing.

TABLE 4

| Samples used | Average Weight Loss per unit Area (mg/cm²) | Contact Angle (deg.) | |
|---|---|---|---|
| | | Before | After |
| Coated surface 1 | 0.029 | more than 90° | more than 90° |

Example 10

Three MaxShield™ coated stainless steel surfaces were immersed in reagent grade acetone for 24 hours with the coating in a vertical position. After 24 hours exposure, coatings were washed with deionized water and wiped dry. Coatings were then subjected to a heat drying program. After the heat drying program, coatings were weighed, and their water contact angle was measured.

Three coated samples exhibited weight loss of less than 1 mg/cm² and contact angle of more than 90° after 24 hours exposure to acetone. Weight loss and contact angles of the samples are provided in Table 5 below. No damage was observed on the coating after 24 hours exposure to acetone. As a result, the coating can resist organic solvent environments without any corrosion and loss of hydrophobic property.

TABLE 5

| Samples used | Average Weight Loss per unit Area (mg/cm²) | Contact Angle (deg.) | |
|---|---|---|---|
| | | Before | After |
| Coated surface 1 | 0.025 | more than 90° | more than 90° |
| Coated surface 2 | | | |
| Coated surface 3 | | | |

Example 11

Three coated stainless steel surfaces were immersed in an aqueous solution of 32% HCl for 24 hours with the coating in a vertical position. After 24 hours exposure, coatings were washed with DI water and wiped dry. Coatings were then subjected to a heat drying program. After the heat drying program, coatings were weighed and their water contact angle was measured. It is worth mentioning that 32% HCl is a concentrated HCl solution. It is a very corrosive environment that will destroy most materials other than such super-alloys as Hastelloy.

The weight loss of all three samples was less than 10 mg/cm² and their contact angles remained above 90° after 24 hour exposure to the concentrated acidic environment. Table 6 shows the average weight loss per unit area for three samples and their water contact angles before and after the test. The results show the coating resists in this aggressive environment and retains its properties.

TABLE 6

| Sample | Average Weight Loss per unit Area (mg/cm²) | Contact Angle (deg.) | |
|---|---|---|---|
| | | Before | After |
| Coated surface 1 | 2.648 | more than 90° | more than 90° |
| Coated surface 2 | | | |
| Coated surface 3 | | | |

Example 12

Three coated stainless steel surfaces were placed in an oven at 300° C. for 24 hours. Following the exposure, the contact angles were measured.

The water contact angle of all three coatings remained above 90° after the test. Moreover, no significant discoloration and damage was observed.

Example 13

Pencil hardness testing was conducted per ASTM D 3363 on MaxShield™ coated stainless steel surfaces.

A pencil hardness of more than 9H was obtained for the coated surfaces. It is worth mentioning that 9H is the highest grade of pencil hardness. No scratching or gouging of the coating was observed. Transfer of graphite material from the pencil covered the stroke length.

Example 14

A cross section of a single surface was analyzed. Examination of several MaxShield™ coated surfaces in cross section showed that coating thickness can be between 25 to 100 micrometers.

Example 15

In this test, three MaxShield™ coated stainless steel surfaces were exposed to heat at 300° C. for around 25 days. The coated surfaces were taken out of the oven every 2 or 3 days, cooled down to the room temperature, and their mass and water contact angles were measured. The samples were then heated up again to 300° C. This test can be a measure of the performance of the coating in long time exposure to heat and heat cycling.

Figure 37:
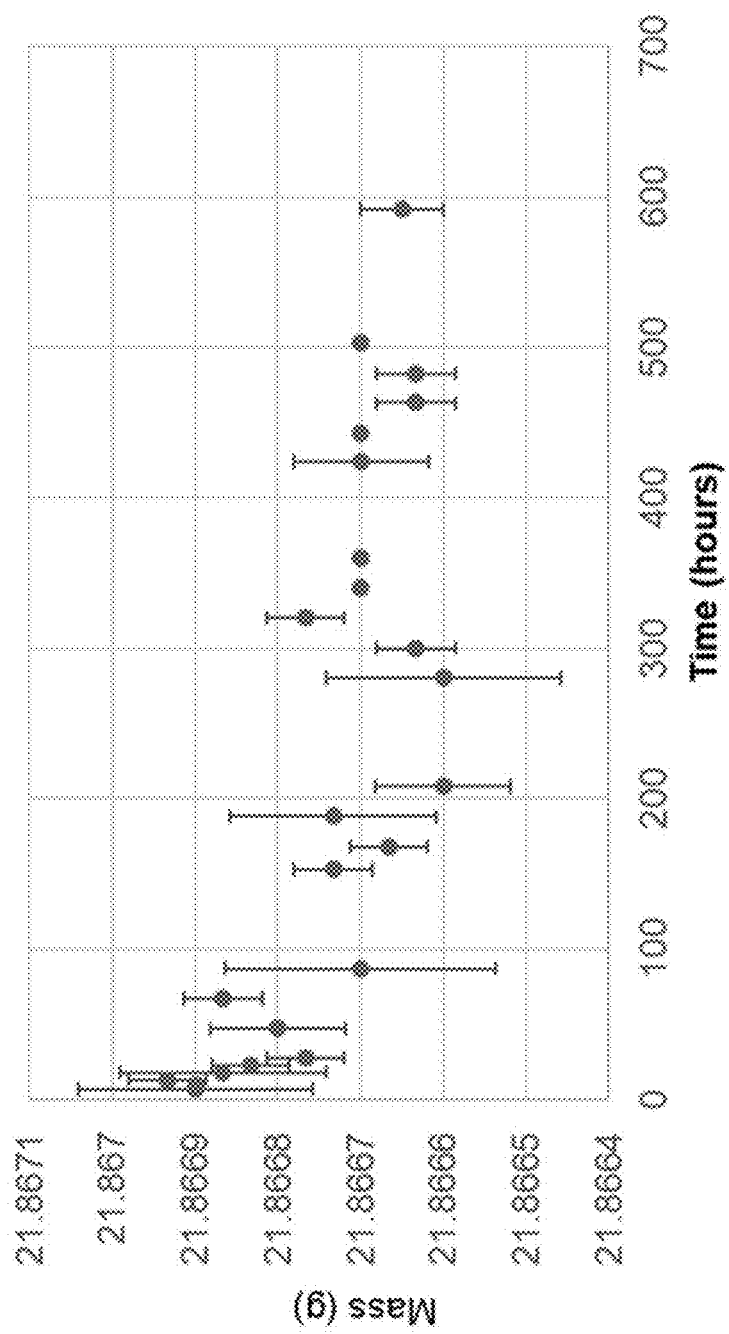
FIG. 37 is a graph showing mass changes over time during heating of coated article.

The MaxShield™ coated stainless steel samples experienced negligible weight loss and their water contact angle remained above 90° in this long-term test. The circles in FIG. 37 correspond to the measured weights at different times for one of the coated samples. This figure confirms the weight of the coated sample remains almost the same throughout the whole test.

Example 16

Less wear means more reliable moving parts (sliding, rotating, rubbing) in an abrasive environment. Therefore, it can be translated to longer life of equipment and more efficiency. The wear performance of the MaxShield™ coating was tested per ASTM G99 specification.

The test was involved in applying 10 N force through a hard ball made of 440C stainless steel onto the coated sample that rotates 200 revolution per minute. The mechanical metal-to-metal contact causes wear loss on the coating which is controlled by the coefficient of friction and hardness of the coating.

The test results are tabulated for the heat-treated and as-plated coatings and compared to those of industrial coatings (hard chromium and electroless nickel coating) in Table 7. In this table, wear factor indicates wear with a lower value indicating a better performance. The MaxShield™ coating showed superior wear performance against an industrial electroless nickel coating (wear factor of about 86.52). However, the results show that the wear performance of industrial hard chromium coating remains better than the two tested versions of the MaxShield™ coating.

TABLE 7

| Coated surface | Coefficient of friction | Wear Factor- $(10^{-5}$ mm$^3$/Nm) |
| --- | --- | --- |
| Hard Chrome (as plated) | 0.48 | Very small |
| Electroless Ni (as plated) | 0.61 | 86.52 ± 14.42 |
| MaxShield ™ (as-plated) | 0.60 | 1.70 ± 1.92 |
| MaxShield ™ (Heat-treated) | 0.61 | 0.69 ± 0.15 |

In reviewing the track of the abraded disks after testing, a track is barely seen on the hard chromium coating. On the heat-treated version of the MaxShield™ coating the crack is much smaller than the one on the electroless nickel coating. A narrower track can be interpreted to better wear performance. The ball wears off in the contact with the hard chromium coating because the coating is harder than the ball, and as the image shows there is no material transfer on the ball. In contrast there is a large amount of debris on the ball after its contact with electroless nickel coating. Material transfer from to coating to the ball shows that the coating is not as hard as the ball. Both versions of the disclosed MaxShield™ coatings are in between these extreme cases. There are small amount of materials transfer from the coating to the ball and there is a clear sign of damage on the ball as well.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. An article comprising a substrate and an electrodeposited acid resistant exposed single metallic alloy layer adjacent to and on a surface of the substrate, wherein the electrodeposited acid resistant exposed single metallic alloy layer protects the underlying substrate by resisting degradation after exposure to an acid with a negative pH with a corrosion rate of less than 20 mils/year, wherein the electrodeposited acid resistant exposed single metallic alloy layer exhibits a hardness of more than 600 Vickers hardness (HV), as measured based on the ASTM E92-17 standard, wherein the electrodeposited acid resistant exposed single metallic alloy layer is formed by co-electrodepositing (i) molybdenum or tungsten and (ii) nickel on the surface of the substrate, and wherein the electrodeposited acid resistant exposed single metallic alloy layer further comprises particles selected from the group consisting of PTFE, silica ($SiO_2$), alumina ($Al_2O_3$), silicon carbide (SiC), diamond, diatomaceous earth (DE), boron nitride (BN), titanium oxide ($TiO_2$), single wall carbon nanotubes (SWCNTs), multi-wall carbon nanotubes (MWCNTs), kaoline ($Al_2O_3 \cdot 2SiO_2 \cdot 2H_2O$), carbon, graphite, molybdenum disulfide, nickel fluoride, chromium carbide ($Cr_2C_3$), titanium carbide (TiC), titanium nitride (TiN), other nanoparticles, and combinations thereof.

2. The article of claim 1, wherein the acid is an aqueous solution of more than 30 percent hydrochloric acid.

3. The article of claim 2, wherein the electrodeposited acid resistant exposed single metallic alloy layer resists in the acid at least two times more than a pure nickel coating with a same thickness with the corrosion rate of the coating being at most half of a corrosion rate of the pure nickel coating with the same thickness when both coatings are placed in contact with strong acids.

4. The article of claim 1, further comprising a layer comprising organic or inorganic-organic materials that covers a portion of the electrodeposited acid resistant exposed single metallic alloy layer.

5. The article of claim 4, wherein the organic or inorganic-organic material is selected from the group consisting of parylene, organofunctional silanes, fluorinated organofunctional silane, fluorinated organofunctional siloxane, organofunctional oligomeric siloxane, organofunctional resins, hybrid inorganic organofunctional resins, hybrid inorganic organofunctional POSS resins, organofunctional polyhedral oligomeric silsesquioxane (POSS), fluorinated oligomeric polysiloxane, organofunctional oligomeric poly siloxane, hybrid inorganic organofunctional oligomeric poly siloxane, fluorinated organofunctional silicone copolymers, organofunctional silicone polymers, hybrid inorganic organofunctional silicone polymers, organofunctional silicone copolymers, hybrid inorganic organofunctional silicone copolymers, silicone polymers, organofunctional silicone polymers, fluorinated polymers, fluorinated polyhedral oligomeric silsesquioxane (FPOSS), non-volatile linear and branched alkanes, alkenes and alkynes, esters of linear and branched alkanes, alkenes and alkynes, perfluorinated organic material, silane coupling agents, fluorinated alkylsiloxane, surface-modified inorganic particles, fluorinated alkylsilane, fluorinated based organo-functional silane, fluorinated based organo-functional siloxane, polydimethylsiloxane, fluorinated organo-functional oligomeric siloxane, water-born organofunctional silane system, organofunctional polysiloxane, silane based sol-gel system, fluoroalkysilane, hydrolyzable inorganic ethoxysilyl groups, sol-gel systems, silane system, functionalized silanol groups, and any combination thereof.

6. The article of claim 1, wherein the molybdenum and nickel are co-electrodeposited to form the electrodeposited acid resistant exposed single metallic alloy, and wherein a content of the molybdenum in the electrodeposited acid resistant exposed single metallic alloy layer is between 5 percent to 40 weight percent based on the weight of the electrodeposited acid resistant exposed single metallic alloy layer.

7. The article of claim 1, wherein a thickness of the electrodeposited acid resistant exposed single metallic alloy layer is between 1 um to 300 um.

8. The article of claim 1, wherein at least a portion of the electrodeposited acid resistant exposed single metallic alloy layer exhibits a water contact angle of more than 90° as tested by the ASTM D7490-13 standard.

9. The article of claim 2, wherein the electrodeposited acid resistant exposed single metallic alloy layer is hydrophobic and remains hydrophobic after 24-hour exposure to the aqueous acid solution with the negative pH and has a water contact angle of greater than 900, as measured using ASTM D7490-13, after the 24-hour exposure to the aqueous acid solution with the negative pH.

10. The article of claim 1, wherein the electrodeposited acid resistant exposed single metallic alloy layer is a textured layer comprising a plurality of surface features in the micro size range.

11. The article of claim 10, wherein a characteristic size of the plurality of surface features are between 5 micrometers to 15 micrometers.

12. The article of claim 11, wherein a water contact angle of the textured layer is more than 1500 as measured by ASTM D7490-13.

13. The article of claim 1, wherein tungsten and nickel are co-electrodeposited to form the electrodeposited acid resistant exposed single metallic alloy layer.

* * * * *